United States Patent
Yanai et al.

(10) Patent No.: US 9,475,520 B2
(45) Date of Patent: Oct. 25, 2016

(54) ROTATIONAL-ANGLE DETECTION DEVICE AND ELECTRIC POWER-STEERING DEVICE PROVIDED WITH ROTATIONAL-ANGLE DETECTION DEVICE

(75) Inventors: Kohei Yanai, Mishima (JP); Kenichiro Aoki, Miyoshi (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/359,417

(22) PCT Filed: Nov. 24, 2011

(86) PCT No.: PCT/JP2011/077038
§ 371 (c)(1),
(2), (4) Date: May 20, 2014

(87) PCT Pub. No.: WO2013/076839
PCT Pub. Date: May 30, 2013

(65) Prior Publication Data
US 2014/0336878 A1 Nov. 13, 2014

(51) Int. Cl.
*G01B 7/30* (2006.01)
*B62D 5/04* (2006.01)
*G01D 5/14* (2006.01)
(Continued)

(52) U.S. Cl.
CPC ........... *B62D 5/0481* (2013.01); *B62D 5/0463* (2013.01); *G01B 7/30* (2013.01); *G01B 7/31* (2013.01); *G01D 5/145* (2013.01); *G01D 3/02* (2013.01)

(58) Field of Classification Search
CPC ........... B60W 10/20; B60W 2710/20; B62D 15/025; B62D 6/008; B62D 6/00; B62D 5/0481; B62D 5/0472

USPC .......................................................... 701/41
See application file for complete search history.

(56) References Cited

U.S. PATENT DOCUMENTS 4,924,180 A 5/1990 Nasr et al.
5,495,774 A * 3/1996 Klauber ............... B60G 17/019
73/114.11
(Continued)

FOREIGN PATENT DOCUMENTS

JP 53 77551 7/1978
JP 11 27973 1/1999
(Continued)

OTHER PUBLICATIONS

International Search Report Issued Jan. 17, 2012 in PCT/JP11/077038 Filed Nov. 24, 2011.

*Primary Examiner* — Behrang Badii
*Assistant Examiner* — Daniel L Greene
(74) *Attorney, Agent, or Firm* — Oblon, McClelland, Maier & Neustadt, L.L.P.

(57) ABSTRACT

When a shaft misalignment detection part detects occurrence of a shaft misalignment that is a misalignment in a relative position in a radial direction of a rotary shaft between a magnet part and a sensor part, the shaft misalignment detection part outputs a shaft misalignment determination flag to a correction part and a control change instruction part. The correction part calculates a motor rotational angle so as to reduce a detection error caused by the shaft misalignment. The control change instruction part outputs instructions of changing calculation methods so that influence by the detection error decreases to an assist torque setting part and an assist current instruction part.

23 Claims, 29 Drawing Sheets

(51) Int. Cl.
*G01B 7/31* (2006.01)
*G01D 3/02* (2006.01)

(56) References Cited

U.S. PATENT DOCUMENTS

| | | | |
|---|---|---|---|
| 6,320,344 B1 | 11/2001 | Sakamoto et al. | |
| 6,433,536 B1 * | 8/2002 | Yundt | G01D 5/145 324/207.2 |
| 6,467,557 B1 * | 10/2002 | Krueger | E21B 4/18 175/104 |
| 2007/0146169 A1 | 6/2007 | Otsuka et al. | |
| 2010/0219815 A1 * | 9/2010 | Perske | G01D 5/145 324/207.25 |

FOREIGN PATENT DOCUMENTS

| | | |
|---|---|---|
| JP | 2005 140525 | 6/2005 |
| JP | 2009 6923 | 1/2009 |
| JP | 2009 40224 | 2/2009 |
| JP | 2009 508119 | 2/2009 |
| JP | 2011 169716 | 9/2011 |
| JP | 2011 230531 | 11/2011 |

* cited by examiner

ROTATIONAL-ANGLE DETECTION DEVICE AND ELECTRIC POWER-STEERING DEVICE PROVIDED WITH ROTATIONAL-ANGLE DETECTION DEVICE

TECHNICAL FIELD

The present invention relates to a rotational-angle detection device for detecting a rotational angle of a rotary shaft of a motor, and the like, and to an electric power-steering device, using the rotational-angle detection device, for detecting a rotational angle of a motor and controlling drive of the motor based on the detected rotational angle, to thereby generate a steering assist torque.

BACKGROUND ART

In the related-art, a rotational-angle detection device for detecting a rotational angle of a rotary shaft by means of a magnetic sensor is known. For example, Patent Literature 1 proposes a rotational-angle detection device including a magnetic member fixed to a rotary shaft and magnetized as an N pole and an S pole at predetermined intervals in a peripheral direction of the rotary shaft, and a sensor part including two MR sensors arranged so as to oppose the magnetic member to detect a change in a magnetic field caused by the N pole and the S pole at positions 180-degree symmetrical about an axial center of the rotary shaft in the peripheral direction of the rotary shaft. Each of the two MR sensors includes two magnetoresistance effect devices (MR devices) presenting such a characteristic that an electric resistance changes depending on the magnitude of a magnetic flux density when the MR sensors are respectively influenced by an external magnetic field. The two MR devices are serially connected to each other, a predetermined voltage is applied to both ends thereof, and a voltage at a connection point between both of the MR devices is output in the MR sensor.

When a relative positional relationship between the center axis of the rotary shaft and the sensor part is misaligned in the radial direction of the rotary shaft (hereinafter the misalignment is referred to as shaft misalignment), the rotational angle cannot be accurately detected. Thus, the rotational-angle detection device according to Patent Literature 1 cancels the detection error in the rotational angle caused by the shaft misalignment by using an average of results obtained from the outputs of the two MR sensors to acquire the rotational angle.

CITATION LIST

Patent Literature

[PTL 1] JP 2011-169716 A

SUMMARY OF INVENTION

However, the rotational-angle detection device proposed by Patent Literature 1 cancels the detection error caused by the shaft misalignment by simply using the two MR sensors, and does not actually detect the occurrence of the shaft misalignment. Moreover, the detection error can be cancelled only when the shaft misalignment occurs in a specific direction. Therefore, even when a large shaft misalignment occurs, and the detection error cannot be cancelled, the detection value of the rotational angle is directly used.

For example, when drive of a motor (such as a DC brushless motor) is controlled for generating a steering assist torque in an electric power-steering device, the rotational angle of the motor is detected, and a drive voltage in a phase corresponding to the rotational angle is applied to the motor. As a result, when the detection accuracy of the rotational angle is decreased by the shaft misalignment, the motor cannot be appropriately driven, and a countermeasure such as changing a control form of the motor drive becomes necessary in terms of the motor control. However, the rotational-angle detection device proposed by Patent Literature 1 cannot detect the shaft misalignment, and the shaft misalignment cannot be addressed. Moreover, when one MR sensor fails even in a state where the detection error caused by the shaft misalignment of the rotary shaft can be cancelled by the two MR sensors, the detection error cannot be subsequently cancelled. Thus, the shaft misalignment cannot be addressed in this case either.

The present invention has been made in view of the above-mentioned problems, and therefore has an object to flexibly address the shaft misalignment.

In order to achieve the above-mentioned object, the present invention has a feature in that there is provided a rotational-angle detection device, including: a magnet part (210) provided to rotate integrally with a rotary shaft, and magnetized so that a position of an area magnetized as an N pole and a position of an area magnetized as an S pole are alternately switched as the rotary shaft rotates; a sensor part (220) including a plurality of magnetic sensors (S) arranged so as to oppose the magnet part, each of the plurality of magnetic sensors outputting a periodic signal that periodically changes by a magnetic action of the magnet part as the rotary shaft rotates; and rotational-angle calculation means (121) for calculating a rotational angle of the rotary shaft based on the periodic signal output by the each of the plurality of magnetic sensors of the sensor part; shaft misalignment detection means (122) for detecting occurrence of a shaft misalignment that is a misalignment in a relative position in a radial direction of the rotary shaft between the magnet part and the sensor part; and shaft misalignment information output means (S14, S25, S36, S44) for outputting shaft misalignment information (F) representing the occurrence of the shaft misalignment.

According to one embodiment of the present invention, the rotational-angle calculation means calculates the rotational angle of the rotary shaft based on the periodic signals output by the magnetic sensors of the sensor part as the magnet part rotates. When the misalignment in the relative position in the radial direction of the rotary shaft between the magnet part and the sensor part occurs, the periodic signals output by the magnetic sensors become no longer appropriate, and the rotational angle cannot be accurately calculated. Therefore, in one embodiment of the present invention, the rotational-angle detection device includes the shaft misalignment detection means and the shaft misalignment information output means. The shaft misalignment detection means detects the occurrence of the shaft misalignment that is the misalignment of the relative position in the radial direction of the rotary shaft between the magnet part and the sensor part, and the shaft misalignment information output means outputs the shaft misalignment information representing the occurrence of the shaft misalignment. Thus, according to one embodiment of the present invention, a flexible countermeasure can be taken against the shaft misalignment based on the shaft misalignment information. For example, when the rotational-angle detection device detects the rotational angle of the motor, the drive control for the motor can be changed to control reflecting the shaft misalignment based on the shaft misalignment information.

The present invention has another feature in that the shaft misalignment detection means (122) calculates a shaft misalignment degree representing a degree of the shaft misalignment, and determines that the shaft misalignment has occurred when the shaft misalignment degree is larger than a threshold (S11 to S14, S21 to S25, S31 to S36, S41 to S44, S71).

According to one embodiment of the present invention, the shaft misalignment detection means calculates the shaft misalignment degree, and determines that the shaft misalignment has occurred when the shaft misalignment degree is larger than the threshold. Thus, the occurrence of the shaft misalignment can be appropriately detected.

The present invention has another feature in that the rotational-angle detection device further includes rotational-angle correction means (124) for calculating, when the occurrence of the shaft misalignment is detected by the shaft misalignment detection means (122), the rotational angle of the rotary shaft so as to reduce a detection error in the rotational angle caused by the shaft misalignment.

According to one embodiment of the present invention, when the occurrence of the shaft misalignment is detected, the rotational-angle correction means calculates the rotational angle of the rotary shaft so as to reduce the detection error in the rotational angle caused by the shaft misalignment. Thus, a decrease in the detection accuracy of the rotational angle caused by the shaft misalignment can be restrained. In this case, the rotational-angle correction means may be configured to correct the rotational angle calculated by the rotational-angle calculation means, or may be configured to calculate the rotational angle by means of a calculation method different from that in a case where the occurrence of the shaft misalignment is not detected in place of the rotational-angle calculation means.

The present invention has another feature in that the sensor part (220) includes four magnetic sensors (Ss1, Sc1, Ss2, Sc2) for outputting periodic signals that change as a sine waveform as the rotary shaft rotates so that phases of the periodic signals are shifted from one another by $\pi/2$. The shaft misalignment detection means detects the occurrence of the shaft misalignment by using output signals (Vs1, Vc1, Vs2, Vc2) of the four magnetic sensors.

According to one embodiment of the present invention, the four magnetic sensors output the periodic signals that change in the sine waveform as the rotary shaft rotates so that the phases thereof are shifted from one another by $\pi/2$. Thus, a sin wave signal, a cos wave signal, a –sin wave signal, which is an inversion of the sin wave signal, and a –cos wave signal, which is an inversion of the cos wave signal, which are synchronized with the rotation of the rotary shaft, are acquired from the sensor part. As a result, the rotational angle can be acquired by calculating an arctangent of the output values of the two signals shifted from each other in the phase by $\pi/2$. In this case, the rotational-angle calculation means can calculate a plurality of calculation values of the rotational angle from a plurality of combinations of signals, and even when an arbitrary magnetic sensor fails, the rotational angle can be calculated from the remaining magnetic sensors. Note that, "includes four magnetic sensors" means that the sensor part includes at least four magnetic sensors, and the provided number of the magnetic sensors is not limited to four.

When the shaft misalignment occurs, the signal phases change, and the relative relationships among the output values of the four periodic signals change. Thus, the shaft misalignment detection means recognizes the change in the relative relationships among the output values to appropriately detect the occurrence of the shaft misalignment.

The present invention has another feature in that the shaft misalignment detection means (122) determines that the shaft misalignment has occurred when a deviation between a first rotational angle calculated based on the output signals of two of the four magnetic sensors shifted from each other in the phases by $\pi/2$ and a second rotational angle calculated based on the output signals of other two of the four magnetic sensors shifted from each other in the phases by $\pi/2$ is larger than a threshold (S11 to S14).

The output signals of the two magnetic sensors shifted from each other in the phase by $\pi/2$ may be treated as, for example, a sin wave signal and a cos wave signal. Therefore, the rotational angle can be acquired by calculating the arctangent of the output values of the two signals. When the first rotational angle calculated based on the output signals of the two magnetic sensors shifted from each other in the phase by $\pi/2$ and the second rotational angle calculated based on the output signals of the other two magnetic sensors shifted from each other in the phase by $\pi/2$ are calculated, and when the shaft misalignment has not occurred, the first rotational angle and the second rotational angle may be equal to each other. When the shaft misalignment occurs, the deviation between the first rotational angle and the second rotational angle increases. On this occasion, according to one embodiment of the present invention, the deviation between the first rotational angle and the second rotational angle is considered as the shaft misalignment degree, and when the deviation is larger than the threshold, it is determined that the shaft misalignment has occurred. Thus, the occurrence of the shaft misalignment can be appropriately detected.

The present invention has another feature in that the shaft misalignment detection means (122) determines that the shaft misalignment has occurred based on a first sum that is a total of output values of two of the four magnetic sensors shifted from each other in the phases by $\pi$ and a second sum that is a total of output values of other two of the four magnetic sensors shifted from each other in the phases by $\pi$ when at least one of the first sum or the second sum is larger than a threshold.

The output signals of the two magnetic sensors shifted from each other in the phase by $\pi$ can be treated as, for example, a sin wave signal and a –sin wave signal, and the output signals of the other two magnetic sensors shifted from each other in the phase by $\pi$ can be treated as, for example, a cos wave signal and a –cos wave signal. The first sum acquired by adding the output values of the two magnetic sensors shifted from each other in the phase by $\pi$ and the second sum acquired by adding the output values of the other two magnetic sensors shifted from each other in the phase by $\pi$ are both zero when the shaft misalignment has not occurred, and at least one of them is not zero when the shaft misalignment occurs. Thus, according to one embodiment of the present invention, the first sum and the second sum are considered as the shaft misalignment degree, and when at least one of the first sum or the second sum is larger than the threshold, it is determined that the shaft misalignment has occurred. Thus, the occurrence of the shaft misalignment can be appropriately detected.

The present invention has another feature in that the shaft misalignment detection means (122) uses the output signals of the four magnetic sensors to calculate a shaft misalignment amount representing an amount of the shaft misalignment, and determines that the shaft misalignment has occurred when the shaft misalignment amount is larger than a threshold.

According to one embodiment of the present invention, the shaft misalignment detection means uses the output signals of the four magnetic sensors to calculate the shaft misalignment amount (the distance of the misalignment in the relative position in the radial direction between the magnet part and the sensor part), and determines that the shaft misalignment has occurred when the shaft misalignment amount is larger than the threshold. For example, an inclination ($\phi x$) of each of the lines from the rotational center of the magnet part to each of magnetism detection positions of the two magnetic sensors can be calculated based on a total of the output values of the two magnetic sensors shifted from each other in the phase by $\pi$, and a shaft misalignment amount (X) in a certain direction can be calculated based on the inclination and the detection positions of the magnetic sensors. Moreover, an inclination ($\phi y$) of each of the lines from the rotational center of the magnet part to each of magnetism detection positions of the other two magnetic sensors can be calculated based on a total of the output values of the other two magnetic sensors sifted from each other in the phase by $\pi$, and a shaft misalignment amount (Y) in a direction orthogonal to the certain direction can be calculated based on the inclination and the detection positions of the magnetic sensors. Thus, the misalignment amount can be calculated by calculating the two inclinations ($\phi x$, $\phi y$) by using the output signals of the four magnetic sensors. As a result, according to one embodiment of the present invention, the occurrence of the shaft misalignment can be appropriately detected.

The present invention has another feature in that the sensor part (220) includes four magnetic sensors (Ss1, Sc1, Ss2, Sc2) for outputting periodic signals that change in a sine waveform as the rotary shaft rotates so that phases of the periodic signals are shifted from one another by $\pi/2$. The rotational-angle correction means uses output signals (Vs1, Vc1, Vs2, Vc2) of the four magnetic sensors to calculate the rotational angle of the rotary shaft so as to reduce the detection error caused by the shaft misalignment.

According to one embodiment of the present invention, the four magnetic sensors output the periodic signals that change in the sine waveform as the rotary shaft rotates so that the phases thereof are shifted from one another by $\pi/2$. Thus, a sin wave signal, a cos wave signal, a –sin wave signal, which is an inversion of the sin wave signal, and a –cos wave signal, which is an inversion of the cos wave signal, which are synchronized with the rotation of the rotary shaft, are acquired from the sensor part. Thus, the rotational angle can be calculated so as to reduce the detection error caused by the shaft misalignment by combining the periodic signals. As a result, a decrease in the detection accuracy of the rotational angle caused by the shaft misalignment can be restrained.

The present invention has another feature in that the rotational-angle correction means (124) uses a plurality of combinations of the output signals of two of the four magnetic sensors shifted from each other in the phases by $\pi/2$ to calculate a plurality of rotational-angle calculation values, and sets an average of the plurality of rotational-angle calculation values as the rotational angle of the rotary shaft.

According to one embodiment of the present invention, the rotational angle can be calculated by calculating the arctangent of the output values of the output signals of the two magnetic sensors shifted from each other in the phase by $\pi/2$. Thus, the rotational angle can be calculated in a plurality of ways by using the plurality of combinations of the output signals of the two magnetic sensors. When the shaft misalignment has not occurred, the plurality of rotational-angle calculation values present similar values, but when the shaft misalignment occurs, the rotational-angle calculation values are mixed values larger and smaller than a normal value (rotational angle when the shaft misalignment has not occurred). Then, according to one embodiment of the present invention, the average of the plurality of rotational-angle calculation values is calculated, and the average is considered as the rotational angle of the rotary shaft. As a result, the detection error caused by the shaft misalignment can be easily reduced.

The present invention has another feature in that the rotational-angle correction means (124) selects, out of a plurality of rotational-angle calculation values calculated by using a plurality of combinations of the output signals of two of the four magnetic sensors shifted from each other in the phases by $\pi/2$, a rotational-angle calculation value closest to an average of the plurality of rotational-angle calculation values as the rotational angle of the rotary shaft.

According to one embodiment of the present invention, the plurality of combinations of the two magnetic sensors shifted from each other in the phase by $\pi/2$ are used to calculate the plurality of the rotational-angle calculation values, and the average of the plurality of rotational-angle calculation values is calculated. Then, a rotational-angle calculation value closest to the average is selected as the rotational angle of the rotary shaft. As a result, the detection error caused by the shaft misalignment can be easily reduced.

The present invention has another feature in that the rotational-angle correction means (124) uses the output signals of the four magnetic sensors to calculate a correction angle corresponding to the shaft misalignment, and corrects the rotational angle calculated by the rotational-angle calculation means by using the correction angle.

According to one embodiment of the present invention, the rotational-angle correction means uses the output signals of the four magnetic sensors to calculate the correction angle corresponding to the shaft misalignment, and uses the correction angle to correct the rotational angle. As a result, the detection error caused by the shaft misalignment can be easily reduced.

The present invention has another feature in that there is provided an electric power-steering device, including the rotational-angle detection device so as to detect a rotational angle of a motor (20) for steering assist by means of the rotational-angle detection device, and control drive of the motor based on the detected rotational angle, to thereby generate a steering assist torque in accordance with a steering torque, the electric power-steering device further including control form change means (130, 1301, 1302) for changing, based on the shaft misalignment information output from the shaft misalignment information output means (S14, S25, S36, S44), a control form of the motor.

According to one embodiment of the present invention, the electric power-steering device includes the rotational-angle detection device so as to detect the rotational angle of the motor for the steering assist, and the control form change means changes the control form of the motor based on the shaft misalignment information. Thus, inappropriate steering assist caused by the occurrence of the shaft misalignment can be restrained.

The electric power-steering device according to one embodiment of the present invention has another feature in that the electric power-steering device further includes fluctuation detection means (S41 and S42) for detecting a periodic fluctuation in a physical amount caused by the occurrence of the shaft misalignment, and the shaft misalignment detection means detects the occurrence of the shaft misalignment based on the periodic fluctuation in the physical amount detected by the fluctuation detection means (S43 and S44).

When the shaft misalignment occurs in the rotational-angle detection device for the motor for the steering assist, the detection error in the motor rotational angle periodically fluctuates, and the various physical amounts fluctuate as a result. Thus, according to one embodiment of the present invention, the periodic fluctuations of the physical amounts caused by the occurrence of the shaft misalignment are detected by the fluctuation detection means, and the occurrence of the shaft misalignment is detected based on the periodic fluctuations of the physical amounts. For example, when a fluctuation width (amplitude) of the physical amount is larger than the threshold, it is determined that the shaft misalignment has occurred. Thus, according to one embodiment of the present invention, the occurrence of the shaft misalignment can be appropriately detected.

The electric power-steering device according to one embodiment of the present invention has another feature in that the fluctuation detection means acquires, as the physical amount, at least one of the steering torque, a current flowing through the motor, a control value of the motor, a steering angular velocity, an angular velocity of the motor, or an induced voltage generated on the motor (S41), and calculates an amplitude of a frequency component twice as high as a frequency of the rotational angle calculated by the rotational-angle calculation means in the physical amount (S42). The shaft misalignment detection means detects the occurrence of the shaft misalignment based on the amplitude in the physical amount calculated by the fluctuation detection means (S43 and S44).

When the shaft misalignment occurs, the detection error in the rotational angle of the motor periodically fluctuates, and the steering torque, the current flowing through the motor, the control value of the motor, the steering angular velocity, the angular velocity of the motor, and the induced voltage generated on the motor thus fluctuate as a result. The fluctuations of these physical amounts are generated at the frequency twice as high as the frequency (frequency of a change corresponding to one period of the detected rotational angle) of the rotational angle of the motor. Then, according to one embodiment of the present invention, the fluctuation detection means acquires at least one of the physical amounts, and calculates the amplitude of the frequency component twice as high as the frequency of the motor rotational angle in the physical amount. A magnitude of the amplitude corresponds to a degree of the shaft misalignment degree. The shaft misalignment detection means detects the occurrence of the shaft misalignment based on the amplitude in the physical amount calculated by the fluctuation detection means. Thus, according to one embodiment of the present invention, the occurrence of the shaft misalignment can be appropriately detected based on the amplitudes of the physical amounts generated in the electric power-steering device.

The electric power-steering device according to one embodiment of the present invention has another feature in that the rotational-angle correction means corrects the rotational angle calculated by the rotational-angle calculation means so as to reduce the amplitude in the physical amount calculated by the fluctuation detection means (S71 to S78).

According to one embodiment of the present invention, the rotational angle calculated by the rotational-angle calculation means is corrected so as to reduce the amplitude of the physical amount generated as a result of the occurrence of the shaft misalignment. Thus, when the shaft misalignment occurs, the rotational angle of the motor can be appropriately corrected.

The electric power-steering device according to one embodiment of the present invention has another feature in that the fluctuation detection means calculates, for each of the steering torque and the angular velocity of the motor, a phase of the frequency component twice as high as the frequency of the rotational angle calculated by the rotational-angle calculation means (1242, 1243). The rotational-angle correction means sets a correction direction representing a direction to increase or decrease the rotational angle based on the calculated phase of the steering torque and the calculated phase of the angular velocity of the motor (S72 to S75), and corrects the rotational angle calculated by the rotational-angle calculation means in the set correction direction.

According to one embodiment of the present invention, for each of the steering torque and the angular velocity of the motor, the phase of the frequency component twice as high as the frequency of the rotational angle calculated by the rotational-angle calculation means is calculated. For example, the value detected by a steering torque sensor may be used as the steering torque, and the angular velocity of the motor may be acquired, for example, by differentiating the rotational angle calculated by the rotational-angle calculation means. A direction of the correction (an increase or a decrease) of the rotational angle can be set based on the phase of the frequency component (hereinafter referred to as rotational second-order component) twice as high as the frequency of the rotational angle in each of the steering torque and the angular velocity of the motor. According to one embodiment of the present invention, the rotational angle can be corrected by correcting the rotational angle calculated by the rotational-angle calculation means in the correction direction. As a result, the rotational angle can be appropriately corrected.

For example, when the correction amount for correcting the rotational angle is represented by a correction waveform, the phase of the correction waveform can be acquired from the phase of the rotational second-order component in the angular velocity of the motor or the steering torque. Thus, the correction direction and the phase of the correction waveform can be set, and the amplitude of the correction waveform may be calculated so as to reduce the amplitude of the rotational second-order component in the physical amounts. As a result, the correction amount is calculated by feedback of the amplitude, thereby appropriately correcting the rotational angle.

The electric power-steering device according to one embodiment of the present invention has another feature in that, when the occurrence of the shaft misalignment is detected, the control form change means (1302, 140, 150) avoids using the rotational angle detected by the rotational-angle detection device, and carries out switching to a control form of controlling the drive of the motor by using an estimated electrical angle ($\theta e2$) estimated based on the induced voltage generated on the motor.

The electrical angle of the motor can be estimated based on the induced voltage generated on the motor. Thus, according to one embodiment of the present invention, when the occurrence of the shaft misalignment is detected, the rotational angle detected by the rotational-angle detection device is not used, and the estimated electrical angle estimated based on the induced voltage generated on the motor is used to control the drive of the motor. Thus, even when a large shaft misalignment occurs, the drive control can be provided for the motor without influence by the shaft misalignment. As a result, the steering assist can be continued, and convenience is increased.

The electric power-steering device according to one embodiment of the present invention has another feature in that the control form change means carries out, when the occurrence of the shaft misalignment is detected, switching to a control form having a reduced field weakening control amount that is set based on the angular velocity of the motor.

When the shaft misalignment occurs, the detection error occurs in the rotational angle of the motor, and, as a result, the detection accuracy of the angular velocity of the motor decreases. Moreover, the field weakening control amount is set in accordance with the angular velocity of the motor, and accuracy of the field weakening control decreases when the shaft misalignment occurs. Thus, according to one embodiment of the present invention, when the occurrence of the shaft misalignment is detected, the control form is switched to the control form where the field weakening control amount is reduced. As a result, influence by the shaft misalignment on the field weakening control can be reduced. Note that, the control form where the field weakening control amount is reduced includes a control form without the field weakening control.

The electric power-steering device according to one embodiment of the present invention has another feature in that the control form change means carries out, when the occurrence of the shaft misalignment is detected, switching to a control form having a reduced compensation torque that is added to the steering assist torque and set based on the rotational angle or the angular velocity of the motor.

When the shaft misalignment occurs, the detection error occurs in the rotational angle of the motor, and, as a result, the detection accuracy of the angular velocity of the motor decreases. The steering assist torque is set basically based on the steering torque, but there is such a case that not only the steering torque but also the compensation torque in accordance with the rotational angle or the angular velocity of the motor is added to increase the steering feeling. When the shaft misalignment occurs, the calculation accuracy of the compensation torque decreases in this case. Thus, according to one embodiment of the present invention, when the occurrence of the shaft misalignment is detected, the control form is switched to the control form where the compensation torque is reduced. As a result, influence by the shaft misalignment on the steering assist torque can be reduced.

The electric power-steering device according to one embodiment of the present invention has another feature in that the control form change means (130) stops the steering assist when the occurrence of the shaft misalignment is detected.

According to one embodiment of the present invention, when the occurrence of the shaft misalignment is detected, the control form change means stops the steering assist according to the present invention. As a result, safety can be increased. Moreover, the stop of the steering assist can cause the notification of the abnormality to a driver.

The electric power-steering device according to one embodiment of the present invention has another feature in that the electric power-steering device further includes shaft misalignment report means for reporting, when the occurrence of the shaft misalignment is detected, an abnormality to the driver in a different form corresponding to the degree of the shaft misalignment.

According to one embodiment of the present invention, the abnormality is reported to the driver in a form corresponding to the degree of the shaft misalignment, and the necessity of repair can be reported to the driver more strongly as the degree of the shaft misalignment increases.

In the description above, reference symbols used in embodiments are enclosed in parentheses, and are assigned to each configuration of the invention corresponding to the embodiments in order to more readily understand the invention, but each component of the invention is not limited to the embodiment prescribed by the reference symbols.

DESCRIPTION OF EMBODIMENTS

Figure 1:
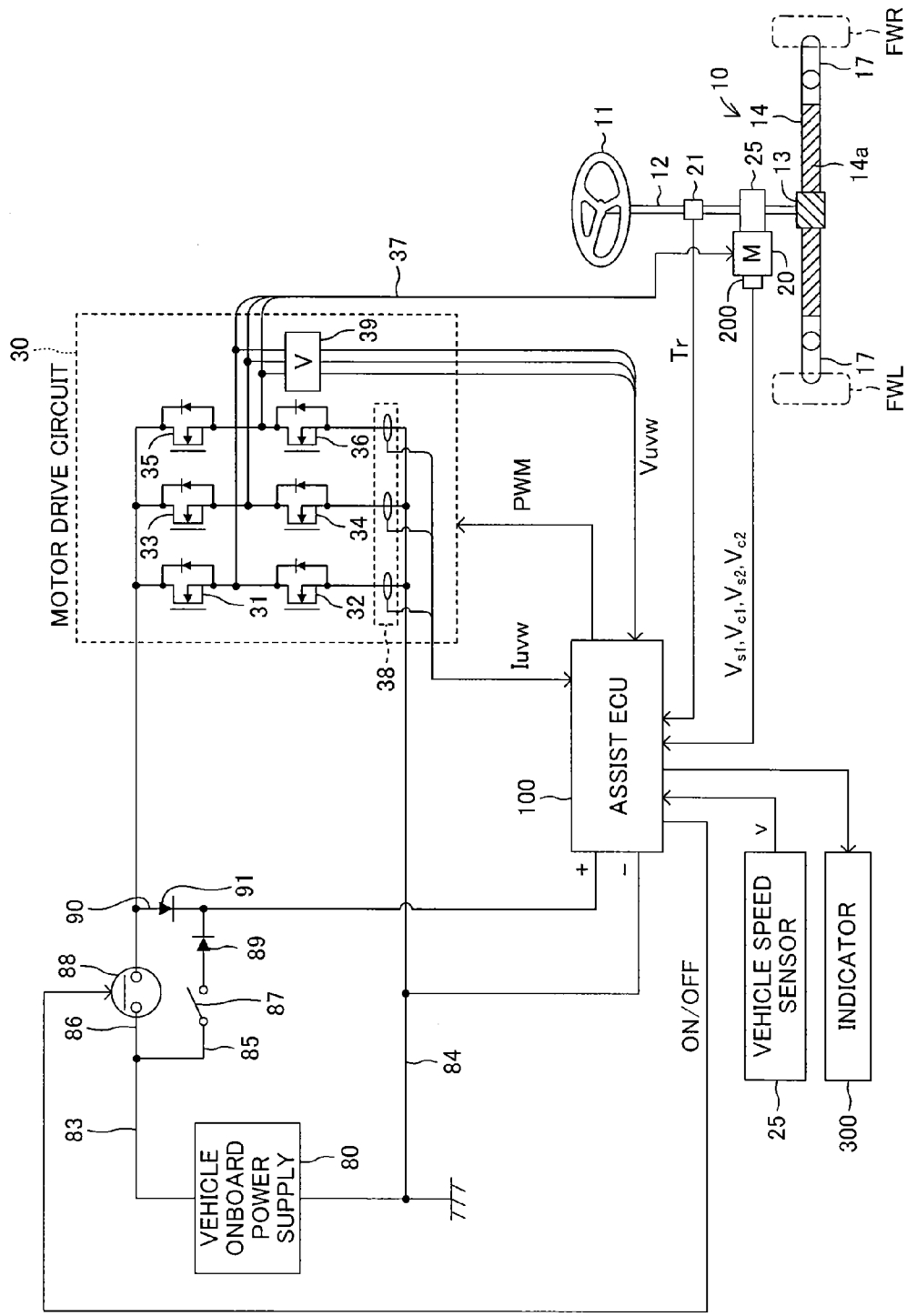
FIG. 1 is a schematic configuration diagram of an electric power-steering device including a rotational-angle detection device according to an embodiment of the present invention.

A description is now given of an electric power-steering device including a rotational-angle detection device according to an embodiment of the present invention with reference to the drawings. FIG. 1 illustrates a schematic configuration of the electric power-steering device according to the embodiment.

The electric power-steering device includes, as main components, a steering mechanism 10 for turning steered wheels as a result of a steering operation on a steering wheel 11, a motor 20 assembled to the steering mechanism 10 so as to generate a steering assist torque, a motor drive circuit 30 for driving the motor 20, and an electronic control device 100 for controlling an operation of the motor 20. In the following, the electronic control device 100 is referred to as the assist ECU 100.

The steering mechanism 10 is a mechanism for turning left and right front wheels FWL and FWR as a result of the rotating operation on the steering wheel 11, and includes a steering shaft 12 having a top end connected to the steering wheel 11 so as to integrally rotate therewith. A pinion gear 13 is connected for integral rotation to a bottom end of the steering shaft 12. The pinion gear 13 meshes with rack teeth 14a formed on a rack bar 14, and constructs a rack-and-pinion mechanism together with the rack bar 14. Knuckles (not shown) of the left and right front wheels FWL and FWR are connected via tie rods 17 to both ends of the rack bar 14. The left and right front wheels FWL and FWR are steered left and right in response to a displacement in an axial direction of the rack bar 14 caused by the rotation about an axis of the steering shaft 12.

The motor 20 is assembled via a speed reduction gear 25 to the steering shaft 12. The rotation of the motor 20 rotationally drives the steering shaft 12 about the axis thereof via the speed reduction gear 25, thereby imparting an assist force to the rotating operation of the steering wheel 11. The motor 20 is a three-phase brushless motor.

A steering torque sensor 21 is provided on the steering shaft 12. The steering torque sensor 21 detects a torsion angle of a torsion bar (not shown) interposed in an intermediate portion of the steering shaft 12, and detects a steering torque Tr acting on the steering shaft 12 based on the torsion angle. A polarity of the steering torque Tr identifies a steering direction of the steering wheel 11. For example, the steering torque Tr during the steering toward the right of the steering wheel 11 is represented by a positive value, and the steering torque Tr during the steering toward the left of the steering wheel 11 is represented by a negative value.

A rotational-angle sensor 200 is provided on the motor 20. The rotational-angle sensor 200 is provided on one end of a rotary shaft of the motor 20, and outputs four detection signals Vs1, Vc1, Vs2, and Vc2, which periodically change in voltage value as the rotary shaft of the motor 20 rotates, to the assist ECU 100. The assist ECU 100 calculates the rotational angle of the motor 20 based on the detection signals Vs1, Vc1, Vs2, and Vc2, and acquires an electrical angle θe of the motor 20 from the rotational angle.

The motor drive circuit 30 constitutes a three-phase inverter circuit by using six switching devices 31 to 36 including metal oxide semiconductor field effect transistors (MOS-FETs). Specifically, the following configuration is employed. A circuit for serially connecting the first switching device 31 and the second switching device 32 to each other, a circuit for serially connecting the third switching device 33 and the fourth switching device 34 to each other, and a circuit for serially connecting the fifth switching device 35 and the sixth switching device 36 to each other are connected in parallel, and electric power supply lines 37 are pulled out respectively from intermediate portion between the two switching devices (31 and 32, 33 and 34, and 35 and 36) of each of the serial circuits to the motor 20 is employed.

A current sensor 38 for detecting currents flowing through the motor 20 is provided in the motor drive circuit 30. The current sensor 38 detects currents flowing through respective phases (U phase, V phase, and W phase), and outputs detection signals corresponding to detected current values Iu, Iv, and Iw to the assist ECU 100. In the following, the measured current values in three phases are generally referred to as motor current Iuvw. Moreover, a voltage sensor 39 for detecting terminal voltages of the motor 20 is provided in the motor drive circuit 30. The voltage sensor 39 detects terminal voltages of the respective phases (U phase, V phase, and W phase), and outputs detection signals corresponding to the detected voltages Vu, Vv, and Vw to the assist ECU 100. In the following, the measured terminal voltages in the three phases are generally referred to as motor terminal voltage Vuvw.

Gates of the respective switching devices 31 to 36 of the motor drive circuit 30 are respectively connected to the assist ECU 100, and a duty ratio is controlled by PWM control signals output from the assist ECU 100. As a result, the drive voltage of the motor 20 is adjusted to a target voltage.

The assist ECU 100 includes, as a main component, a microcomputer including a CPU, a ROM, and a RAM. The assist ECU 100 is connected to the steering torque sensor 21, the rotational-angle sensor 200, the current sensor 38, the voltage sensor 39, and a vehicle speed sensor 25 for detecting a vehicle speed to input respective detection signals thereof. Then, the assist ECU 100 calculates an instruction current to be flown through the motor 20 so that an optimum steering assist torque (hereinafter simply referred to as assist torque) is acquired in response to the steering operation by the driver, and controls the duty ratio of the switching devices 31 to 36 of the motor drive circuit 30 so that the instruction current flows.

The motor 20 is driven by means of feedback control for the current flowing through the motor 20 as described later.

Thus, the voltage sensor 39 is not always necessary, but is used when a state of supplying the motor drive circuit 30 with an electric power is diagnosed, when whether the respective switching devices 31 to 36 are normal or abnormal is diagnosed, and when rotational-angle sensorless control described later is provided.

A vehicle onboard power supply device 80 supplies the electric power-steering device with the electric power via a power supply source line 38 and a ground line 84. The power supply source line 83 branches to a control system power supply line 85 and a drive system power supply line 86. An ignition switch 87 is connected to the control system power supply line 85, and a main power supply relay 88 is connected to the drive system power supply line 86. The main power supply relay 88 is turned on by a control signal from the assist ECU 100, thereby forming a power supply circuit to the motor 20. The drive system power supply line 86 is connected to the control system power supply line 85 via a coupling line 90 on a secondary side (load side) of the main power supply relay 88. Diodes 89 and 91 for restricting the flow of currents to one direction are provided on the control system power supply line 85 and the coupling line 90 so as to prevent the current flowing through the control system power supply line 85 from flowing to the drive system power supply line 86. Thus, the control system power supply line 85 functions as a power supply line for supplying the assist ECU 100 with the electric power, and the drive system power supply line 86 functions as a power supply line for supplying both the motor drive circuit 30 and the assist ECU 100 with the electric power.

A description is now given of control for the motor 20 carried out by the assist ECU 100. The assist ECU 100 controls the rotation of the motor 20 by means of the current vector control using the d-q coordinate system where the d axis is defined in the direction in which a magnetic field of a permanent magnet provided on a rotor of the motor 20 passes through, and the q axis is defined in the direction orthogonal to the d axis (direction leading by $\pi/2$ in an electrical angle with respect to the d axis). The electrical angle θe is represented by an angle formed by an axis passing through a U-phase coil of the motor 20 and the d axis. A d-axis component of a current vector is referred to as d-axis current, and a q-axis component thereof is referred to as q-axis current. The q-axis current acts to generate a magnetic field in the q-axis direction. Thus, the q-axis current generates the motor torque. On the other hand, the d-axis current generates a magnetic field in the d-axis direction, thus does not generate the motor torque, and is used for the field weakening control.

The assist ECU 100 defines the d-q coordinate axes by detecting the electrical angle θe in order to carry out the current vector control. The electrical angle θe is acquired from a motor rotational angle θ calculated based on the detection signals Vs1, Vc1, Vs2, and Vc2 output by the rotational-angle sensor 200.

Figure 2:
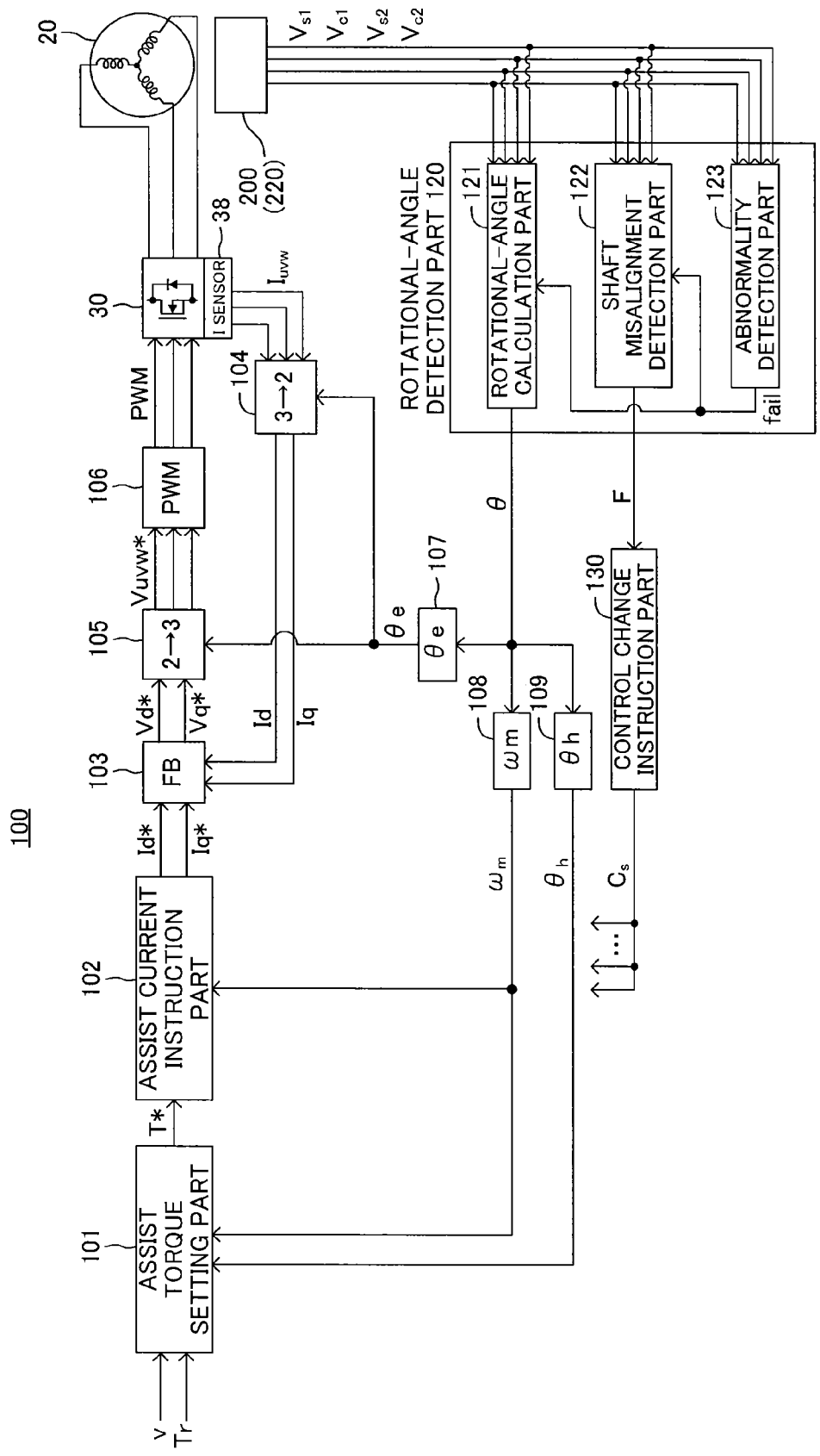
FIG. 2 is a functional block diagram illustrating processing by a microcomputer of an assist ECU according to a first embodiment of the present invention.

Referring to FIG. 2, a description is now given of functions of the assist ECU 100. FIG. 2 is a functional block diagram illustrating functions processed by program control by the microcomputer in the assist ECU 100. Respective functional parts repeat the processing at a predetermined short calculation period. The assist ECU 100 includes an assist torque setting part 101. The assist torque setting part 101 calculates a base assist torque Ta and compensation torques Tb1 and Tb2, and sums them to set a target assist torque T* (T*=Ta+Tb1+Tb2).

Figure 3:
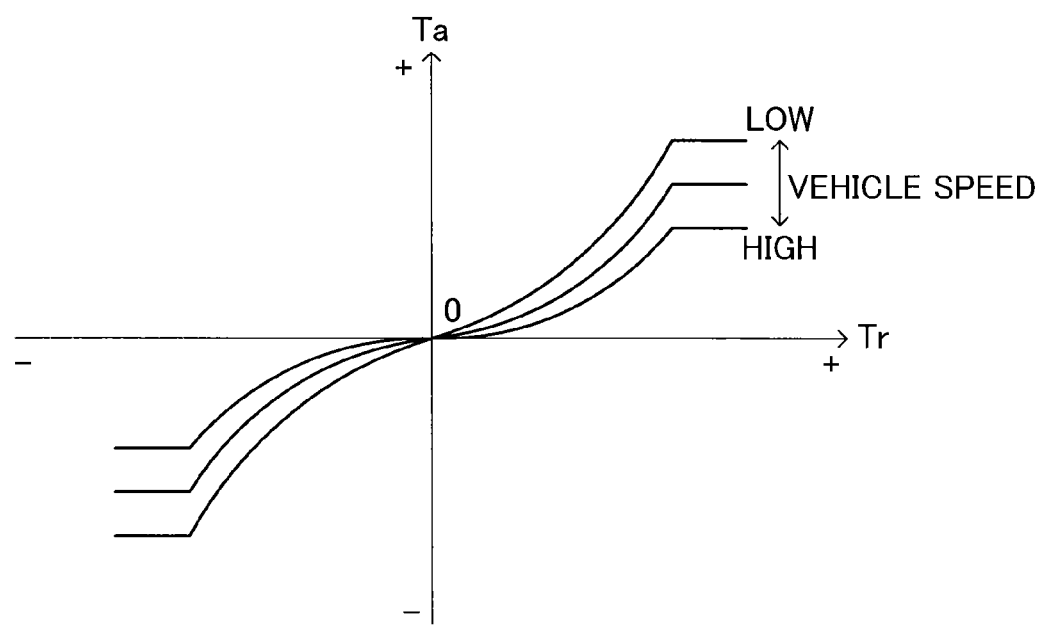
FIG. 3 is a chart showing a base assist map.
Figure 4:
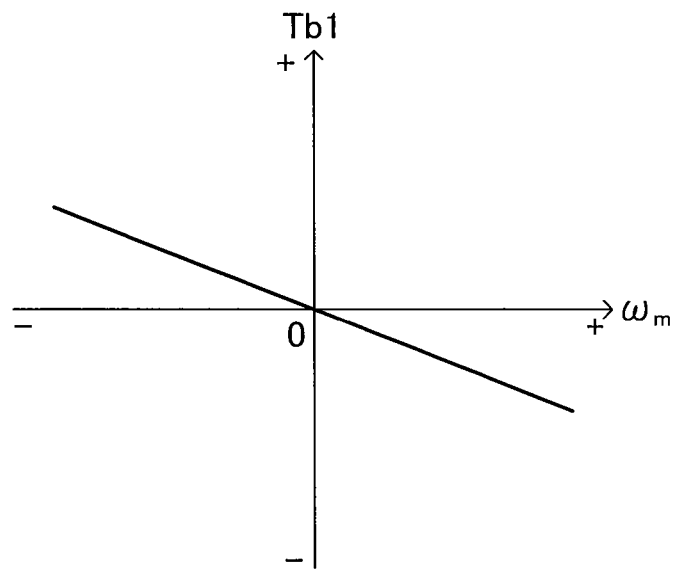
FIG. 4 is a chart showing a damping compensation torque map.
Figure 5:
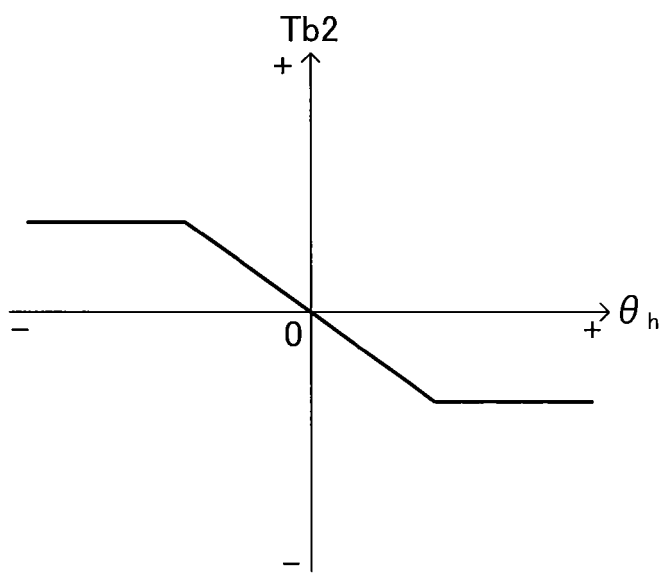
FIG. 5 is a chart showing a return compensation torque map.

The assist torque setting part 101 stores a base assist map shown in FIG. 3, a damping compensation torque map shown in FIG. 4, and a return compensation torque map shown in FIG. 5. The base assist map is association data for setting a relationship between the steering torque Tr and the base assist torque Ta for a plurality of respective representative vehicle speeds v, and has a characteristic of setting the base assist torque Ta which increases as a magnitude (absolute value) of the steering torque Tr increases, and decreases as the vehicle speed v increases. The damping compensation torque map is association data for setting a relationship between an angular velocity ωm of the motor 20 corresponding to a steering speed and a damping compensation torque Tb1, and has a characteristic of setting the damping compensation torque Tb1 which increases in an absolute value as an absolute value of the angular velocity ωm increases. The damping compensation torque Tb1 is set so as to act in a direction opposite to that of the base assist torque Ta.

Moreover, the return compensation torque map is association data for setting a relationship between a steering angle θh and a return compensation torque Tb2, and has a characteristic of setting the return compensation torque Tb2 which increases in an absolute value as an absolute value of the steering angle θh increases. The return compensation torque Tb2 is set so as to act in a direction opposite to that of the base assist torque Ta. An upper limit restriction is set for the return compensation torque Tb2 in this example, but an upper limit restriction may also be set for the damping compensation torque Tb1 similarly to the return compensation torque Tb2.

The assist torque setting part 101 inputs the vehicle speed v detected by the vehicle speed sensor 25, the steering torque Tr detected by the steering torque sensor 21, the angular velocity ωm calculated by an angular velocity calculation part 108 described later, and the steering angle θh calculated by a steering angle calculation part 109 described later, refers to the three maps, and calculates the target assist torque T*.

The assist torque setting part 101 outputs the calculated target assist torque T* to an assist current instruction part 102. The assist current instruction part 102 calculates a q-axis instruction current Iq* in the d-q coordinate system by dividing the target assist torque T* by a torque constant. Moreover, the assist current instruction part 102 stores a d-axis instruction current map shown in FIG. 6, refers to the d-axis instruction current map, and calculates a d-axis instruction current Id* based on the angular velocity ωm calculated by the angular velocity calculation part 108. The d-axis instruction current map has such a characteristic as to increase the d-axis instruction current Id* as the angular velocity ωm increases, and limits the d-axis instruction current Id* to an upper limit value when the angular velocity ωm is equal to or more than a predetermined reference value. The d-axis instruction current Id* is used for field weakening.

The q-axis instruction current Iq* and the d-axis instruction current Id* calculated in this way are output to a feedback control part 103. The feedback control part 103 calculates a deviation ΔIq by subtracting a q-axis actual current Iq from the q-axis instruction current Iq*, and calculates a q-axis instruction voltage Vq* so that the q-axis actual current Iq follows the q-axis instruction current Iq* by means of the proportional-integral control using the deviation ΔIq. Similarly, the feedback control part 103 calculates a deviation ΔId by subtracting a d-axis actual current Id from the d-axis instruction current Id*, and calculates a d-axis instruction voltage Vd* so that the d-axis actual current Id follows the d-axis instruction current Id* by means of the proportional-integral control using the deviation ΔId.

The q-axis actual current Iq and the d-axis actual current Id are acquired by transforming the detected values of the three-phase currents, Iu, Iv, and Iw, which actually flow through the coils of the motor 20 into the two-phase currents on the d-q coordinate. The transformation from the three-phase currents Iu, Iv, and Iw into the two-phase currents Id and Iq in the d-q coordinate is carried out by a 3-phase/2-phase coordinate transformation part 104. The 3-phase/2-phase coordinate transformation part 104 inputs the electrical angle θe output from an electrical angle calculation part 107 described later, and transforms the 3-phase currents Iu, Iv, and Iw detected by the current sensor 38 into the 2-phase currents Id and Iq in the d-q coordinate system based on the electrical angle θe.

A transformation matrix C for transforming from the three-phase coordinate system to the d-q coordinate system is represented by the following expression (1).

$$C = \sqrt{\frac{2}{3}} \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \quad (1)$$

The q-axis instruction voltage Vq* and the d-axis instruction voltage Vd* calculated by the feedback control part 103 are output to the 2-phase/3-phase coordinate transformation part 105. The 2-phase/3-phase coordinate transformation part 105 transforms the q-axis instruction voltage Vq* and the d-axis instruction voltage Vd* into 3-phase instruction voltages Vu*, Vv*, and Vw* based on the electrical angle θe output from the electrical angle calculation part 107, and outputs the transformed 3-phase instruction voltages Vu*, Vv*, and Vw* to the PWM signal generation part 106. The PWM signal generation part 106 outputs PWM control signals corresponding to the 3-phase instruction voltages Vu*, Vv*, and Vw* to the switching devices 31 to 36 of the motor drive circuit 30. As a result, the motor 20 is driven, and the assist torque following the target assist torque T* is imparted to the steering mechanism 10.

The assist ECU 100 includes a rotational-angle detection part 120 for detecting the motor rotational angle θ based on the detection signals Vs1, Vc1, Vs2, and Vc2 output by the rotational-angle sensor 200. A detailed description is later given of the rotational-angle sensor 200 and the rotational-angle detection part 120. The rotational-angle detection part 120 outputs the motor rotational angle θ acquired by the calculation to the electrical angle calculation part 107, the angular velocity calculation part 108, and the steering angle calculation part 109, and outputs a shaft misalignment determination flag F to a control change instruction part 130. The electrical angle calculation part 107 inputs the motor rotational angle θ output from the rotational-angle detection part 120, and transforms the motor rotational angle θ into the electrical angle θe of the motor 20. Then, the electrical angle calculation part 107 outputs the electrical angle θe to the 3-phase/2-phase coordinate transformation part 104 and the 2-phase/3-phase coordinate transformation part 105.

The angular velocity calculation part 108 inputs the motor rotational angle θ output from the rotational-angle detection part 120, and differentiates the motor rotational angle θ with respect to time, thereby acquiring the angular velocity ωm, which is the motor rotational velocity. The angular velocity calculation part 108 outputs the angular velocity ωm acquired by the calculation to the assist torque setting part 101 and the assist current instruction part 102. The steering angle calculation part 109 inputs the motor rotational angle θ output from the rotational-angle detection part 120, and acquires the steering angle θh based on an angle of rotation of the motor 20 from a neutral position as a reference, which is a position of the steering wheel 11 at which the vehicle travels straight.

The shaft misalignment determination flag F output from the rotational-angle detection part 120 to the control change instruction part 130 represents a state where "shaft misalignment is absent" by F=0, and represents a state where "shaft misalignment is present" by F=1. The control change instruction part 130 inputs the shaft misalignment determination flag F, and outputs an instruction signal Cs instructing permission/inhibition of the steering assist to the respective functional parts 101 to 109 for administrating the steering assist control depending on the shaft misalignment determination flag F.

The control change instruction part 130 uses the instruction signal Cs, and permits the steering assist when the shaft misalignment determination flag F is "0", and inhibits the steering assist when the shaft misalignment determination flag F is "1". When the steering assist is permitted by the instruction signal Cs, the respective functional parts 101 to 109 carry out the processing described above, and when the steering assist is inhibited, the respective functional parts 101 to 109 stop the processing described above. Thus, when the shaft misalignment determination flag F is "1", the steering assist is stopped.

When the shaft misalignment determination flag F is "1", the control change instruction part 130 may carry out such processing as to switch an open/close relay (not shown) provided on the power supply line 37 to the off state, or such processing as to switch the main power supply relay 88 to the off state in place of or in addition to the processing described above, thereby shutting off the power supply to the motor 20.

Figure 7:
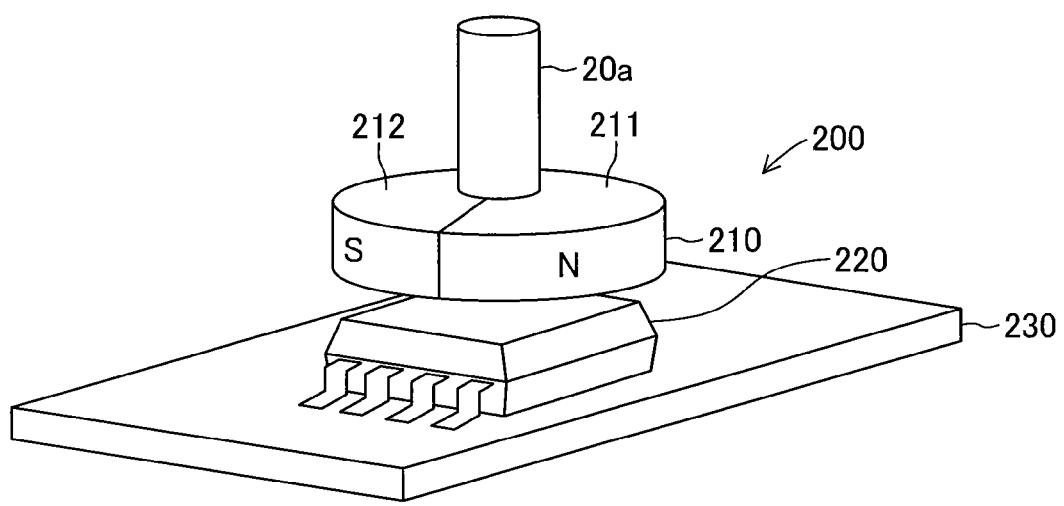
FIG. 7 is a schematic perspective view of a rotational-angle sensor.

As illustrated in FIG. 7, the rotational-angle sensor 200 includes a magnet part 210 mounted in a fixed manner to one end of a rotary shaft 20a of the motor 20 and a sensor part 220 provided to oppose the magnet part 210. The sensor part 220 is provided on a base plate 230 fixed so as to prevent a relative position to a casing (not shown) of the motor 20 from changing. The magnet part 210 is a magnetic member in a disc shape provided coaxially with the rotary shaft 20a of the motor 20. A half area 211 (semicircular area) is magnetized as the N pole and a remaining half area 212 (semicircular area) is magnetized as the S pole.

Figure 8:
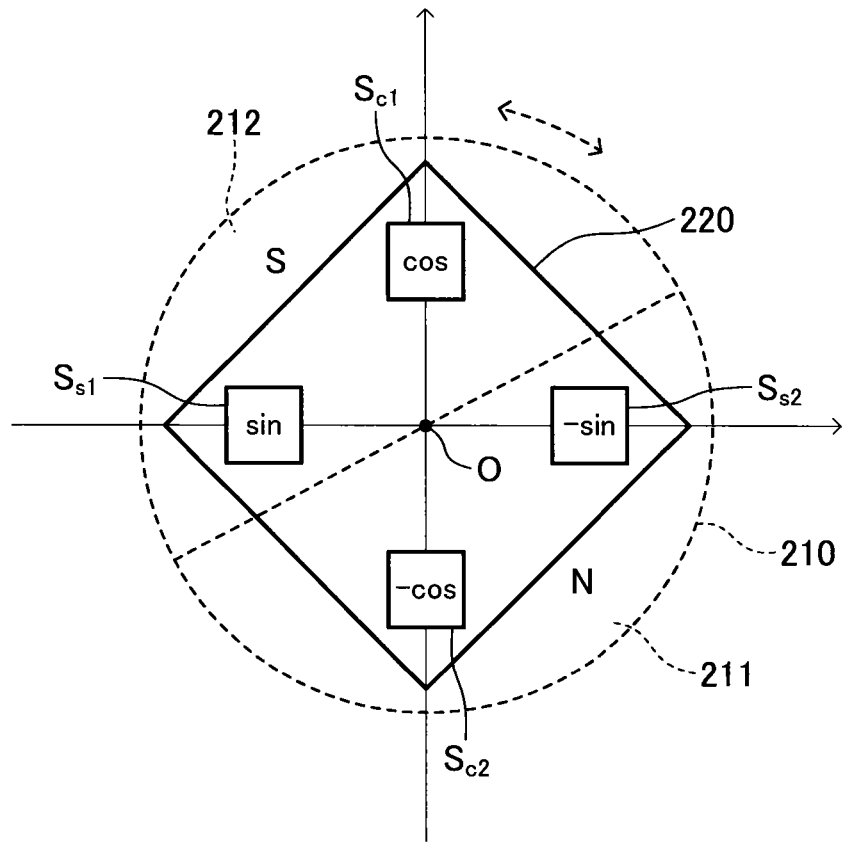
FIG. 8 is a conceptual diagram illustrating an arrangement of respective MR sensors on a planar coordinate.

The sensor part 220 is arranged so as to be separated by a predetermined gap in the axial direction of the rotary shaft 20a of the motor 20 with respect to a plane in a disk shape of the magnet part 210. In the following, the axial direction of the rotary shaft 20a of the motor 20 is simply referred to as axial direction, and a radial direction of the rotary shaft 20a of the motor 20 is simply referred to as radial direction. The sensor part 220 incorporates four MR sensors Ss1, Sc1, Ss2, and Sc2. FIG. 8 is a conceptual diagram illustrating an arrangement of the respective MR sensors Ss1, Sc1, Ss2, and Sc2 on a planar coordinate. In FIG. 8, reference symbol O represents a rotational center of the magnet part 210. In the following, when an MR sensor is not identified as which one of the MR sensors Ss1, Sc2, Ss2, and Sc2, the MR sensor is simply referred to as MR sensor S.

Figure 9:
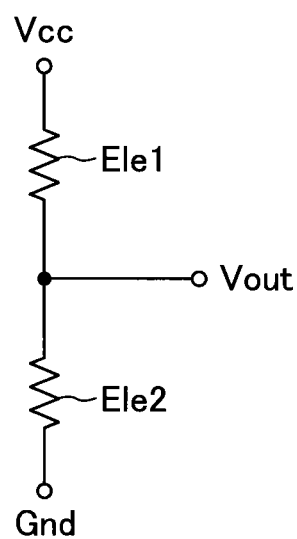
FIG. 9 is an equivalent circuit diagram of the MR sensor.

The MR sensor S includes a Si or glass substrate, and a thin film made of an alloy containing a ferromagnetic metal such as Ni and Fe as a main component, and formed thereon. The MR sensor S uses such a characteristic that the electric resistance value of the thin film ferromagnetic metal changes depending on the intensity of the magnetic field in a specific direction. The each MR sensor S includes two thin film ferromagnetic metal elements (magnetoresistance effect devices). The respective elements Ele1 and Ele2 are serially connected with each other as illustrated in FIG. 9. A voltage Vcc is applied between both ends thereof (a voltage is applied between a terminal of one serially connected element Ele1 and a terminal of the other element Ele2), and a voltage signal Vout representing an electric potential at a connection point of the two elements Ele1 and Ele2 is output.

The two elements Ele1 and Ele2 are arranged so as to be different in arrangement direction from each other. In other words, the two elements Ele1 and Ele2 are arranged so as to be different in a characteristic of change in the electric resistance value with respect to the direction of a magnetic field acting on the elements Ele1 and Ele2. Therefore, when the magnet part 210 rotates, and the direction of the magnetic field acting on the respective elements Ele1 and Ele2 rotates, the voltage of the output signal of the MR sensor S fluctuates in synchronous therewith. The voltage fluctuation component changes in a sine waveform depending on the rotational angle of the motor 20. A magnet for bias (not shown) fixed on a rear surface of the base plate 230 is provided, and, consequently, a composite magnetic field of the magnet part 210 and the magnet for bias thus acts on the MR sensor S according to this embodiment. As a result, the MR sensor S outputs the voltage signal in the sine waveform for one period in response to one rotation of the rotary shaft 20a of the motor 20a.

The four MR sensors Ss1, Sc1, Ss2, and Sc2 in the sensor part 220 output periodic signals having the voltage changing in the sine waveform as the motor 20 rotates, and are arranged so that the voltage waveforms of the output signals are shifted in the phase by $\pi/2$ from one another. Each of the MR sensors S outputs the voltage signal which is a sum of a voltage of a half of the voltage Vcc applied between the elements Ele1 and Ele2 serially connected to each other and the voltage fluctuation component in the sine waveform, but only the voltage fluctuation component is used to calculate the rotational angle, and the DC component (Vcc/2) is the same voltage for all the MR sensors Sc1, Sc2, Sc2, and Sc2, and is not used for the calculation of the rotational angle. Therefore, in the following, for the sake of simple description, the output signal of each of the MR sensors Ss1, Sc1, Ss2, and Sc2 is described as a signal of the voltage fluctuation component changing in the sine waveform. In other words, the value offset by the DC component (Vcc/2) with respect to the actual output voltage is described as the output signal of each of the MR sensors Ss1, Sc1, Ss2, and Sc2.

When the output voltage of the MR sensor Ss1 is denoted as Vs1; the MR sensor Sc1, Vc1; the MR sensor Ss2, Vs2; and the MR sensor Sc2, Vc2, the output voltages Vs1, Vc1, Vs2, and Vc2 are represented by the following expressions (2) to (5).

$$Vs1 = \alpha \cdot \sin \theta \quad (2)$$

$$Vc1 = \alpha \cdot \cos \theta \quad (3)$$

$$Vs2 = -\alpha \cdot \sin \theta \quad (4)$$

$$Vc2 = -\alpha \cdot \cos \theta \quad (5)$$

On this occasion, $\alpha$ denotes a voltage amplitude. Moreover, $\theta$ denotes an angle of the rotation of the magnet part 210 from a relative rotation reference position set in advance between the magnet part 210 and the sensor part 220. When the MR sensor S is a type configured so that the output signal thereof fluctuates at N periods (N: natural number) with respect to one rotation of the motor 20, the actual rotational angle of the rotary shaft 20a of the motor 20 is calculated as 1/N of the motor rotational angle $\theta$. In the following, a description is given while assuming that $\theta$ in the output signal of the MR sensor S is the motor rotational angle $\theta$.

The sensor part 220 outputs the detection signals representing the output voltages Vs1, Vc1, Vs2, and Vc2 of the respective MR sensors Ss1, Sc1, Ss2, and Sc2 to the assist ECU 100. The assist ECU 100 includes the rotational-angle detection part 120 as a functional part of the microcomputer relating to the detection of the motor rotational angle $\theta$. The rotational-angle detection part 120 is a functional part for detecting the motor rotational angle $\theta$ by means of calculation from the output voltages Vs1, Vc1, Vs2, and Vc2 of the respective MR sensors Ss1, Sc1, Ss2, and Sc2. Thus, the rotational-angle sensor 200 and the rotational-angle detection part 120 constitute a rotational-angle detection device. The rotational-angle detection part 120 is provided as the function of the microcomputer of the assist ECU 100 according to this embodiment, but the rotational-angle detection part 120 may not be provided inside the assist ECU 100, but an independent microcomputer storing a control program for the rotational-angle detection may be provided, and the microcomputer may detect the motor rotational angle $\theta$ by means of calculation.

The rotational-angle detection part 120 includes a rotational-angle calculation part 121 for inputting the output voltages Vs1, Vc1, Vs2, and Vc2 of the respective MR sensors Ss1, Sc1, Ss2, and Sc2, and calculating the motor rotational angle $\theta$ based on the output voltages Vs1, Vc1, Vs2, and Vc2, a shaft misalignment detection part 122 for detecting the occurrence of the shaft misalignment representing the state where the relative position between the magnet part 210 and the sensor part 220 in the rotational-angle sensor 200 is misaligned in the axial direction, and an abnormality detection part 123 for detecting an abnormality in the respective MR sensors Ss1, Sc1, Ss2, and Sc2.

The rotational-angle calculation part 121 acquires the motor rotational angle $\theta$ by the calculation by using the following method. On this occasion, a description is given of two examples of calculation processing, but the rotational-angle calculation part 121 may carry out the calculation by means of one of the methods. In any of the examples, an arctangent is calculated by using the sine signals and the cosine signals of the output signals of the sensor part 220, thereby calculating the motor rotational angle $\theta$.

<Calculation Processing 1 for Motor Rotational Angle>

A voltage difference Vs1–s2 representing a difference (Vs1−Vs2) between the output voltage Vs1 of the MR sensor Ss1 and the output voltage Vs2 of the MR sensor Ss2 and a voltage difference Vc1–c2 representing a difference (Vc1−Vc2) between the output voltage Vc1 of the MR sensor Sc1 and the output voltage Vc2 of the MR sensor Sc2 are represented by the following expressions (6) and (7).

$$Vs1-s2 = \alpha \cdot \sin \theta - (-\alpha \cdot \sin \theta) = 2\alpha \cdot \sin \theta \quad (6)$$

$$Vc1-c2 = \alpha \cdot \cos \theta - (-a \cdot \cos \theta) = 2\alpha \cdot \cos \theta \quad (7)$$

Thus, the motor rotational angle $\theta$ is calculated by using the following expression (8).

$$\theta = \tan^{-1}(\sin \theta / \cos \theta) = \tan^{-1}(Vs1-s2/Vc1-c2) \quad (8)$$

The rotational-angle calculation part 121 inputs the detection signals (output voltages Vs1, Vc1, Vs2, and Vc2) output by the respective MR sensors Ss1, Sc1, Ss2, and Sc2, and calculates the motor rotational angle θ based on the detection signals by using the expression (8).

Two solutions are acquired by the calculation for the motor rotational angle θ by using the expression (8). When sin θ and cos θ are positive, an angle θ in the first quadrant (0° to 90°) is selected, when sin θ is positive and cos θ is negative, an angle θ in the second quadrant (90° to 180°) is selected, when sin θ and cos θ are negative, an angle θ in the third quadrant (180° to) 270° is selected, and when sin θ is negative and cos θ is positive, an angle θ in the fourth quadrant (270° to 360°) is selected. In the following, the calculation of the arctangent is carried out based on this configuration.

<Calculation Processing 2 for Motor Rotational Angle>

The detection signals of the two MR sensors S shifted from each other in the phase by π/2 out of the four MR sensors Ss1, Sc1, Ss2, and Sc2 are used in calculation processing 2. For example, when the output voltage Vs1 of the MR sensor Ss1 and the output voltage Vc1 of the MR sensor Sc1 are used, the motor rotational angle θ can be calculated by the following expression (9).

$$\theta = \tan^{-1}(\sin\theta/\cos\theta) = \tan^{-1}(Vs1/Vc1) \quad (9)$$

Further, when the output voltage Vs2 of the MR sensor Ss2 and the output voltage Vc2 of the MR sensor Sc2 are used, the motor rotational angle θ can be calculated by the following expression (10).

$$\theta = \tan^{-1}(\sin\theta/\cos\theta) = \tan^{-1}(Vs2/Vc2) \quad (10)$$

Further, when the output voltage Vs1 of the MR sensor Ss1 and the output voltage Vc2 of the MR sensor Sc2 are used, the motor rotational angle θ can be calculated by the following expression (11).

$$\theta = \tan^{-1}(\sin\theta/\cos\theta) = \tan^{-1}(Vs1/-Vc2) \quad (11)$$

Further, when the output voltage Vc1 of the MR sensor Sc1 and the output voltage Vs2 of the MR sensor Ss2 are used, the motor rotational angle θ can be calculated by the following expression (12).

$$\theta = \tan^{-1}(\sin\theta/\cos\theta) = \tan^{-1}(-Vs2/Vc1) \quad (12)$$

The rotational-angle calculation part 121 inputs the two detection signals shifted from each other in the phase by π/2 out of the detection signals output by the respective MR sensors S, and uses any one of the four expressions to calculate the motor rotational angle θ based on the voltage values of the detection signals.

The calculation processing 1 can carry out the calculation by using twice as many voltage values as that of the calculation processing 1, and a resolution of the motor rotational angle θ to be calculated can be increased. Thus, the rotational-angle calculation part 121 calculates the motor rotational angle θ by means of the calculation processing 1 in a normal state, and, when the abnormality detection part 123 detects an abnormality in any of the four MR sensors S, the rotational-angle calculation part 121 calculates the motor rotational angle θ by using the two detection signals of the normal MR sensors S by means of the calculation processing 2 according to this embodiment.

A description is now given of the shaft misalignment detection part 122. Regarding the processing by the shaft misalignment detection part 122, a description is given of four examples (shaft misalignment detection processing 1 to 4), and the shaft misalignment detection part 122 may use one of them.

<Shaft Misalignment Detection Processing 1>

Figure 10:
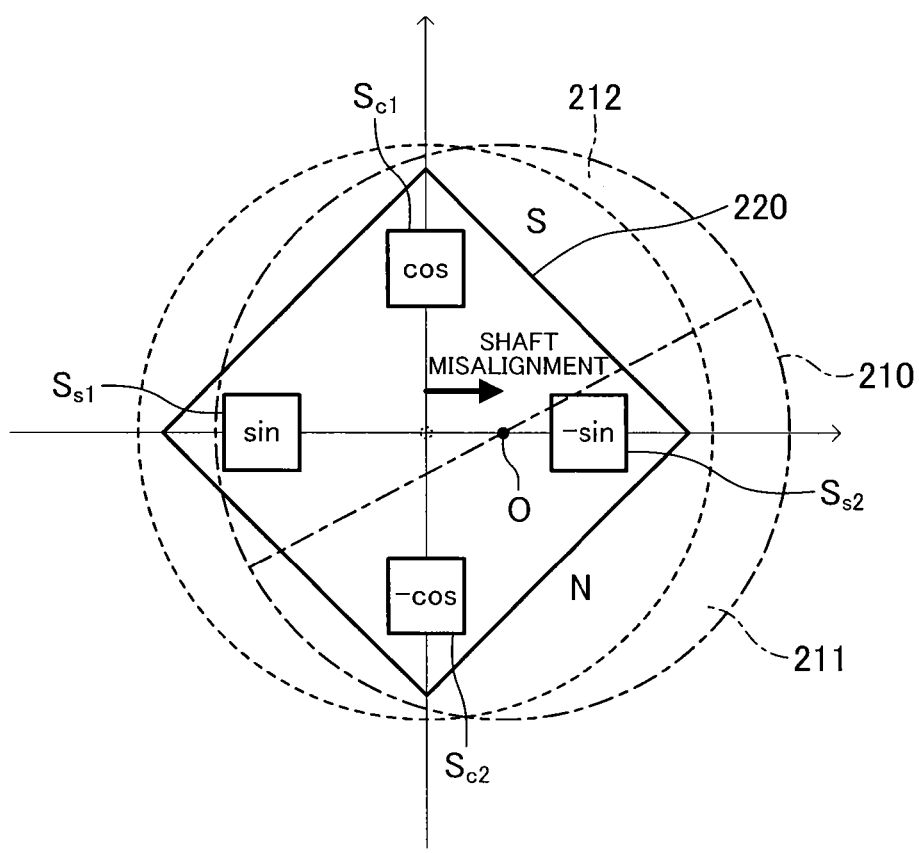
FIG. 10 is a conceptual diagram illustrating a shaft misalignment between a sensor part and a magnet part.
Figure 11:
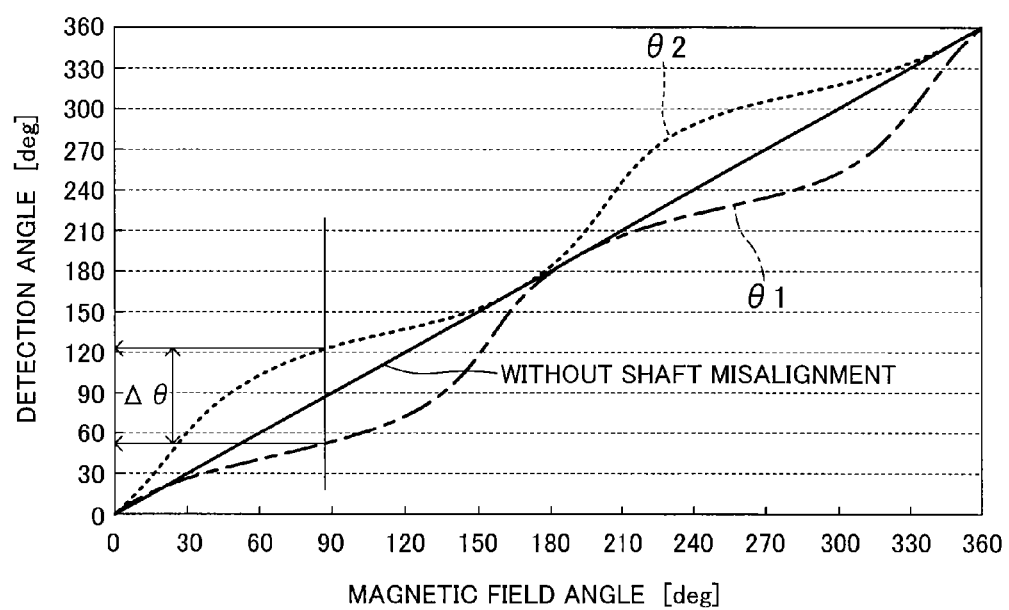
FIG. 11 is a chart showing a detection angle detected by the MR sensors.

FIG. 10 is a conceptual diagram representing the shaft misalignment between the sensor part 220 and the magnet part 210. This diagram illustrates such an example that the rotational center O of the magnet part 210, namely, the center O of the rotary shaft 20a of the motor 20 is misaligned toward the MR sensor Ss2 side with respect to the reference position of the sensor part 220. In this case, for example, when the motor rotational angle calculated based on the expression (9) by using the output voltage Vs1 of the MR sensor Ss1 and the output voltage Vc1 of the MR sensor Sc1 is set as a first detection angle θ1, and the motor rotational angle calculated based on the expression (10) by using the output voltage Vs2 of the MR sensor Ss2 and the output voltage Vc2 of the MR sensor Sc2 is set as a second detection angle θ2, in the case where the shaft misalignment occurs as illustrated in FIG. 10, the first detection angle θ1 and the second detection angle θ2 change with respect to the angle of the magnetic field acting on the sensor part 220 while presenting a characteristic shown in FIG. 11.

Figure 12:
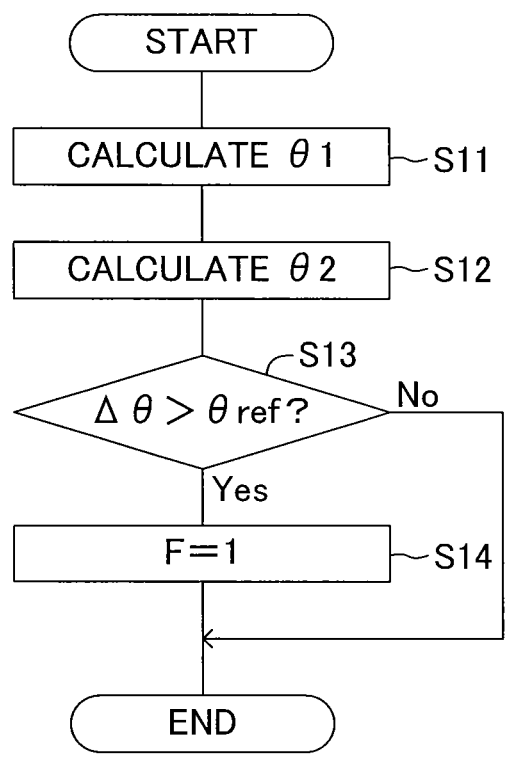
FIG. 12 is a flowchart illustrating a shaft misalignment detection routine (shaft misalignment detection processing 1).

This characteristic is used to detect the occurrence of the shaft misalignment in the shaft misalignment detection processing 1. FIG. 12 illustrates a shaft misalignment detection routine executed by the shaft misalignment detection part 122 (functional part of the microcomputer) of the assist ECU 100 as the shaft misalignment detection processing 1. The shaft misalignment detection routine is repeatedly executed at a predetermined period. In Step S11, the shaft misalignment detection part 122 first reads the output voltage Vs1 of the MR sensor Ss1 and the output voltage Vc1 of the MR sensor Sc1, and calculates the first detection angle θ1 by using the expression (9). Then, in Step S12, the shaft misalignment detection part 122 reads the output voltage Vs2 of the MR sensor Ss2 and the output voltage Vc2 of the MR sensor Sc2, and calculates the second detection angle θ2 by using the expression (10).

Then, in Step S13, the shaft misalignment detection part 122 calculates a deviation Δθ(=|θ1−θ2|) between the first detection angle θ1 and the second detection angle θ2, and determines whether the deviation Δθ is larger than a determination threshold θref or not. The determination threshold θref is a reference for determining absence/presence of the occurrence of the shaft misalignment, and is set in advance. When the deviation Δθ is larger than the determination threshold θref, in Step S14, the shaft misalignment detection part 122 sets the shaft misalignment determination flag F to "1", and finishes the shaft misalignment detection routine. On the other hand, when the deviation Δθ is equal to or smaller than the determination threshold θref, the shaft misalignment detection part 122 skips the processing in Step S14, and finishes the shaft misalignment detection routine. The shaft misalignment determination flag F represents the state where "shaft misalignment is absent" by F=0, and represents the state where "shaft misalignment is present" by F=1, and an initial value upon a startup (when the ignition switch 87 is turned on) is set to "0". The shaft misalignment detection routine is repeatedly executed at a predetermined short period. Thus, once the occurrence of the shaft misalignment is detected, the determination "shaft misalignment is present" is maintained. The shaft misalignment detection part 122 outputs the shaft misalignment determination flag F to the control change instruction part 130.

The shaft misalignment detection processing 1 can appropriately detect the occurrence of the shaft misalignment.

Note that, the expressions (11) and (12) may be used to calculate the first detection angle θ1 and the second detection angle θ2.

<Shaft Misalignment Detection Processing 2>

Figure 13:
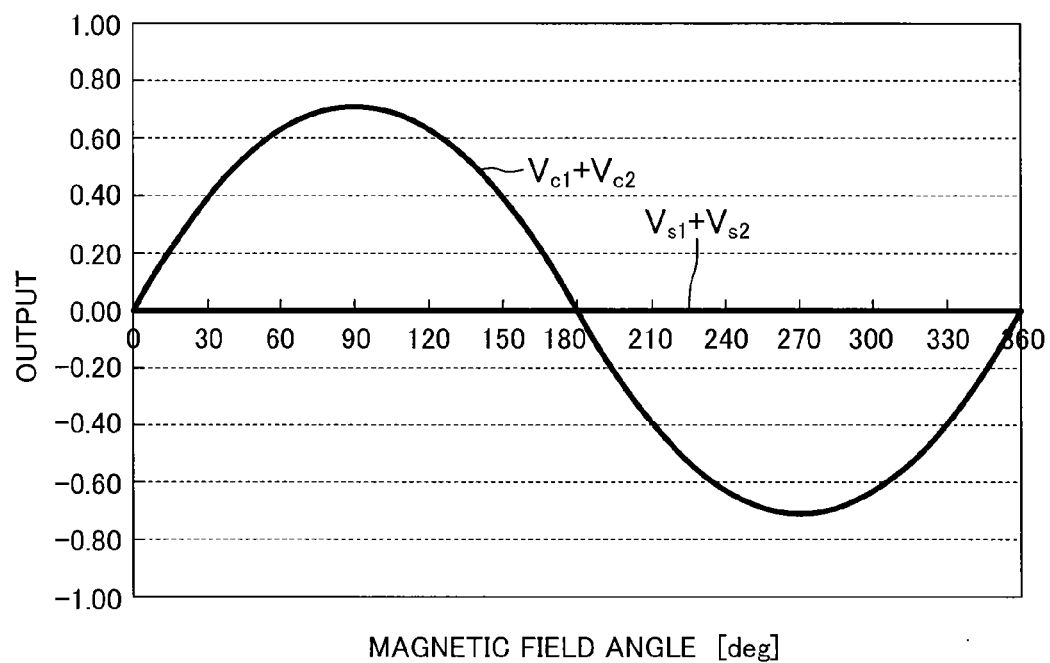
FIG. 13 is a chart showing characteristics of a sum of an output voltage Vs1 and an output voltage Vs2, and a sum of an output voltage Vc1 and an output voltage Vc2.

A description is now given of the shaft misalignment detection processing 2. When the shaft misalignment does not occur, the sum of the output voltage Vs1 (=α·sin θ) of the MR sensor Ss1 and the output voltage Vs2 (=−α·sin θ) of the MR sensor Ss2 is always zero. Moreover, the sum of the output voltage Vc1 (=α·cos θ) of the MR sensor Sc1 and the output voltage Vc2 (=−α·cos θ) of the MR sensor Sc2 is always zero. In other words, when the voltage values of the periodic wave signals shifted from each other in the phase by π are added to each other, the calculation result is always zero. However, when the shaft misalignment occurs, a change appears in the calculation result. For example, when the shaft misalignment occurs as illustrated in FIG. 10, as shown illustrated in FIG. 13, the sum of the output voltage Vs1 of the MR sensor Ss1 and the output voltage Vs2 of the MR sensor Ss2 is always zero, but the sum of the output voltage Vc1 of the MR sensor Sc1 and the output voltage Vc2 of the MR sensor Sc2 changes in a sine waveform depending on the magnetic field angle.

Figure 14:
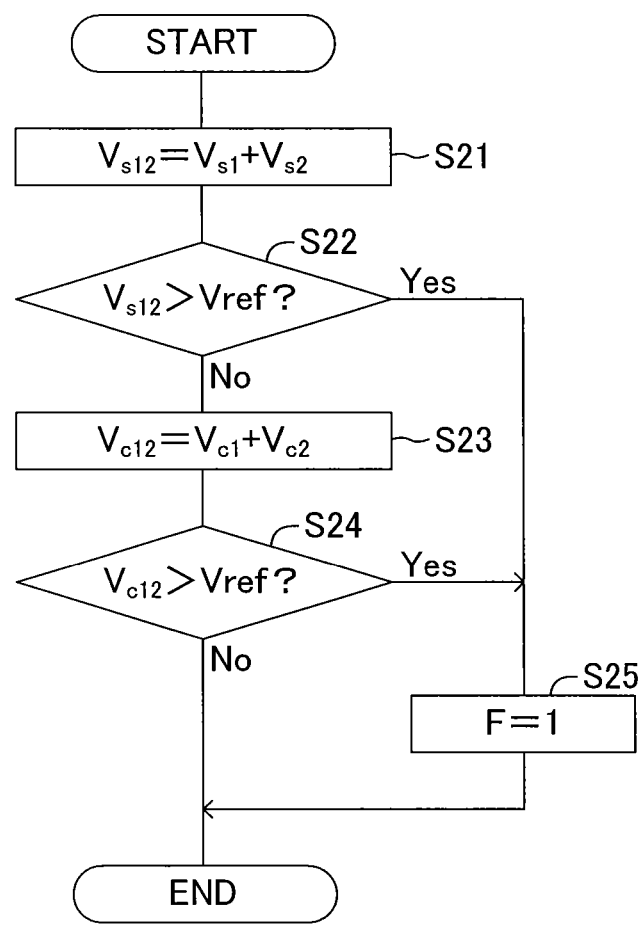
FIG. 14 is a flowchart illustrating a shaft misalignment detection routine (shaft misalignment detection processing 2).

This characteristic is used to detect the occurrence of the shaft misalignment in the shaft misalignment detection processing 2. FIG. 14 illustrates a shaft misalignment detection routine executed by the shaft misalignment detection part 122 (functional part of the microcomputer) of the assist ECU 100 as the shaft misalignment detection processing 2. The shaft misalignment detection routine is repeatedly executed at a predetermined period. In Step S21, the shaft misalignment detection part 122 first reads the output voltage Vs1 of the MR sensor Ss1 and the output voltage Vs2 of the MR sensor Ss2, and calculates a sum (=Vs1+Vs2) acquired by adding the output voltage Vs1 and the output voltage Vs2 to each other. Then, in Step S22, the shaft misalignment detection part 122 determines whether the sum Vs12 is larger than a determination threshold Vref or not. The determination threshold Vref is a reference for determining absence/presence of the occurrence of the shaft misalignment, and is set in advance.

When the sum Vs12 is equal to or less than the determination threshold Vref (No in S22), subsequently in Step S23, the shaft misalignment detection part 122 reads the output voltage Vc1 of the MR sensor Sc1 and the output voltage Vc2 of the MR sensor Sc2, and calculates a sum Vc12 (=Vc1+Vc2) acquired by adding the output voltage Vc1 and the output voltage Vc2 to each other. Then, in Step S24, the shaft misalignment detection part 122 determines whether the sum Vc12 is larger than the determination threshold Vref or not. When the sum Vc12 is equal to or less than the determination threshold Vref, the shaft misalignment detection part 122 once finishes the shaft misalignment detection routine.

On the other hand, in Step S22, when the shaft misalignment detection part 122 determines that the sum Vc12 is larger than the determination threshold Vref, or, in Step S24, the shaft misalignment detection part 122 determines that the sum Vc12 is larger than the determination threshold Vref, in Step S25, the shaft misalignment detection part 122 sets the shaft misalignment determination flag F to "1", and finishes the shaft misalignment detection routine. The shaft misalignment determination flag F is the same as that in the shaft misalignment detection processing 1, which represents the state where "shaft misalignment is absent" by F=0, and represents the state where "shaft misalignment is present" by F=1. The initial value thereof is set to "0".

The shaft misalignment detection processing 2 can appropriately detect the occurrence of the shaft misalignment.

<Shaft Misalignment Detection Processing 3>

Figure 15:
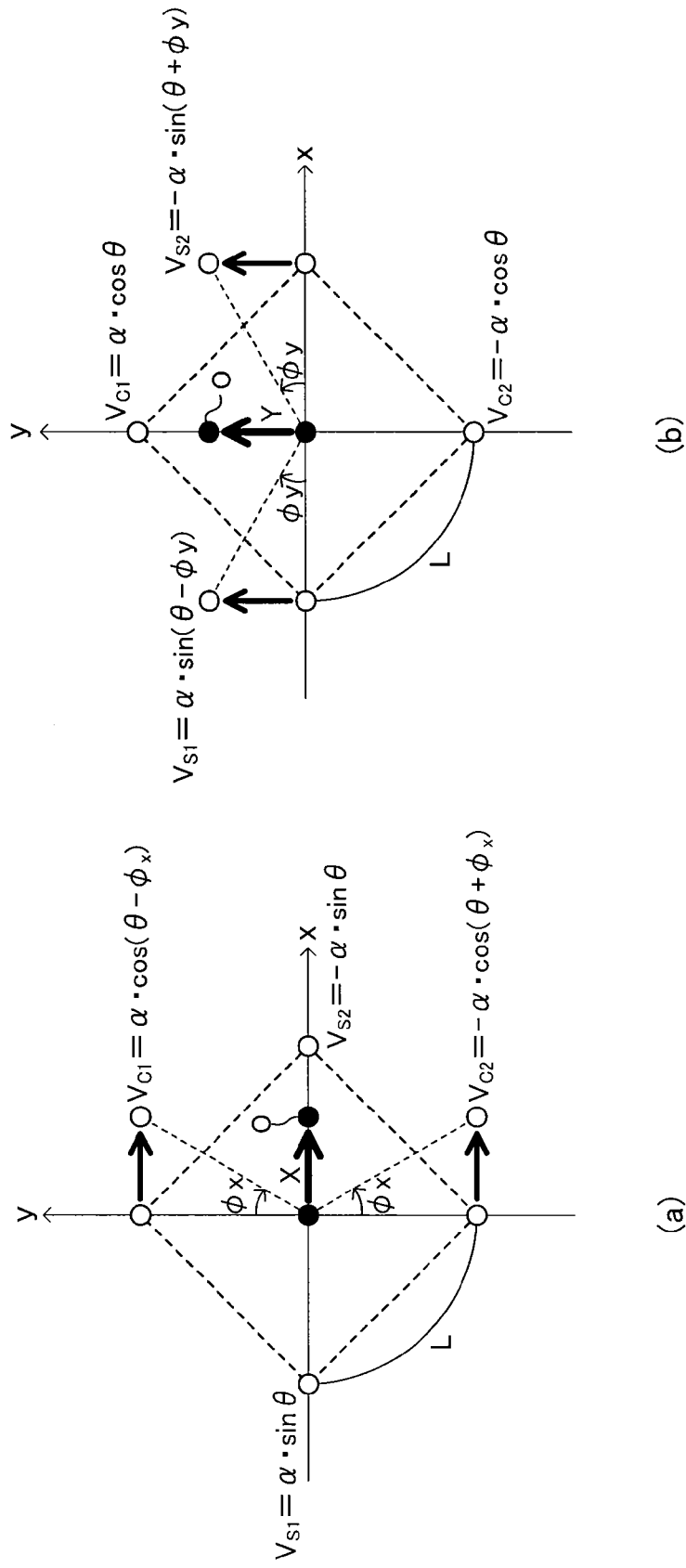
FIG. 15 are explanatory diagrams illustrating calculations of misalignment amounts in a case (a) where the shaft misalignment occurs in an x axis direction, and in a case (b) where the shaft misalignment occurs in a y axis direction.

A description is now given of the shaft misalignment detection processing 3. The shaft misalignment detection processing 3 acquires the shaft misalignment amount by means of calculation based on the output signals from the sensor part 220. For example, as illustrated in FIG. 15(a), a case where the shaft misalignment occurs in the x axis direction is considered. The x axis direction is a direction of a straight line connecting the magnetism detection position of the MR sensor Sc1 and the magnetism detection position of the MR sensor Sc2 to each other. When the relative position between the magnet part 210 and the sensor part 220 is misaligned by a misalignment amount X in the x axis direction, the magnetism detection positions in the respective MR sensors Ss1, Sc1, Ss2, and Sc2 also relatively shift by the misalignment amount X in the x axis direction with respect to the magnet part 210. In this case, the directions from the rotational center O of the magnet part 210 to the respective magnetism detection positions do not change in the MR sensors Ss1 in Ss2, but the directions from the rotational center O of the magnet part 210 to the respective magnetism detection positions incline by φx in the MR sensors Sc1 and Sc2.

In this case, when a sum of the output voltage Vc1 of the MR sensor Sc1 and the output voltage Vc2 of the MR sensor Sc2 is represented as Vc12, the Vc12 is represented by the following expressions (13) and (14).

$$Vc12 = \alpha \cdot \cos(\theta - \phi x) + \{-\alpha \cdot \cos(\theta + \phi x)\} \tag{13}$$

$$Vc12 = 2\alpha \cdot \sin \theta \cdot \sin \phi x \tag{14}$$

Thus, the inclination φx can be calculated by using the following expressions (15) and (16).

$$\phi x = \sin^{-1}\left\{\frac{V_{c12}}{2\alpha \cdot \sin \theta}\right\} \tag{15}$$

$$\phi x = \sin^{-1}\left\{\frac{V_{c12}}{2V_{s1}}\right\} \tag{16}$$

As a result, the misalignment amount X can be calculated by using the following expression (17).

$$X = \frac{L}{\sqrt{2} \cdot \tan \phi x} \tag{17}$$

On this occasion, L denotes a distance between the magnetism detection positions of the MR sensors S shifted from each other in the phase of the output signal by π/2.

The shaft misalignment in the y axis direction can be considered in the same way. For example, as illustrated in FIG. 15(b), when the shaft misalignment having a misalignment amount Y occurs in the y axis direction, the directions from the rotational center O of the magnet part 210 to the respective magnetism detection positions do not change in the MR sensors Sc1 and Sc2, but the directions from the rotational center O of the magnet part 210 to the respective magnetism detection positions incline by φy in the MR sensors Ss1 and Ss2.

In this case, when a sum of the output voltage Vs1 of the MR sensor Ss1 and the output voltage Vs2 of the MR sensor Ss2 is represented as Vs12, the Vs12 is represented by the following expressions (18) and (19).

$$Vs12 = \alpha \cdot \sin(\theta - \phi y) + \{-\alpha \cdot \sin(\theta + \phi y)\} \quad (18)$$

$$Vs12 = -2\alpha \cdot \cos\theta \cdot \sin\phi y \quad (19)$$

Thus, the inclination φy can be calculated by using the following expressions (20) and (21).

$$\phi y = \sin^{-1}\left\{\frac{V_{s12}}{-2\alpha \cdot \cos\theta}\right\} \quad (20)$$

$$\phi y = \sin^{-1}\left\{\frac{V_{s12}}{2V_{c2}}\right\} \quad (21)$$

As a result, the misalignment amount Y can be calculated by using the following expression (22).

$$Y = \frac{L \cdot \tan\phi y}{\sqrt{2}} \quad (22)$$

The shaft misalignment occurs not only in the x axis direction and the y axis direction, but also in oblique directions. In this case, both the voltage Vs12 and the voltage Vc12 are generated, and influence each other, and hence it is hard to numerically represent the shaft misalignment amount. However, such the tendency that as the shaft misalignment amount increases, the sum Vs12 or the sum Vc12 increases still holds true. Thus, when a function (X=F(φx,φy)) of representing the misalignment amount X in the x axis direction by using φx and φy and a function (Y=G(φx,φy)) of representing the misalignment amount Y in the y axis direction by using φx and φy are calculated by means of a simulation in advance, and the function (X=F(φx,φy)) and the function (Y=G(φx,φy)) are stored as two dimensional maps in the assist ECU 100, the shaft misalignment detection part 122 can acquire the misalignment amounts X and Y in real time during the motor drive control.

Figure 16:
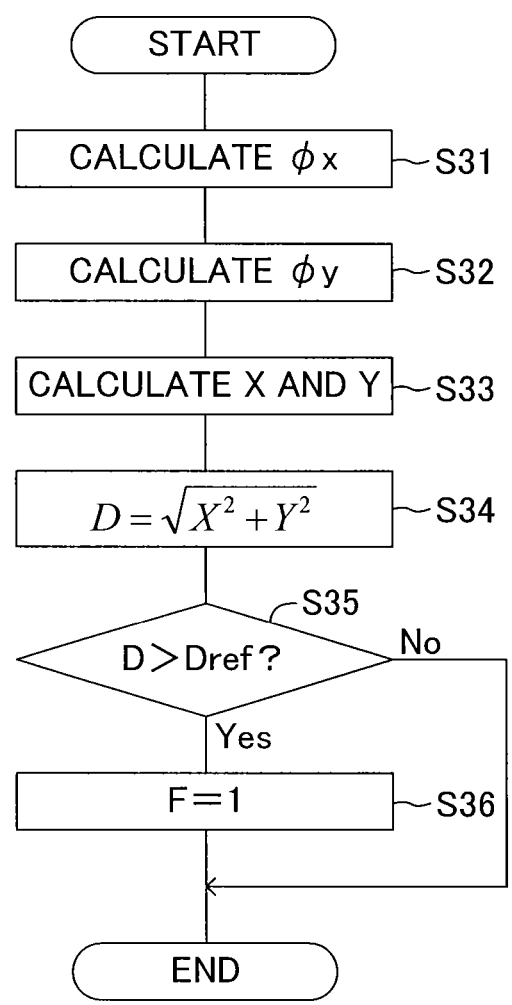
FIG. 16 is a flowchart illustrating a shaft misalignment detection routine (shaft misalignment detection processing 3).

A description is now given of the processing by the shaft misalignment detection part 122 as the shaft misalignment detection processing 3. FIG. 16 illustrates a shaft misalignment detection routine executed by the shaft misalignment detection part 122 (functional part of the microcomputer) of the assist ECU 100 as the shaft misalignment detection processing 3. The shaft misalignment detection routine is repeatedly executed at a predetermined period. In Step S31, the shaft misalignment detection part 122 first reads the output voltage Vc1 of the MR sensor Sc1 and the output voltage Vc2 of the MR sensor Sc2, and calculates the inclination φx by using the expression (16). Then, in Step S32, the shaft misalignment detection part 122 reads the output voltage Vs1 of the MR sensor Ss1 and the output voltage Vs2 of the MR sensor Ss2, and calculates the inclination φy by using the expression (21).

Then, in Step S33, the shaft misalignment detection part 122 refers to the 2D maps stored in advance to calculate the misalignment amounts X and Y from the inclinations φx and φy. Then, in Step S34, the shaft misalignment detection part 122 calculates a composite misalignment amount D representing a distance of the shaft misalignment. The composite misalignment amount D is acquired as a square root of a sum of squares of the misalignment amounts X and Y as represented by the following expression (23).

$$D = \sqrt{X^2 + Y^2} \quad (23)$$

Then, in Step S35, the shaft misalignment detection part 122 determines whether the composite misalignment amount D is more than a determination threshold Dref or not. The determination threshold Dref is a reference for determining absence/presence of the occurrence of the shaft misalignment, and is set in advance. When the composite misalignment amount D is larger than the determination threshold Dref, in Step S36, the shaft misalignment detection part 122 sets the shaft misalignment determination flag F to "1", and finishes the shaft misalignment detection routine. On the other hand, when the composite misalignment amount D is equal to or less than the determination threshold Dref, the shaft misalignment detection part 122 skips the processing in Step S36, and finishes the shaft misalignment detection routine.

The shaft misalignment detection processing 3 can appropriately detect the occurrence of the shaft misalignment. When the sum of squares ($X^2+Y^2$) of the misalignment amounts X and Y is compared with a value corresponding to the square ($Dref^2$) of the determination threshold Dref without calculating the composite misalignment amount D in Steps S34 and S35, the calculation processing becomes easy.

<Shaft Misalignment Detection Processing 4>

Figure 17:
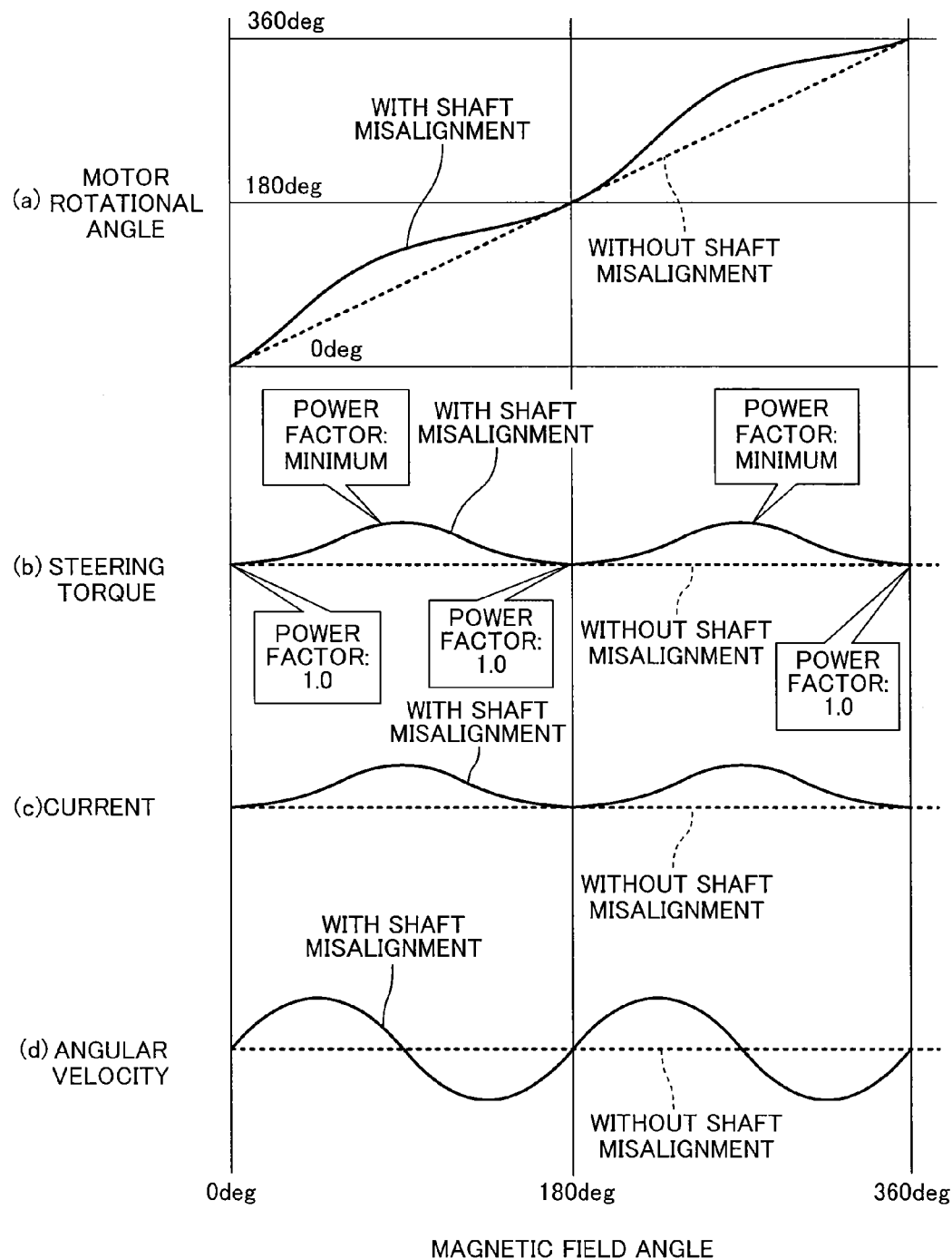
FIG. 17 are charts showing a periodic fluctuation characteristic when the shaft misalignment occurs.

A description is now given of the shaft misalignment detection processing 4. For example, when the shaft misalignment occurs in the direction illustrated in FIG. 10, the motor rotational angle θ calculated by the rotational-angle calculation part 121 presents an error as a solid line in FIG. 17(a) represents. The error (referred to as angular error) in the motor rotational angle θ periodically fluctuates. The motor power factor is decreased by the angular error. The assist torque thus decreases when the angular error is maximum, and, consequently, the steering torque (torque input by the driver) increases. Thus, the steering torque Tr detected by the steering torque sensor 21 fluctuates approximately in a sine waveform as shown in FIG. 17(b). Moreover, as a result, as shown in FIG. 17(c), the instruction currents Id* and Iq* or the actual currents Id and Iq fluctuate similarly. Thus, the occurrence of the shaft misalignment can be detected by detecting the periodic fluctuation of the steering torque, the current detection value, or the current instruction value.

Moreover, when the shaft misalignment occurs, as shown in FIG. 17(d), the angular velocity (rotation speed) of the steering wheel 11 periodically fluctuate as well as these values. Thus, the occurrence of the shaft misalignment can be detected by detecting the periodic fluctuation of a steering wheel angular velocity acquired by differentiating the steering angle with respect to time on a vehicle where the steering angle can be detected by means of a steering angle sensor or the like. Moreover, the steering wheel angular velocity is correlated with an induced voltage generated on the motor 20, and the induced voltage may thus be detected. An induced voltage e calculated in rotational-angle sensorless control described later may be used as the induced voltage. Moreover, the angular velocity ωm calculated by the angular velocity calculation part 108 may be used as the steering wheel angular velocity.

Figure 18:
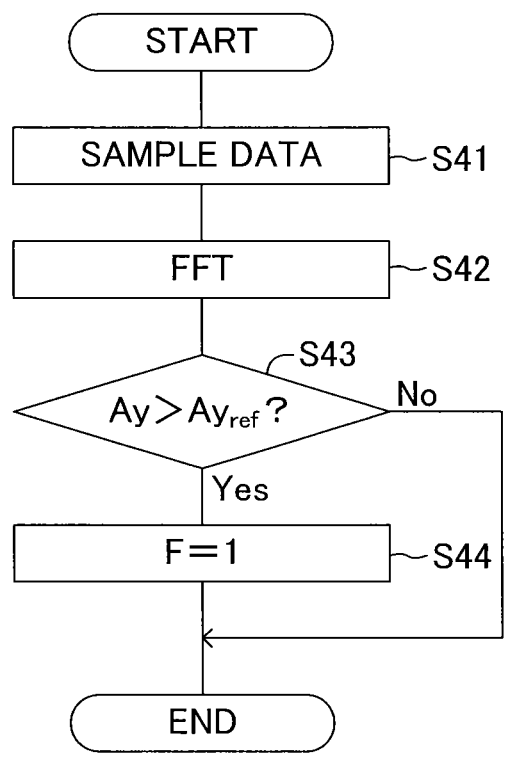
FIG. 18 is a flowchart illustrating a shaft misalignment detection routine (shaft misalignment detection processing 4).

A description is now given of the processing by the shaft misalignment detection part 122 as the shaft misalignment detection processing 4. FIG. 18 illustrates a shaft misalignment detection routine executed by the shaft misalignment detection part 122 (functional part of the microcomputer) of the assist ECU 100 as the shaft misalignment detection processing 4. The shaft misalignment detection routine is repeatedly executed at a predetermined period. The shaft misalignment detection part 122 first samples subject data in Step S41. The subject data may be any of the steering torque Tr, the d-axis instruction current Id*, the q-axis instruction current Iq*, the d-axis actual current Id, the q-axis actual current Iq, the steering wheel angular velocity ωh, the induced voltage e, and the motor angular velocity ωm. The sampling of the subject data is carried out each time the motor rotational angle θ changes by (360/N)° while the motor rotational angle θ calculated by the rotational-angle calculation part 121 is used as the reference (N is an arbitrary integer equal to or more than 5). The shaft misalignment detection part 122 acquires an input signal series Y(k) representing the subject data corresponding to 360° (or an integer multiple thereof) of the motor rotational angle θ, and, subsequently in Step S42, calculates, by means of the fast Fourier transform (FFT), an amplitude A of an amplitude component (hereinafter referred to as rotational second-order frequency component) at a frequency twice as high as the frequency (frequency of the change by 360° in the motor rotational angle θ) of the motor rotational angle θ in the input signal series Y(k).

In Step S42, the shaft misalignment detection part 122 first calculates Ss representing a sine component of the rotational second-order frequency component and Sc representing a cosine component of the rotational second-order frequency component by using the following expressions (24) and (25).

$$S_s = \sum_{k=0}^{N-1} \left( Y(k) \cdot \sin\left(2\pi \cdot \frac{2k}{N}\right) \right) \quad (24)$$

$$S_c = \sum_{k=0}^{N-1} \left( Y(k) \cdot \cos\left(2\pi \cdot \frac{2k}{N}\right) \right) \quad (25)$$

The shaft misalignment detection part 122 uses these calculated values to calculate an amplitude Ay of the rotational second-order frequency component by using the following expression (26).

$$Ay = \frac{2}{N} \sqrt{S_s^2 + S_c^2} \quad (26)$$

As the degree of the shaft misalignment increases, the rotational second-order frequency component of the subject data increases, and the amplitude Ay increases. Thus, the amplitude Ay represents a degree (amount) of the shaft misalignment.

Then, in Step S43, the shaft misalignment detection part 122 determines whether the amplitude Ay of the rotational second-order frequency component is larger than a determination threshold Ayref or not. The determination threshold Ayref is a reference for determining absence/presence of the occurrence of the shaft misalignment, and is set in advance. When the amplitude Ay is larger than the determination threshold Ayref, in Step S44, the shaft misalignment detection part 122 sets the shaft misalignment determination flag F to "1", and finishes the shaft misalignment detection routine. On the other hand, when the amplitude Ay is equal to or less than the determination threshold Ayref, the shaft misalignment detection part 122 skips the processing in Step S44, and finishes the shaft misalignment detection routine.

The shaft misalignment detection processing 4 can appropriately detect the occurrence of the shaft misalignment without the use of the detection signals of the rotational-angle sensor 200.

A description is now given of the abnormality detection part 123. The abnormality detection part 123 inputs the output voltage Vs1 of the MR sensor Ss1, the output voltage Vs2 of the MR sensor Ss2, the output voltage Vc1 of the MR sensor Sc1, and the output voltage Vc2 of the MR sensor Sc2, and detects an abnormality of each of the MR sensors S based on the output voltages. For example, when an MR sensor S having the output voltage outside an appropriate range exists, the abnormality detection part 123 determines that an abnormality has occurred on the MR sensor S. Moreover, when the periodic fluctuation is not detected on the output voltages (for example, the output voltages are fixed to constant values) for only a part of the MR sensors S, the abnormality detection part 123 determines that abnormalities have occurred on the MR sensors S for which the periodic fluctuation is not detected.

When the abnormality detection part 123 detects an abnormality of the MR sensor S, the abnormality detection part 123 outputs an abnormality detection signal "fail" identifying the MR sensor S having the abnormality to the rotational-angle calculation part 121 and the shaft misalignment detection part 122.

The motor rotational angle can be calculated when one set of the MR sensors S shifted from each other in the phase of the output voltage by π/2 are normal. Thus, when the abnormality detection signal "fail" is not output from the abnormality detection part 123, that is, the four MR sensors S are normal, the rotational-angle calculation part 121 calculates the motor rotational angle θ by means of the calculation processing 1. When the abnormality in the MR sensor S is detected, and at least one set of normal MR sensors S shifted from each other in the phase of the output voltage by π/2 exist, the rotational-angle calculation part 121 calculates the motor rotational angle θ by means of the calculation processing 2.

Moreover, when the abnormality detection signal "fail" is not output from the abnormality detection part 123, that is, the four MR sensors S are normal, the shaft misalignment detection part 122 detects the occurrence of the shaft misalignment by using any of the shaft misalignment detection processing 1 to 4. On the other hand, when an abnormality in the MR sensor S is detected, the shaft misalignment detection part 122 carries out any of the shaft misalignment detection processing 1 and 4 because the shaft misalignment detection processing 2 and 3 cannot be carried out unless all the four MR sensors are normal. Regarding the shaft misalignment detection processing 1, when two sets of normal MR sensors shifted from each other in the phase of the output voltage by π/2 exist, the shaft misalignment detection processing can be carried out, and when an abnormality has occurred on one MR sensor S, the shaft misalignment can be always detected. Moreover, when abnormalities have occurred on at least two MR sensors S, two sets of normal MR sensors shifted from each other in the phase of the output voltage by π/2 do not exist, and hence the shaft misalignment detection method 4 needs to be carried out.

For example, the shaft misalignment detection part 122 may store all programs for carrying out the shaft misalignment detection processing 1 to 4, and may select the shaft misalignment detection method based on the abnormality detection signal "fail" output from the abnormality detection part 123 as described above. In other words, the shaft misalignment detection part 122 may include means for storing a plurality of types of the shaft misalignment detection forms, and selecting, when sensor abnormalities are detected, a shaft misalignment detection form depending on an occurrence state of the sensor abnormalities (information on which MR sensors S have the abnormalities).

Moreover, when even one set of normal MR sensors S shifted from each other in the phase of the output voltage by $\pi/2$ do not exist, a state where the motor rotational angle $\theta$ cannot be calculated is present, and hence the rotational-angle calculation part 121 and the shaft misalignment detection part 122 stop the processing thereof. Moreover, the shaft misalignment detection part 122 sets the shaft misalignment determination flag F to "1". As a result, the control change instruction part 130 uses the instruction signal Cs to output an instruction to stop the steering assist to the respective functional parts 101 to 109.

In the electric power-steering device including the rotational-angle detection device according to the embodiment, the shaft misalignment detection part 122 acquires the degree of the shaft misalignment in the rotational-angle sensor 200 by means of the calculation. When the degree of the shaft misalignment exceeds the threshold, the shaft misalignment detection part 122 determines that the shaft misalignment has occurred, and uses the shaft misalignment determination flag F to inhibit the motor 20 from acting, thereby stopping the steering assist. Thus, an inappropriate steering assist due to a detection error of the motor rotational angle $\theta$ can be prevented from being carried out, resulting in an increase in safety. Moreover, the rotational-angle sensor 200 includes the four MR sensors S shifted from each other in the phase of the output signal by $\pi/2$. Therefore, the rotational-angle sensor 200 can appropriately detect the occurrence of the shaft misalignment by means of the various methods, and, even when an abnormality occurs to an arbitrary MR sensor S, the rotational-angle sensor 200 can carry out the shaft misalignment detection and the rotational-angle detection depending on the abnormality.

Moreover, regarding the calculation of the motor rotational angle $\theta$, when the MR sensors S are normal, the motor rotational angle $\theta$ is calculated by using the differences (Vs1–Vs2) and (Vc1–Vc2) in the output voltage of the pairs of the MR sensors S shifted from each other in the phase of the output signal by $\pi$ as in the calculation processing 1. Therefore, the resolution can be increased, and the motor rotational angle $\theta$ can be highly accurately calculated.

Moreover, in the shaft misalignment detection processing 4, the occurrence of the shaft misalignment is detected by acquiring, by means of the calculation, the rotational second-order frequency component of the physical amount (such as the steering torque, the motor current, the steering wheel angular velocity, the motor angular velocity, and the induced voltage) fluctuating due to the detection error in the motor rotational angle $\theta$ generated by the shaft misalignment. Thus, the occurrence of the shaft misalignment can be detected regardless of the abnormal state of the MR sensors S.

A description is now given of a second embodiment of the present invention. The above-described embodiment (hereinafter referred to as first embodiment) is configured to stop the steering assist when the occurrence of the shaft misalignment is detected. The second embodiment does not immediately stop the steering assist when the occurrence of the shaft misalignment is detected, but changes a control form so as to decrease influence of the detection error in the motor rotational angle $\theta$ on the steering assist, and has a function of correcting the motor rotational angle $\theta$ to an appropriate value. In the following, like components as those of the first embodiment are denoted by like symbols as those of the first embodiment in drawings, and a description thereof is omitted.

Figure 19:
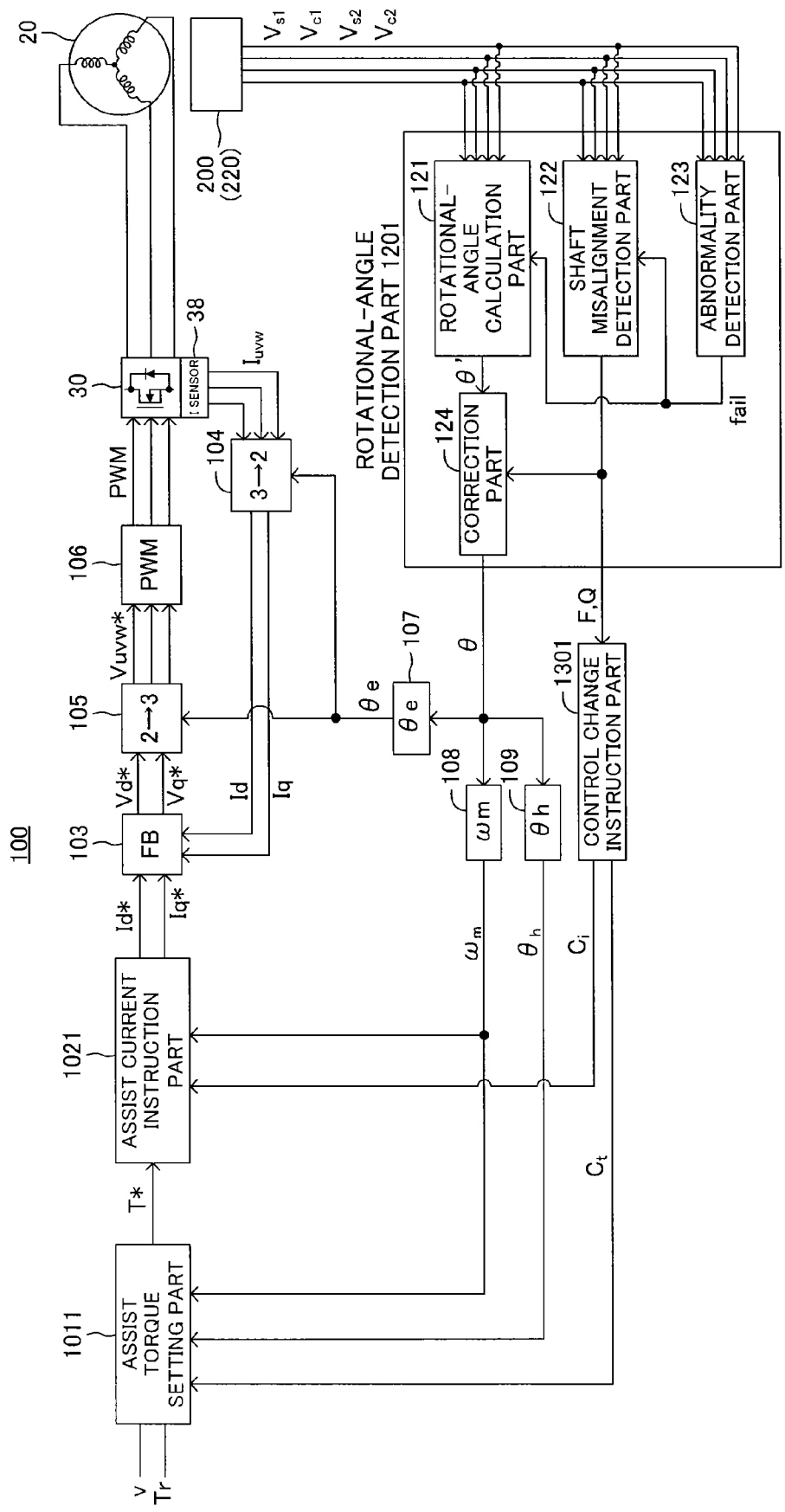
FIG. 19 is a functional block diagram illustrating processing by a microcomputer of an assist ECU according to a second embodiment of the present invention.

FIG. 19 is a functional block diagram illustrating processing by the microcomputer of the assist ECU 100 according to the second embodiment. According to the second embodiment, the assist ECU 100 includes a rotational-angle detection part 1201 in place of the rotational-angle detection part 120 according to the first embodiment. The rotational-angle detection part 1201 includes a correction part 124 in addition to the same rotational-angle calculation part 121, shaft misalignment detection part 122, and abnormality detection part 123 as those of the first embodiment.

The correction part 124 inputs the motor rotational angle calculated by the rotational-angle calculation part 121, inputs the shaft misalignment determination flag F output from the shaft misalignment detection part 122, simply outputs, when the shaft misalignment determination flag F is "0", the motor rotational angle input from the rotational-angle calculation part 121, and outputs, when the shaft misalignment determination flag F is "1", a motor rotational angle corrected so as to reduce the influence of the shaft misalignment as the final motor rotational angle $\theta$. In the following, in the second embodiment, the motor rotational angle calculated by the rotational-angle calculation part 121 is referred to as motor rotational angle $\theta'$, and the rotational angle calculated by the correction part 124 is referred to as motor rotational angle $\theta$ in order to distinguish the motor rotational angle calculated by the rotational-angle calculation part 121 and the motor rotational angle calculated by the correction part 124 from each other.

Moreover, in the second embodiment, the assist ECU 100 includes an assist torque setting part 1011 in place of the assist torque setting part 101 according to the first embodiment, an assist current instruction part 1021 in place of the assist current instruction part 102 according to the first embodiment, and a control change instruction part 1301 in place of the control change instruction part 130 according to the first embodiment.

A description is later given of the assist torque setting part 1011, the assist current instruction part 1021, and the control change instruction part 1301, and a description is first given of processing by the correction part 124. Regarding the processing by the correction part 124, a description is given of four examples, and the correction part 124 may use one of them.

<Rotational-Angle Correction Processing 1>

Figure 20:
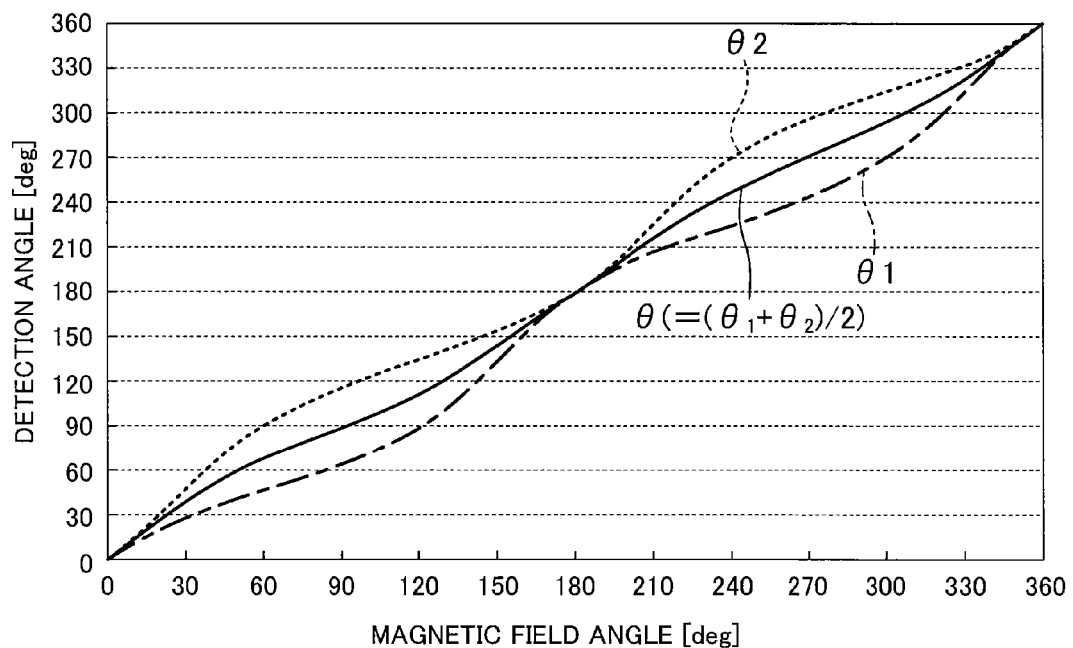
FIG. 20 is a chart showing a characteristic of detection angles and an average.

The shaft misalignment detection part 122 carries out the above-mentioned detection processing 1 in rotational-angle correction processing 1. When the shaft misalignment determination flag F is "1", the correction part 124 reads the first detection angle $\theta1$ and the second detection angle $\theta2$ calculated by the shaft misalignment detection part 122, calculates an average of the first detection angle $\theta1$ and the second detection angle $\theta2$, and outputs a calculation result (($\theta1+\theta2$)/2), as the final motor rotational angle $\theta$, to the electrical angle calculation part 107, the angular velocity calculation part 108, and the steering angle calculation part 109. Thus, as shown in FIG. 20, an angular error included in the first detection angle $\theta1$ and an angular error included in the second detection angle $\theta2$ cancel out, resulting in the motor rotational angle $\theta$ small in angular error. The rotational-angle correction processing 1 can easily reduce the angular error caused by the shaft misalignment.

The calculation load is reduced by using the first detection angle $\theta1$ and the second detection angle $\theta2$ calculated by the shaft misalignment detection part 122 in the rotational-angle correction processing 1, but when the rotational-angle correction processing 1 is carried out, the shaft misalignment detection part 122 does not always need to carry out the shaft misalignment detection processing 1, and may carry out other shaft misalignment detection processing. In this case, the correction part 124 may calculate the first detection angle θ1 and the second detection angle θ2.

<Variation of Rotational-Angle Correction Processing 1>

The motor rotational angle θ is acquired by calculating the average of the two detection angles θ1 and θ2 in the rotational-angle correction processing 1, but the motor rotational angle θ can be calculated by four ways of the combination of the MR sensors S. In other words, the motor rotational angle θ can be calculated in the four ways by using the expressions (9) to (12). Then, the correction part 124 calculates a first detection angle θ1 acquired by the expression (9), a second detection angle θ2 acquired by the expression (10), a third detection angle θ3 acquired by the expression (11), and a fourth detection angle θ4 acquired by the expression (12) in this variation. Then, the correction part 124 calculates an average of the four detection angles θ1, θ2, θ3, and θ4, and outputs a calculation result ((θ1+θ2+θ3+θ4)/4) as the final motor rotational angle θ to the electrical angle calculation part 107, the angular velocity calculation part 108, and the steering angle calculation part 109. Thus, the motor rotational angle θ even smaller in the angular error can be acquired according to the variation. When the shaft misalignment detection part 122 carries out the shaft misalignment detection processing 1, the calculation result by the shaft misalignment detection part 122 may be used as the first detection angle θ1 and the second detection angle θ2 also in this variation.

<Rotational-Angle Correction Processing 2>

Figure 21:
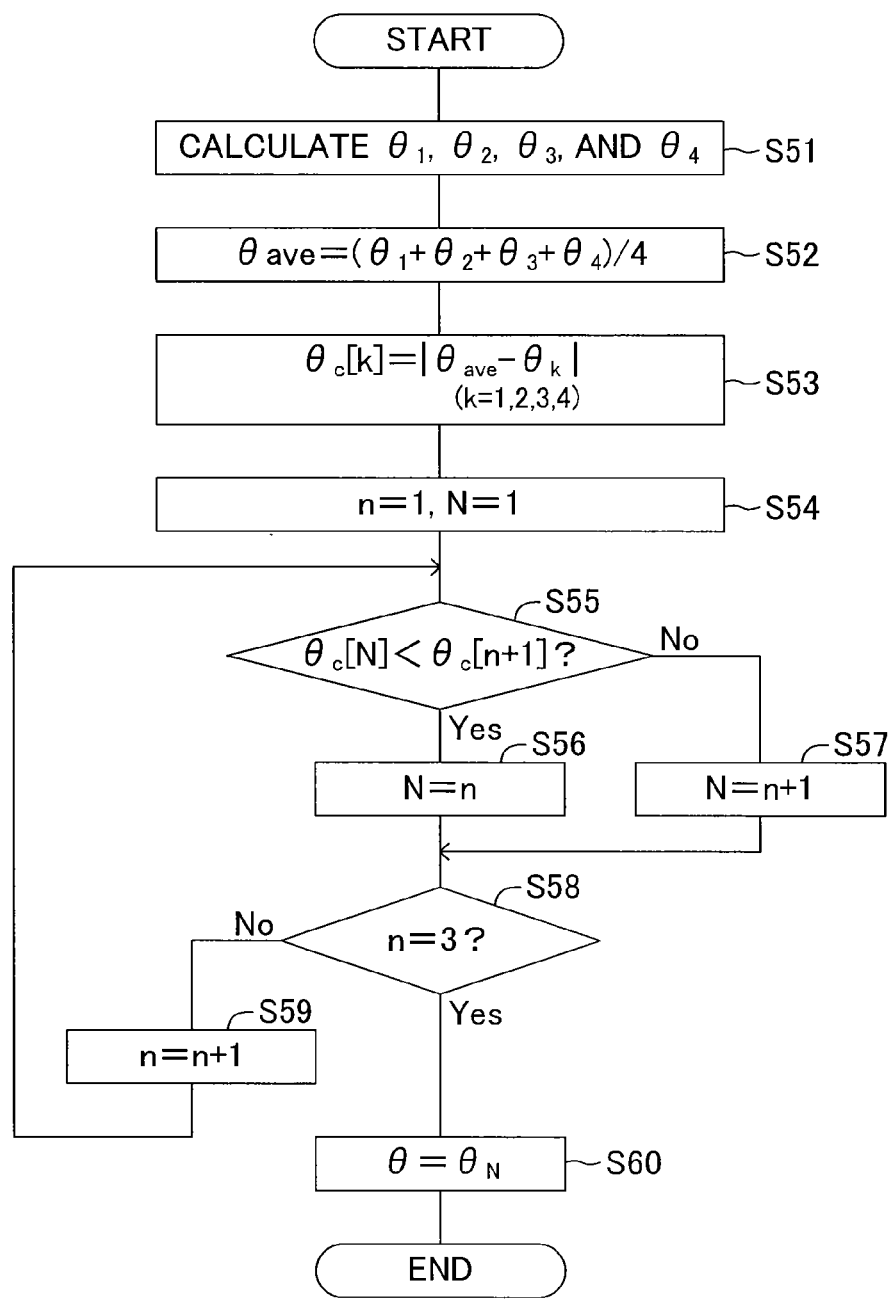
FIG. 21 is a flowchart illustrating a rotational-angle correction routine (rotational-angle correction processing 2).

A detection angle closest to the average of the above-mentioned four detection angles θ1 to θ4 is employed as the motor detection angle θ in rotational-angle correction processing 2. FIG. 21 is a rotational-angle correction routine executed as the rotational-angle correction processing 2 by the correction part 124 (functional part of the microcomputer) of the assist ECU 100. The rotational-angle correction routine is repeatedly executed at a predetermined period. In Step S51, the correction part 124 first calculates the first detection angle θ1, the second detection angle θ2, the third detection angle θ3, and the fourth detection angle θ4 by using the expressions (9) to (12) as in the variation of the rotational-angle correction processing 1. In other words, the correction part 124 calculates the motor rotational angles in the four ways of the combination of the MR sensors S. Then, in Step S52, the correction part 124 calculates the average θave (=(θ1+θ2+θ3+θ4)/4) of the four detection angles θ1 to θ4.

Then, in Step S53, the correction part 124 calculates a deviation θc[k] representing an absolute value of a difference between the average θave and the k-th detection angle θk (k=1, 2, 3, and 4) (θc[k]=|θave−θk|). On this occasion, the deviation θc[1] to the deviation θc[4] are calculated. Then, in Step S54, the correction part 124 sets a variable n to 1, sets a variable N to 1, and, subsequently in Step S55, determines whether the deviation θc[N] is less than the deviation θc[n+1] or not. In this case, the correction part 124 determines whether the deviation θc[1] is less than the deviation θc[2] or not.

When the deviation θc[N] is less than the deviation θc[n+1] (Yes in S55), in Step S56, the correction part 124 sets the value of N to n, and when the deviation θc[N] is equal to or more than the deviation θc[n+1] (No in S55), in Step S57, the correction part 124 sets the value of N to (n+1). Then, in Step S58, the correction part 124 determines whether the variable n is 3 or not, and when the variable n is not 3, in Step S59, the correction part 124 increments the variable n by a value "1", and returns the processing to Step S55. The correction part 124 repeats the processing from Step S55 to Step S59 until the correction part 124 determines that the variable n is 3. The correction part 124 repeats the processing, and when the correction part 124 determines that the variable n is 3 (YES in S58), in Step S60, the correction part 124 sets the motor rotational angle θ to the N-th detection angle θN, and finishes the rotational-angle correction routine.

The rotational-angle correction routine sets the detection angle θk having the smallest deviation θc[k] to the motor rotational angle θ. Thus, the detection angle θk closest to the true value can be set to the motor rotational angle θ, thereby easily reducing the angular error caused by the shaft misalignment.

<Rotational-Angle Correction Processing 3>

Figure 22:
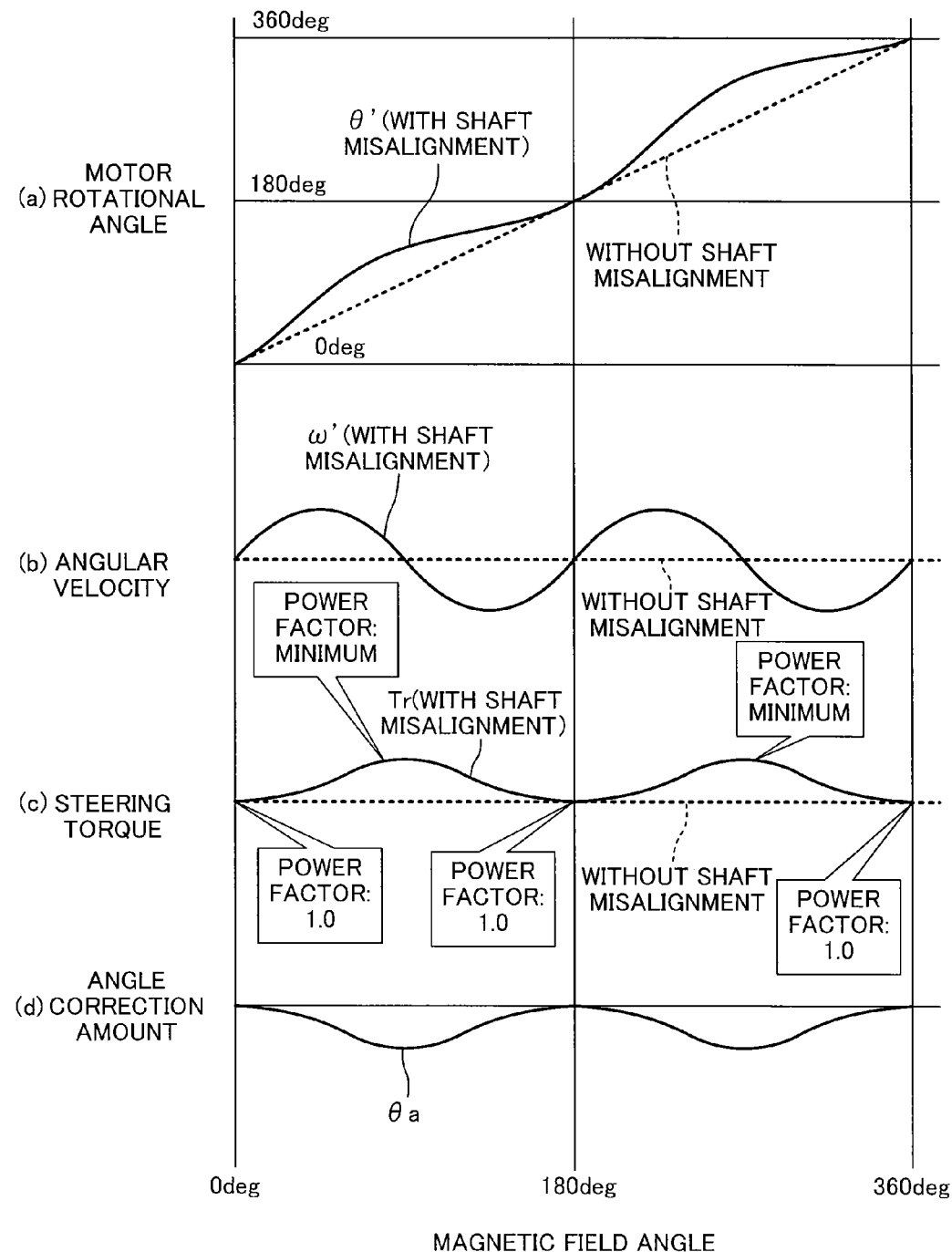
FIG. 22 are charts showing the periodic fluctuation characteristic when the shaft misalignment occurs.

When the shaft misalignment occurs, an error occurs in the motor rotational angle θ' calculated by the rotational-angle calculation part 121. The error (referred to as angular error) in the motor rotational angle θ' periodically fluctuates, for example, as shown in FIG. 22(*a*) (in this example, the error occurs in a direction of increasing the detection angle). Therefore, as described in the shaft misalignment detection processing 4, the rotational second-order frequency component of the motor rotational angle θ' is generated in the steering torque, the angular velocity, and the like. Then, rotational-angle correction processing 3 feeds back the amplitude of the rotational second-order frequency component so that the amplitude approaches zero, and the correction amount is calculated. The angular error periodically fluctuates in accordance with the motor rotational angle θ'. Then, the correction waveform is set to a sine wave for the sake of simpler calculation, and the amplitude, the phase, and the correction direction of the correction waveform are calculated for determining the correction amount in the rotational-angle correction processing 3.

When the shaft misalignment occurs, and, as shown in FIG. 22(*a*), an error occurs in the motor rotational angle θ', as shown in FIG. 22(*b*), the angular velocity ω' (=dθ'/dt) acquired by differentiating the motor rotational angle θ' periodically fluctuates. The fluctuation in the angular velocity ω' is considered to present a waveform approximately close to a sine wave so that the error in the angular velocity ω' is zero when the angular error is maximum and zero.

Moreover, the motor power factor is decreased by the angular error, and hence the assist torque decreases when the angular error is maximum. Consequently, the steering torque Tr increases. Thus, as shown in FIG. 22(*c*), the fluctuation in the steering torque Tr presents a waveform approximately close to a sine wave. As shown in FIG. 22(*a*), when the error occurs in a direction of increasing the angle due to the shaft misalignment, the angular velocity ω' acquired by differentiating the motor rotational angle θ' with respect to time presents a rotational second-order waveform which takes the maximum in the vicinities of 45° and 225° of the true motor rotational angle, and takes the minimum in the vicinities of 135° and 315° thereof. Conversely, for a case of the shaft misalignment where the error occurs in a direction of decreasing the angle, the angular velocity ω' presents a rotational second-order waveform which takes the minimum in the vicinities of 45° and 225° of the true motor rotational angle, and takes the maximum in the vicinities of 135° and 315° thereof.

On the other hand, the steering torque Tr takes the minimum in the vicinities of 0° and 180° of the true motor rotational angle, and takes the maximum in the vicinities of 90° and 270° thereof regardless of the direction of the angular error. Thus, the correction direction can be determined based on a relationship between the angular velocity ω' and the steering torque Tr. In other words, when the phase of the angular velocity ω' leads by 90° with respect to the steering torque Tr, the motor rotational angle θ' may be corrected to the minus direction, and, conversely, when the phase of the angular velocity ω' lags by 90° with respect to the steering torque Tr, the motor rotational angle θ' may be corrected to the plus direction.

Figure 23:
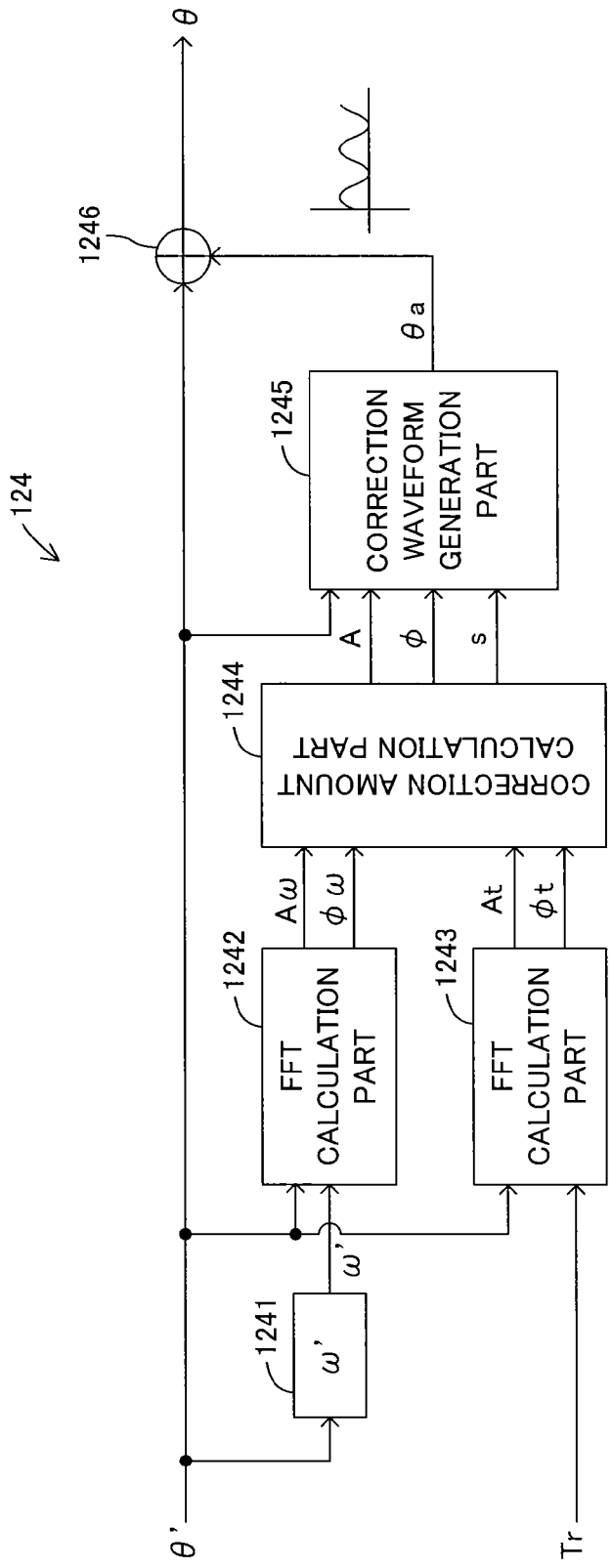
FIG. 23 is a functional block diagram of a correction part of the assist ECU for carrying out rotational-angle correction processing 3.

FIG. 23 is a functional block diagram of the correction part of the assist ECU 100 for carrying out the rotational-angle correction processing 3. The correction part 124 includes an angular velocity calculation part 1241, two FFT calculation parts 1242 and 1243, a correction amount calculation part 1244, a correction waveform generation part 1245, and a correction amount addition part 1246. The angular velocity calculation part 1241 inputs the motor rotational angle θ' calculated by the rotational-angle calculation part 121, calculates the angular velocity ω' by differentiating the motor rotational angle θ' with respect to time, and outputs the angular velocity ω' to the FFT calculation part 1242. The FFT calculation part 1242 inputs the motor rotational angle θ' and the angular velocity ω', samples the angular velocity ω' each time the motor rotational angle θ' changes by (360/N)° (N is an arbitrary integer equal to or more than 5), and calculates the amplitude Aω and the phase φω of the rotational second-order frequency component at the angular velocity ω' by means of the fast Fourier transform (FFT) when the sampling of the angular velocity ω'(k) over 360° (or an integer multiple thereof) of the motor rotational angle θ' is finished.

The FFT calculation part 1242 calculates through FFT Sωs representing a sine component of the rotational second-order frequency component, and Sωc representing a cosine component of the rotational second-order frequency component by using the following expressions (27) and (28).

$$S_{\omega s} = \sum_{k=0}^{N-1} \left( \omega'(k) \cdot \sin\left(2\pi \cdot \frac{2k}{N}\right) \right) \tag{27}$$

$$S_{\omega c} = \sum_{k=0}^{N-1} \left( \omega'(k) \cdot \cos\left(2\pi \cdot \frac{2k}{N}\right) \right) \tag{28}$$

The FFT calculation part 1242 calculates the amplitude Aω and the phase φω of the rotational second-order frequency component by using the following expressions (29) and (30). The FFT calculation part 1242 outputs the calculated amplitude Aω and phase φω to the correction amount calculation part 1244.

$$A\omega = \frac{2}{N}\sqrt{S_{\omega s}^2 + S_{\omega c}^2} \tag{29}$$

$$\phi\omega = \tan^{-1}\left(-\frac{S_{\omega c}}{S_{\omega s}}\right) \tag{30}$$

The other FFT calculation part 1243 inputs the motor rotational angle θ' and the steering torque Tr, samples the steering torque Tr each time the motor rotational angle θ' changes by (360/N)° (N is an arbitrary integer equal to or more than 5), and calculates the amplitude At and the phase φt of the rotational second-order frequency component at the steering torque Tr by means of the fast Fourier transform (FFT) when the sampling of the steering torque Tr(k) over 360° (or an integer multiple thereof) of the motor rotational angle θ' is finished.

The FFT calculation part 1243 calculates through FFT Sts representing a sine component of the rotational second-order frequency component, and Stc representing a cosine component of the rotational second-order frequency component by using the following expressions (31) and (32).

$$S_{ts} = \sum_{k=0}^{N-1} \left( Tr(k) \cdot \sin\left(2\pi \cdot \frac{2k}{N}\right) \right) \tag{31}$$

$$S_{tc} = \sum_{k=0}^{N-1} \left( Tr(k) \cdot \cos\left(2\pi \cdot \frac{2k}{N}\right) \right) \tag{32}$$

The FFT calculation part 1243 calculates the amplitude At and the phase φt of the rotational second-order frequency component by using the following expressions (33) and (34). The FFT calculation part 1243 outputs the calculated amplitude At and phase φt to the correction amount calculation part 1244.

$$At = \frac{2}{N}\sqrt{S_{ts}^2 + S_{tc}^2} \tag{33}$$

$$\phi t = \tan^{-1}\left(-\frac{S_{tc}}{S_{ts}}\right) \tag{34}$$

Figure 24:
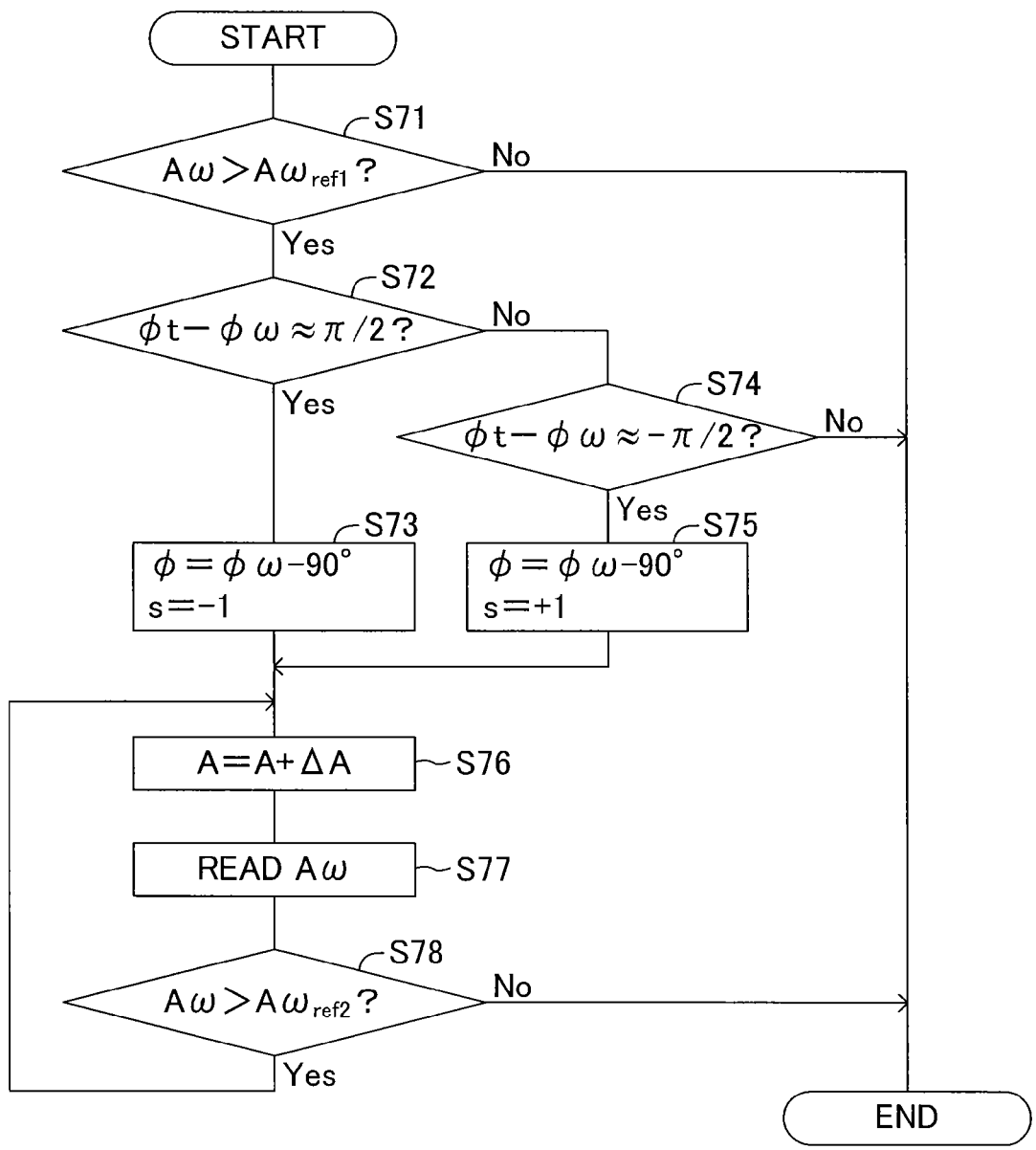
FIG. 24 is a flowchart illustrating a correction amount calculation routine executed by a correction amount calculation part.

A description is given of the processing by the correction amount calculation part 1244 referring to a flowchart. FIG. 24 illustrates a correction amount calculation routine executed by the correction amount calculation part 1244. The correction amount calculation routine is repeatedly executed at a predetermined period. In Step S71, the correction amount calculation part 1244 first determines whether the amplitude Aω of the rotational second-order frequency component of the angular velocity ω' is more than a threshold Aωref1 or not. When the amplitude Aω is equal to or less than the threshold Aωref1, the correction amount calculation part 1244 once finishes the routine, and repeats the routine at the predetermined interval.

On the other hand, when the amplitude Aω is more than the threshold Aωref1, subsequently in Step S72, the correction amount calculation part 1244 determines whether a difference (φt−φω) acquired by subtracting the phase φω of the rotational second-order frequency component of the angular velocity ω' from the phase φt of the rotational second-order frequency component of the steering torque Tr is approximately π/2 or not. The state where the difference is π/2 is a state where the difference is in a permissible range (a range considered as π/2) of plus or minus α about π/2. When the difference (φt−φω) is approximately π/2, in Step S73, the correction amount calculation part 1244 sets the phase φ of the correction amount, namely, the phase of the correction waveform to (φω−90°), and sets a correction direction s to a minus direction "−1".

On the other hand, when the difference (φt−φω) is not approximately π/2, in Step S74, the correction amount calculation part 1244 determines whether the difference (φt−φω) acquired by subtracting the phase φω of the rotational second-order frequency component of the angular velocity ω' from the phase φt of the rotational second-order frequency component of the steering torque Tr is approximately $-\pi/2$ or not. When the difference ($\phi t-\phi\omega$) is approximately $-\pi/2$, in Step S75, the correction amount calculation part 1244 sets the phase $\phi$ of the correction amount to ($\phi\omega-90°$), and sets the correction direction s to a plus direction "+1". Moreover, when the difference ($\phi t-\phi\omega$) is not approximately $-\pi/2$, the correction amount calculation part 1244 once finishes the routine, and repeats the routine at the predetermined interval.

Processing from Step S72 to Step S75 compares the phase $\phi t$ of the steering torque Tr and the phase $\phi\omega$ of the angular velocity $\omega'$ with each other. When the phase $\phi\omega$ of the angular velocity $\omega'$ leads the phase $\phi t$ of the steering torque Tr by approximately 90°, the processing sets the correction direction of the motor rotational angle $\theta'$ to decrease the motor rotational angle $\theta'$, and when the phase $\phi\omega$ of the angular velocity $\omega'$ lags behind the phase $\phi t$ of the steering torque Tr by approximately 90°, the processing sets the correction direction of the motor rotational angle $\theta'$ to increase the motor rotational angle $\theta'$.

Then, in Step S76, the correction amount calculation part 1244 increases the amplitude A of the correction amount by a certain value $\Delta A$ set in advance ($A=A+\Delta A$). Note that, an initial value of the amplitude A may be zero. Then, in Step S77, the correction amount calculation part 1242 reads the amplitude $A\omega$ of the rotational second-order frequency component of the angular velocity $\omega'$ calculated by the FFT calculation part 1242, and, in Step S78, determines whether the amplitude $A\omega$ is more than a threshold $A\omega$ref2 set in advance or not. When the amplitude $A\omega$ is more than the threshold $A\omega$ref2, the correction amount calculation part 1244 returns the processing to Step S76, and increases the amplitude A of the correction amount by the certain value $\Delta A$. The correction amount calculation part 1244 repeats the processing (S76 to S78) in this way, and when the amplitude $A\omega$ decreases to a value equal to or less than the threshold $A\omega$ref2, the correction amount calculation part 1244 once finishes the routine.

When the correction amount calculation part 1244 is executing the correction amount calculation routine, the correction amount calculation part 1244 outputs the amplitude A of the correction amount calculated in Step S76, and the phase $\phi$ and the correction direction s ("+1" or "−1") of the correction amount calculated in Steps S73 and S75 to the correction waveform generation part 1245. The correction waveform generation part 1245 generates a correction waveform representing a correction amount (correction angle $\theta a$) by using the following expression (35).

$$\theta a = s \cdot A \cdot (\sin(2\theta-\phi)+1) \quad (35)$$

The correction waveform generation part 1245 outputs the calculated correction waveform to the correction amount addition part 1246. The correction amount addition part 1246 adds the correction angle $\theta a$ to the motor rotational angle $\theta'$ calculated by the rotational-angle calculation part 121, thereby calculating a corrected motor rotational angle ($\theta'+\theta a$), and outputs the calculation result as the motor rotational angle $\theta$.

The rotational-angle correction processing 3 calculates the correction amount by feeding back the amplitude $A\omega$ of the rotational second-order frequency component of the angular velocity $\omega'$ so that the amplitude $A\omega$ approaches zero, and, thus, even when an angular error caused by the shaft misalignment is included in the motor rotational angle $\theta'$ calculated by the rotational-angle calculation part 121, the motor rotational angle $\theta$ corrected so that the angular error becomes zero is calculated. Thus, the highly accurate motor rotational angle $\theta$ can be calculated. Moreover, the correction amount is not calculated by using the detection signals of the MR sensors S, and, thus, even when abnormalities have occurred on a part of the MR sensors S, the appropriate motor rotational angle $\theta$ can be calculated.

<Rotational-Angle Correction Processing 4>

As described in the shaft misalignment detection processing 3, when the relative position between the magnet part 210 and the sensor part 220 is misaligned in the x axis direction, the directions from the rotational center O of the magnet part 210 to the magnetism detection positions of the MR sensors Sc1 and Sc2 change by the angle $\phi x$ represented by the expression (16). Moreover, when the relative position between the magnet part 210 and the sensor part 220 is misaligned in the y axis direction, the directions from the rotational center O of the magnet part 210 to the magnetism detection positions of the MR sensors Ss1 and Ss2 change by the angle $\phi y$ represented by the expression (21).

Thus, in rotational-angle correction processing 4, when the relative position between the magnet part 210 and the sensor part 220 is misaligned only in the x axis direction, the correction part 124 sets the value ($-\phi x$) acquired by multiplying the angle $\phi x$ calculated by using the expression (16) by the sign "−1" as the correction angle, and adds the correction angle ($-\phi x$) to the motor rotational angle $\theta'$ calculated by the rotational-angle calculation part 121, thereby calculating the motor rotational angle $\theta$. Moreover, when the relative position between the magnet part 210 and the sensor part 220 is misaligned only in the y axis direction, the correction part 124 sets the value ($-\phi y$) acquired by multiplying the angle $\phi y$ calculated by using the expression (21) by the sign "−1" as the correction angle, and adds the correction angle ($-\phi y$) to the motor rotational angle $\theta'$ calculated by the rotational-angle calculation part 121, thereby calculating the motor rotational angle $\theta$.

When the shaft misalignment occurs in the x axis direction or in the y axis direction, the phase shift amount ($\phi x$ or $\phi y$) of the motor rotational angle is calculated, and the motor rotational angle $\theta'$ is corrected by using the phase shift amount, thereby calculating the appropriate motor rotational angle $\theta$ in this way in the rotational-angle correction processing 4. Moreover, for example, when the correction angle is always stored and updated in a memory, even when abnormalities occur to a part of the MR sensors S, and the correction angle can no longer be calculated, the correction part 124 can use the stored last correction angle to carry out the correction processing for the motor rotational angle. Thus, the steering assist reflecting the shaft misalignment can be continued.

When the sum Vc12 acquired by adding the output voltage Vc1 of the MR sensor Sc1 and the output voltage Vc2 of the MR sensor Sc2 to each other is larger than a threshold, and the sum Vs12 acquired by adding the output voltage Vs1 of the MR sensor Ss1 and the output voltage Vs2 of the MR sensor Ss2 to each other is close to zero, the correction part 124 determines that the relative position between the magnet part 210 and the sensor part 220 is misaligned only in the x axis direction, and, conversely, when the sum Vc12 is close to zero, and the sum Vs12 is larger than the threshold, the correction part 124 determines that the relative position between the magnet part 210 and the sensor part 220 is misaligned only in the y axis direction. Moreover, when both the sum Vc12 and the sum Vs12 are larger than the threshold, the relative position between the magnet part 210 and the sensor part 220 is misaligned in the x axis direction and the y axis direction, and hence the motor rotational angle $\theta'$ is not corrected. In other words, when the shaft misalignment where the sum of the output values of the two MR sensors S shifted from each other in the phase by π is larger than the threshold, and the sum of the output values of the other two MR sensors S shifted from each other in the phase by π is close to zero occurs, the correction angle is calculated.

A description is now given of the processing by the assist torque setting part 1011, the assist current instruction part 1021, and the control change instruction part 1301 according to the second embodiment. On this occasion, a description is given of differences from the assist torque setting part 101, the assist current instruction part 102, and the control change instruction part 130 according to the first embodiment. The control change instruction part 1301 according to the second embodiment acts not to stop the steering assist, but to change the calculation method of the assist control amount as the change in the control form, thereby continuing the steering assist when the occurrence of the shaft misalignment is detected by the shaft misalignment detection part 122 (F=1).

Figure 25:
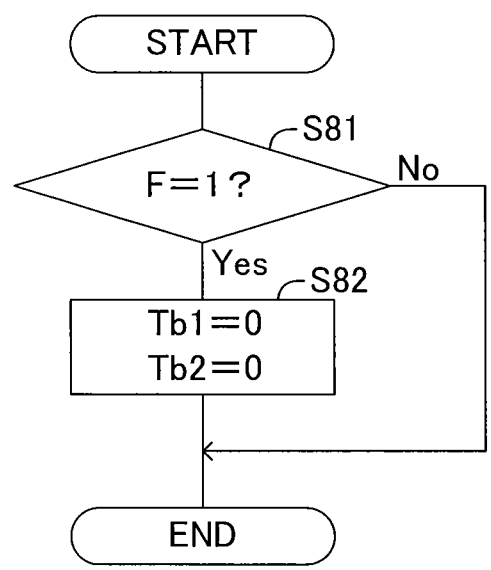
FIG. 25 is a flowchart illustrating processing by an assist torque setting part.

The control change instruction part 1301 inputs the shaft misalignment determination flag F output from the shaft misalignment detection part 122, and outputs an instruction signal Ct for specifying the calculation method for a target assist torque T* to the assist torque setting part 1011 depending on the shaft misalignment determination flag F. The shaft misalignment determination flag F is directly used as the instruction signal Ct. FIG. 25 illustrates processing by the assist torque setting part 1011 in a part different from the processing by the assist torque setting part 101 according to the first embodiment. In Step S81, the assist torque setting part 1011 reads the instruction signal Ct representing the shaft misalignment determination flag F, determines whether the shaft misalignment determination flag F is "1" or not, and, when the shaft misalignment determination flag F is "1", namely, the occurrence of the shaft misalignment is detected, in Step S82, sets the dumping compensation torque Tb1 and the return compensation torque Tb2 to zero.

On the other hand, when the shaft misalignment determination flag F is "0" (No in S81), namely, the occurrence of the shaft misalignment is not detected, the assist torque setting part 1011 skips the processing in Step S82. Thus, in this case, the damping compensation torque Tb1 and the return compensation torque Tb2 are set based on the dumping compensation torque map and the return compensation torque map shown in FIGS. 4 and 5.

The damping compensation torque Tb1 and the return compensation torque Tb2 are calculated respectively based on the angular velocity ωm and the steering angle θh calculated from the motor rotational angle θ. Thus, when the occurrence of the shaft misalignment is detected, the assist torque setting part 1011 sets the damping compensation torque Tb1 and the return compensation torque Tb2 to zero, thereby reducing the influence of the shaft misalignment on the assist torque.

Moreover, the control change instruction part 1301 inputs the shaft misalignment determination flag F output from the shaft misalignment detection part 122, and outputs an instruction signal Ci for specifying the calculation method for a current instruction value (d-axis instruction current Id*) to the assist current instruction part 1021 depending on the shaft misalignment determination flag F. The instruction signal Ci includes information representing a shaft misalignment degree Q as well as the shaft misalignment determination flag F input from the shaft misalignment detection part 122. Thus, the shaft misalignment detection part 122 outputs the information representing the shaft misalignment degree Q as well as the shaft misalignment determination flag F to the control change instruction part 1301 according to the second embodiment.

Figure 26:
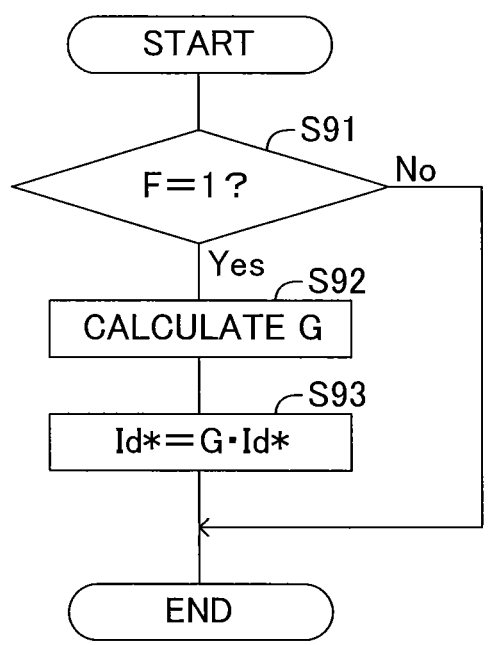
FIG. 26 is a flowchart illustrating processing by an assist current instruction part.

FIG. 26 illustrates processing by the assist current instruction part 1021 in a part different from the processing by the assist current instruction part 102 according to the first embodiment. In Step S91, the assist current instruction part 1021 reads the instruction signal Ci representing the shaft misalignment determination flag F and the shaft misalignment degree Q, thereby determining whether the shaft misalignment determination flag F is "1" or not. When the shaft misalignment determination flag F is "1", in Step S92, the assist current instruction part 1021 calculates a restriction gain G based on the shaft misalignment degree Q.

Figure 6:
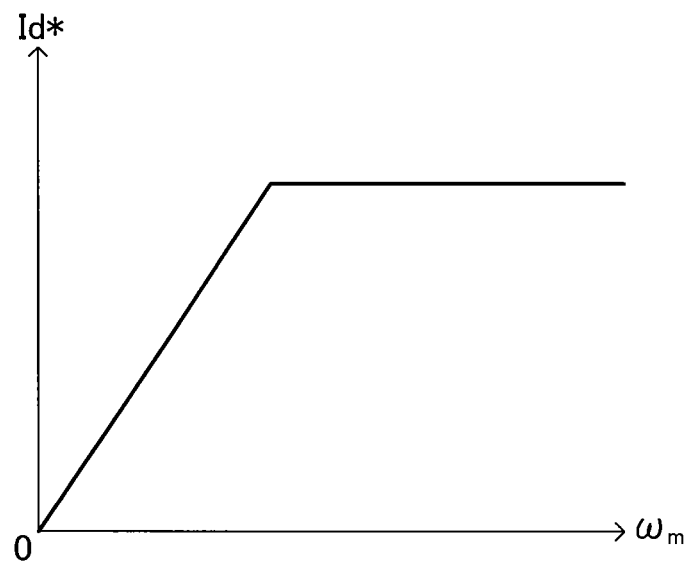
FIG. 6 is a chart showing a d-axis instruction current map.
Figure 27:
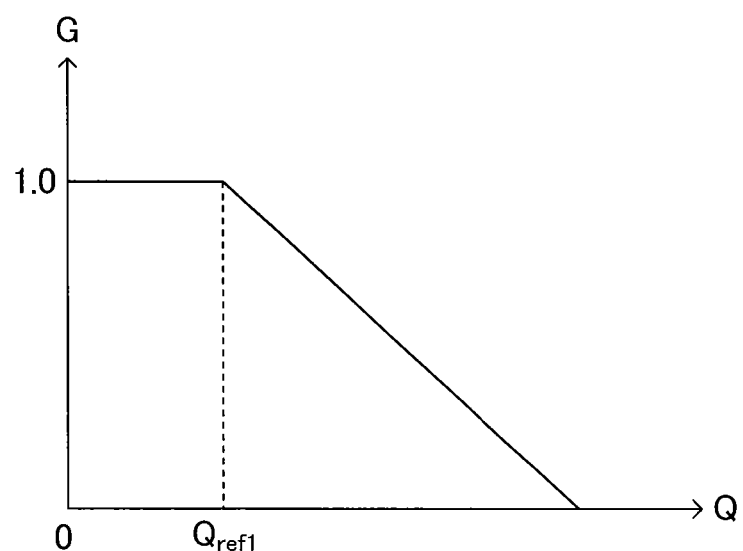
FIG. 27 is a chart showing a restriction gain map.

The assist current instruction part 1021 stores a restriction gain map shown in FIG. 27 as well as the d-axis instruction current map shown in FIG. 6. The restriction gain map has a characteristic of setting the restriction gain G to a value "1.0" in a range where the shaft misalignment degree Q is equal to or less than a threshold Qref1, and setting the restriction gain G which decreases to a value "0" as the shaft misalignment degree Q increases in a range where the shaft misalignment degree Q is more than the threshold Qref1.

For example, when the shaft misalignment detection part 122 carries out the shaft misalignment detection processing 1, the deviation Δθ (=|θ1−θ2|) between the first detection angle θ1 and the second detection angle θ2 can be used as the shaft misalignment degree Q. In this case, the threshold Qref1 for the shaft misalignment degree Q may be set to the determination threshold θref.

Moreover, for example, when the shaft misalignment detection part 122 carries out the shaft misalignment detection processing 2, a lager value of the sum Vs12 (=Vs1+Vs2) and the sum Vc12 (Vc1+Vc2) can be used as the shaft misalignment degree Q. In this case, the threshold Qref1 for the shaft misalignment degree Q may be set to the determination threshold Vref.

Moreover, for example, when the shaft misalignment detection part 122 carries out the shaft misalignment detection processing 3, the composite misalignment amount D representing the shaft misalignment distance can be used as the shaft misalignment degree Q. In this case, the threshold Qref1 for the shaft misalignment degree Q may be set to the determination threshold Dref.

Moreover, for example, when the shaft misalignment detection part 122 carries out the shaft misalignment detection processing 4, the amplitude Ay can be used as the shaft misalignment degree Q. In this case, the threshold Qref1 for the shaft misalignment degree Q may be set to the determination threshold Ayref.

In Step S92, the assist current instruction part 1021 calculates the restriction gain G, and, subsequently in Step S93, sets a value acquired by multiplying the d-axis instruction current Id* calculated by referring to the d-axis instruction current map shown in FIG. 6 by the restriction gain G(<1) to the final d-axis instruction current Id* (Id*=G·Id*). In other words, the assist current instruction part 1021 makes a correction so that the d-axis instruction current Id* calculated based on the angular velocity ωm decreases in accordance with the shaft misalignment degree Q.

On the other hand, when the shaft misalignment determination flag F is "0" (No in S91), namely, the occurrence of the shaft misalignment is not detected, the assist current instruction part 1021 skips the processing in Steps S92 and S93. Thus, in this case, the d-axis instruction current Id* is not corrected so as to decrease.

The d-axis instruction current Id* is calculated based on the angular velocity ωm calculated from the motor rotational angle θ. Thus, when the occurrence of the shaft misalignment is detected, the assist current instruction part 1021 makes such a correction that the d-axis instruction current Id* decreases as the shaft misalignment degree Q increases, thereby reducing the influence of the shaft misalignment on the field weakening control.

As described above, in the electric power-steering device including the rotational-angle detection device according to the second embodiment, when the shaft misalignment detection part 122 detects the occurrence of the shaft misalignment, the correction part 124 calculates the motor rotational angle θ so as to reduce the angular error caused by the shaft misalignment, and the motor rotational angle θ is used to control the drive of the motor 20. Thus, the steering assist continues, which is convenient for the driver. Moreover, when the occurrence of the shaft misalignment is detected, the control amounts (the compensation torques Tb1 and Tb2, and the d-axis instruction current Id*) set in relation to the motor rotational angle θ are decreased, and hence the influence by the shaft misalignment on the steering assist can be reduced.

A description is now given of a third embodiment of the present invention. The third embodiment is configured so as to switch the control form of the steering assist in three ways based on the shaft misalignment degree Q. In the following, like components as those of the second embodiment are denoted by like symbols as those of the second embodiment in drawings, and a description thereof is omitted.

Figure 28:
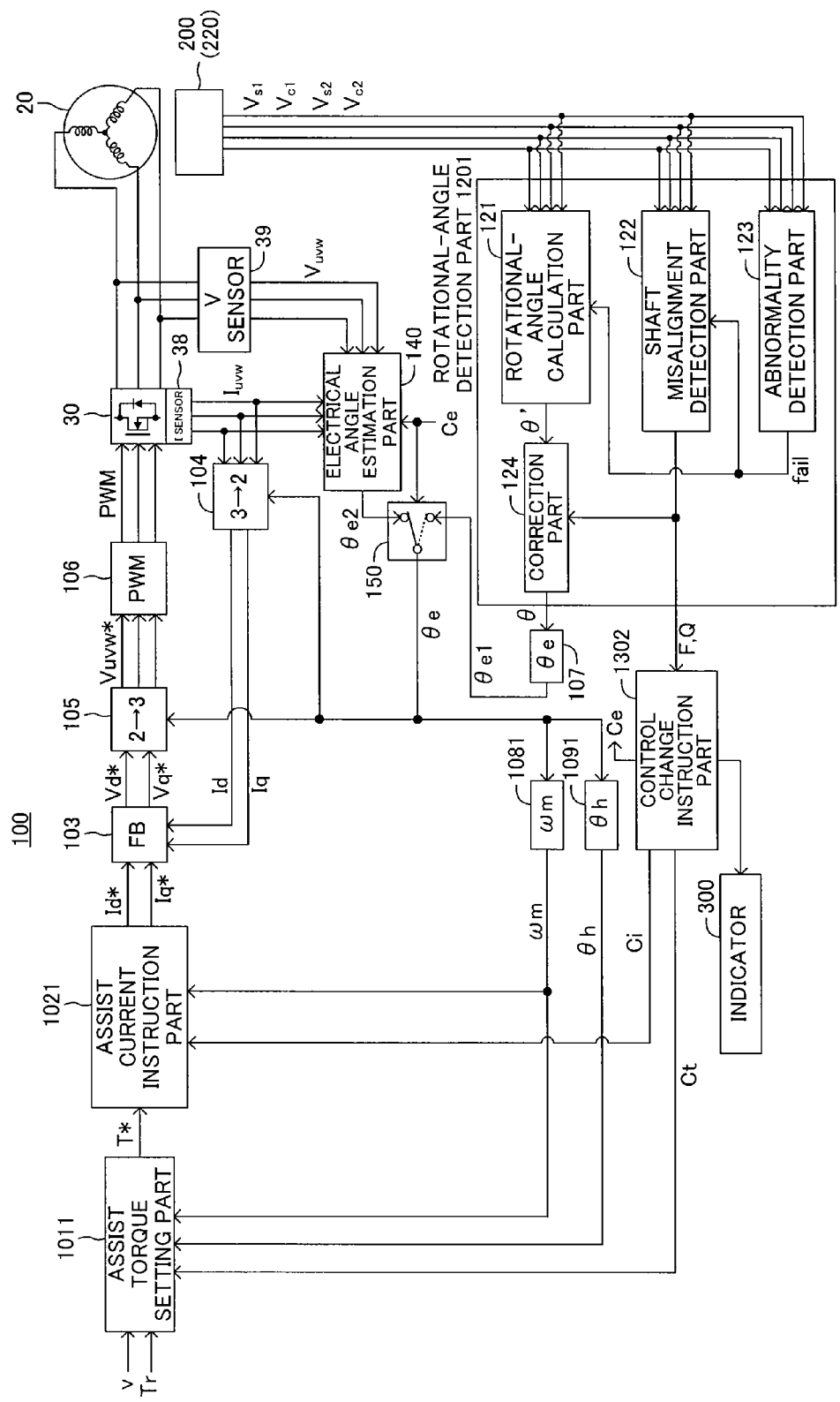
FIG. 28 is a functional block diagram illustrating processing by a microcomputer of an assist ECU according to a third embodiment of the present invention.

FIG. 28 is a functional block diagram illustrating processing by the microcomputer of the assist ECU 100 according to the third embodiment. The assist ECU 100 according to the third embodiment includes an electrical angle estimation part 140 and an electrical angle selection part 150 in addition to the configuration of the second embodiment. Moreover, the assist ECU 100 includes, in place of the angular velocity calculation part 108, the steering angle calculation part 109, and the control change instruction part 1301 according to the second embodiment, an angular velocity calculation part 1081, a steering angle calculation part 1091, and a control change instruction part 1302.

The electrical angle estimation part 140 estimates an electrical angle of the motor 20 based on an induced voltage (counter electromotive force) generated on the motor 20, and outputs the estimated electrical angle to the electrical angle selection part 150. On the other hand, the electrical angle calculation part 107 calculates an electrical angle based on the motor rotational angle θ output from the rotational-angle detection part 1201, and outputs the electrical angle to the electrical angle selection part 150. On this occasion, the electrical angle estimated by the electrical angle estimation part 140 based on the induced voltage is referred to as estimated electrical angle θe2, and the electrical angle calculated by the electrical angle calculation part 107 is referred to as sensor electrical angle θe1 in order to distinguish the two electrical angles from each other.

The electrical angle selection part 150 inputs the sensor electrical angle θe1 and the estimated electrical angle θe2, and selects and outputs any one of them. The selected electrical angle becomes an electrical angle θe finally used for the steering assist control. The electrical angle θe output from the electrical angle selection part 150 is output to the 3-phase/2-phase coordinate transformation part 104 and the 2-phase/3-phase coordinate transformation part 105, and also to the angular velocity calculation part 1081 and the steering angle calculation part 1091. The angular velocity calculation part 1081 inputs the electrical angle θe, and differentiates the electrical angle θe with respect to time, thereby acquiring the angular velocity ωm. Moreover, the steering angle calculation part 1091 inputs the electrical angle θe, and acquires the steering angle θh based on the electrical angle θe of the rotation of the motor 20 from a neutral position of the steering wheel 11 as a reference.

The electrical angle estimation part 140 uses such a relationship that the induced voltage generated on the motor 20 and the angular velocity are proportional to each other to calculate the motor angular velocity from the induced voltage. Then, the electrical angle estimation part 140 acquires an angle of the rotation of the motor 20 in one calculation period from the calculation period and the motor angular velocity, and adds the rotational angle to the electrical angle one calculation period ago in the motor rotational direction, thereby calculating the electrical angle, namely, an estimated electrical angle at a current time point. Control of the drive of a motor based on an estimated electrical angle is referred to as rotational-angle sensorless control.

Figure 30:
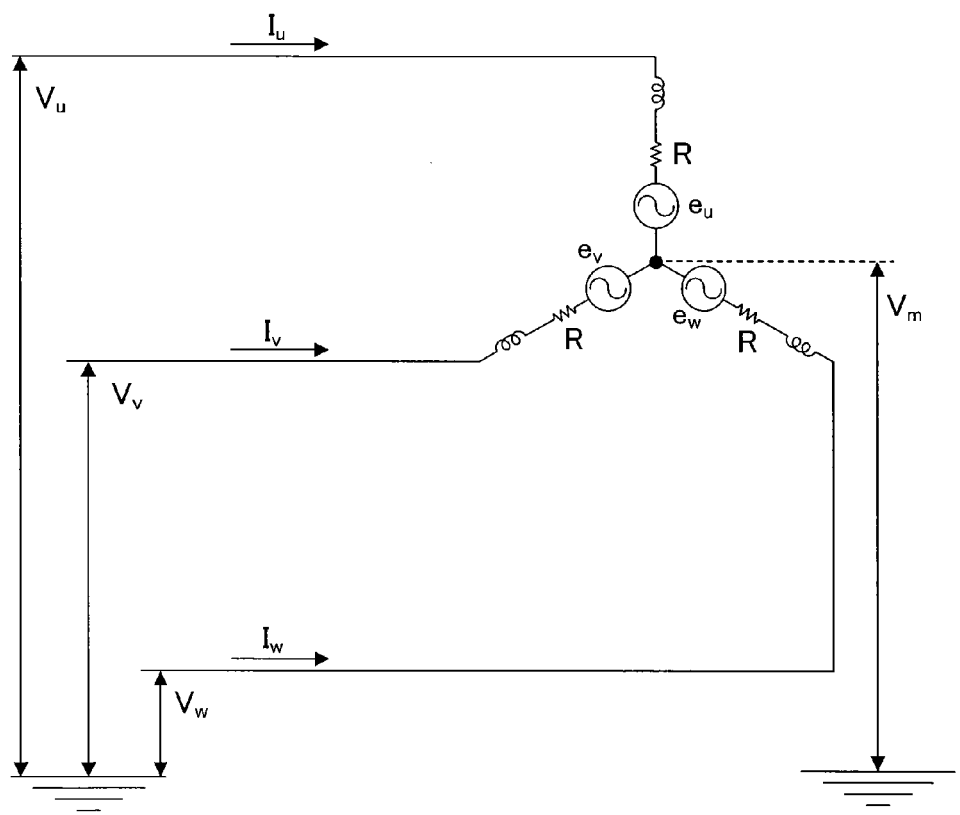
FIG. 30 is a circuit diagram illustrating an induced voltage.

A description is now given of the calculation processing for the estimated electrical angle θe2 carried out by the electrical angle estimation part 140. The electrical angle estimation part 140 inputs the detection signals output from the voltage sensor 39, and representing the motor terminal voltages Vu, Vv, and Vw, and the detection signals output from the current sensor 38, and representing the motor currents Iu, Iv, and Iw, and calculates the induced voltage e generated on the motor 20. When the induced voltage e is calculated, as illustrated in FIG. 30, an induced voltage in the U phase of the motor 20 is denoted by eu; an induced voltage in the V phase, ev; and an induced voltage in the W phase, ew, and the induced voltages eu, ev, and ew are calculated by using the following expressions (36), (37), and (38).

$$eu = Vu - Iu \cdot R - Vm \quad (36)$$

$$ev = Vv - Iv \cdot R - Vm \quad (37)$$

$$ew = Vw - Iw \cdot R - Vm \quad (38)$$

On this occasion, Vm is a middle point voltage, and R is a coil winding resistance of each phase. The middle point voltage Vm may be calculated as Vm=(Vu+Vv+Vw)/3.

The induced voltage e of the motor 20 can be calculated by using the following expression (39) to transform the induced voltages eu, ev, and ew in the three phases into induced voltages ed and eq on the d-q coordinate system in the two phases, and then using the following expression (40).

$$\begin{bmatrix} e_d \\ e_q \end{bmatrix} = \sqrt{\frac{2}{3}} \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \begin{bmatrix} e_u \\ e_v \\ e_w \end{bmatrix} \quad (39)$$

$$e = \sqrt{e_d^2 + e_q^2} \quad (40)$$

The induced voltage e generated on the motor 20 and the motor angular velocity have the proportional relationship. Thus, the motor angular velocity ω can be estimated by using the following expression (41).

$$\omega = e/Ke \quad (41)$$

On this occasion, Ke denotes a motor induced voltage constant [V/(rad/s)] representing the relationship between the angular velocity of the motor 20 and the induced voltage. In the following, the estimated motor angular velocity ω is referred to as estimated angular velocity ω.

The electrical angle estimation part 140 calculates an electrical angle change amount |Δθe| corresponding to a rotation of the rotor of the motor 20 in the one calculation period by using the following expression (42) based on the estimated angular velocity ω and the calculation period.

$$|\Delta\theta e| = Kf\omega \qquad (42)$$

On this occasion, Kf is a constant to acquire the electrical angle (rad) of the rotation of the rotor of the motor 20 in the one calculation period based on the motor angular velocity (rad/s), and corresponds to the calculation period.

The electrical angle estimation part 140 stores an estimated electrical angle θe2(n−1) calculated at the calculation timing one period ago, and calculates a current estimated electrical angle θe2(n) by adding or subtracting the electrical angle change amount |Δθ| to or from the estimated electrical angle θe2(n−1) depending on the motor rotational direction. The rotational direction of the motor 20 can be determined by, for example, using the sign (positive/negative) of the steering torque Tr. Therefore, the estimated electrical angle θe2(n) is represented by the following expression (43) where S(Tr) is the sign of the steering torque Tr.

$$\theta e2(n) = \theta e2(n-1) + S(Tr) \cdot |\Delta\theta e| \qquad (43)$$

In this case, the sensor electrical angle θe1 detected immediately before the electrical angle estimation part 140 starts the calculation may be used as the initial value of the estimated electrical angle θe2(n−1).

A description is now given of the control change instruction part 1302. The control change instruction part 1302 inputs the information representing the shaft misalignment determination flag F and the shaft misalignment degree Q output from the shaft misalignment detection part 122. Then, when the determination flag F is "1", the control change instruction part 1302 outputs the instruction signal Ct of changing the calculation method of the target assist torque T* to the assist torque setting part 1011, and outputs the instruction signal Ci of changing the calculation method of the current instruction value to the assist current instruction part 1021 similarly to the second embodiment. When the shaft misalignment degree Q is large, the control change instruction part 1302 uses the estimated electrical angle θe2 estimated by the electrical angle estimation part 140 in place of the sensor electrical angle θe1 calculated by the electrical angle calculation part 107, thereby switching the control form of driving the motor 20.

Figure 29:
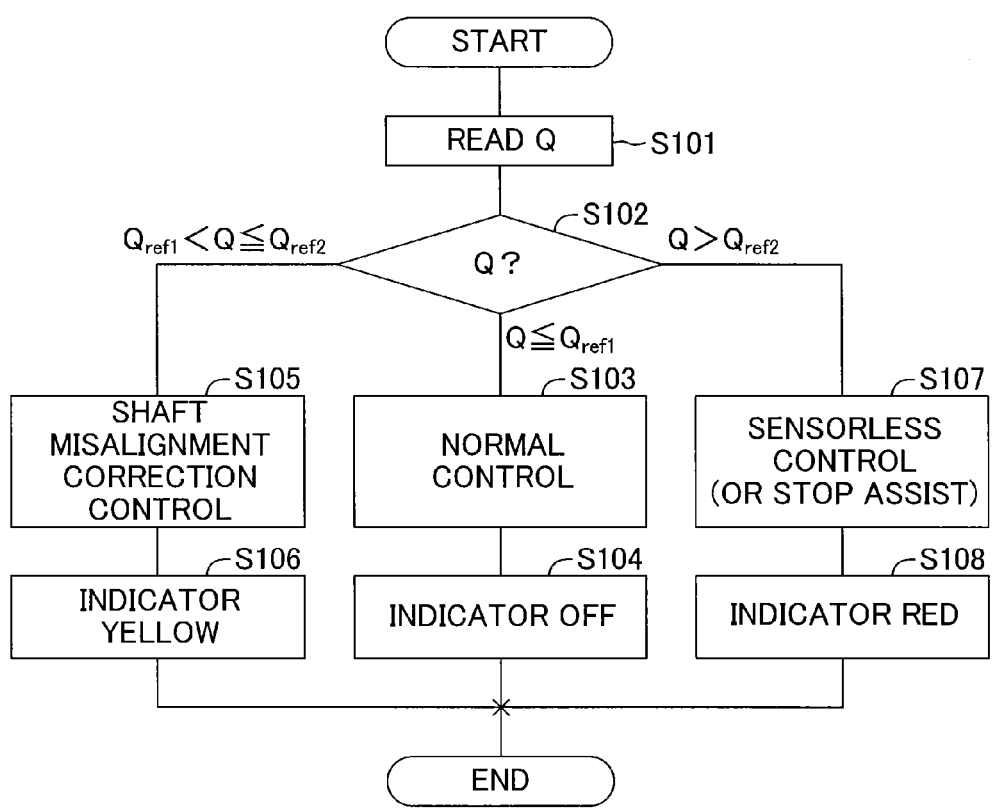
FIG. 29 is a flowchart illustrating a control form switching routine.

FIG. 29 illustrates a control form switching routine executed by the control change instruction part 1302 (functional part of the microcomputer). The control form switching routine is repeatedly executed at a predetermined period. In Step S101, the control change instruction part 1302 first reads the shaft misalignment degree Q output from the shaft misalignment detection part 122. Then, in Step S102, the control change instruction part 1302 determines whether a magnitude of the shaft misalignment degree Q is equal to or less than a first threshold Qref1, larger than the first threshold Qref1 and equal to or less than a second threshold Qref2 (>Qref1), or larger than the second threshold Qref2. When the control change instruction part 1302 determines that the shaft misalignment degree Q is equal to or less than the first threshold Qref1, in Step S103, the control change instruction part 1302 sets the control form of the motor 20 to normal control, and, in Step S104, maintains an indicator 300 provided on an instrument panel in a cabin in an off (turned-off) state.

The shaft misalignment degree Q is the same as the shaft misalignment degree Q according to the second embodiment. For example, when the shaft misalignment detection part 122 carries out the shaft misalignment detection processing 1, the shaft misalignment degree Q corresponds to the deviation Δθ(=|θ1−θ2|) between the first detection angle θ1 and the second detection angle θ2. When the shaft misalignment detection part 122 carries out the shaft misalignment detection processing 2, the shaft misalignment degree Q corresponds to the larger value of the sum Vs12 (=Vs1+Vs2) and the sum Vc12 (=Vc1+Vc2). When the shaft misalignment detection part 122 carries out the shaft misalignment detection processing 3, the shaft misalignment degree Q corresponds to the composite misalignment amount D representing the distance of the shaft misalignment. When the shaft misalignment detection part 122 carries out the shaft misalignment detection processing 4, the shaft misalignment degree Q corresponds to the amplitude Ay of the rotational second-order frequency component.

Moreover, the first threshold Qref1 corresponds to the threshold for the shaft misalignment detection part 122 to switch the shaft misalignment determination flag F from "0" to "1". For example, when the shaft misalignment detection part 122 carries out the shaft misalignment detection processing 1, the first threshold Qref1 corresponds to the determination threshold θref. When the shaft misalignment detection part 122 carries out the shaft misalignment detection processing 2, the first threshold Qref1 corresponds to the determination threshold Vref. When the shaft misalignment detection part 122 carries out the shaft misalignment detection processing 3, the first threshold Qref1 corresponds to the determination threshold Dref. When the shaft misalignment detection part 122 carries out the shaft misalignment detection processing 4, the first threshold Qref1 corresponds to the determination threshold Ayref.

Thus, the control change instruction part 1302 sets the control form of the motor 20 to the normal control when the shaft misalignment is small, and the shaft misalignment determination flag F is "0". The normal control refers to a normal control form where the motor rotational angle θ detected by the rotational-angle detection part 1201 is used to control the drive of the motor 20, and the steering assist is not restricted by the shaft misalignment detection.

When the control change instruction part 1302 sets the control form of the motor 20 to the normal control, the control change instruction part 1302 specifies the normal control by means of the instruction signal Ct to the assist torque setting part 1011, specifies the normal control by means of the instruction signal Ci to the assist current instruction part 1021, and specifies the normal control by means of an instruction signal Ce to the electrical angle estimation part 140 and the electrical angle selection part 150.

When the normal control is specified, the assist torque setting part 1011 calculates the target assist torque T* incorporating the compensation torques Tb1 and Tb2. Moreover, the assist current instruction part 1021 sets the value of the restriction gain G to "1.0". Moreover, the electrical angle estimation part 140 does not carry out the calculation processing for the estimated electrical angle θe2. Moreover, the electrical angle selection part 150 selects the sensor electrical angle θe1 output from the electrical angle calculation part 107, and outputs the selected sensor electrical angle θe1 as the electrical angle θe.

Moreover, when the normal control is set, the shaft misalignment determination flag F is set to "0", and hence the rotational-angle detection part 1201 outputs the motor rotational angle θ' calculated by the rotational-angle calculation part 121 as the motor rotational angle θ without correcting the motor rotational angle θ'.

On the other hand, in Step S102, when the control change instruction part 1302 determines that the shaft misalignment degree Q is larger than the first threshold Qref1 and equal to or less than the second threshold Qref2, the control change instruction part 1302 sets, in Step S105, the control form of the motor 20 to the shaft misalignment correction control, and lights, in Step S106, the indicator 300 provided in the instrument panel in the cabin in yellow, thereby warning the driver.

When the shaft misalignment degree Q is larger than the first threshold Qref1, the shaft misalignment determination flag F is set to "1". Thus, when the control form of the motor 20 is set to the shaft misalignment correction control, the correction part 124 in the rotational-angle detection part 1201 executes any of the rotational-angle correction processing 1 to 4, thereby outputting the motor rotational angle θ reduced in the angular error caused by the shaft misalignment.

When the control change instruction part 1302 sets the control form to the shaft misalignment correction control, the control change instruction part 1302 specifies the shaft misalignment correction control by means of the instruction signal Ct to the assist torque setting part 1011, specifies the shaft misalignment correction control by means of the instruction signal Ci to the assist current instruction part 1021, and specifies the shaft misalignment correction control by means of the instruction signal Ce to the electrical angle estimation part 140 and the electrical angle selection part 150.

When the shaft misalignment correction control is set, the assist torque setting part 1011 calculates the target assist torque T* where the compensation torques Tb1 and Tb2 are set to zero (Tb1=0, Tb2=0). Moreover, the assist current instruction part 1021 refers to the restriction gain map, thereby setting the restriction gain G based on the angular velocity ωm, and makes such a correction to reduce the d-axis instruction current Id* by using the restriction gain G. Moreover, the electrical angle estimation part 140 does not carry out the calculation processing for the estimated electrical angle θe2 similarly to the normal control. Moreover, the electrical angle selection part 150 selects the sensor electrical angle θe1 output from the electrical angle calculation part 107 similarly to the normal control, and outputs the selected sensor electrical angle θe1 as the electrical angle θe.

In the shaft misalignment correction control, the control amounts (the compensation torques Tb1 and Tb2, and the d-axis instruction current Id*) set in relation to the motor rotational angle θ are decreased, and the influence by the shaft misalignment on the steering assist can thus be reduced. Moreover, the steering assist is not stopped and continues, which is convenient for the driver. Moreover, the indicator is lit in yellow, and an abnormality can be notified to the driver.

Moreover, in Step S102, when the control change instruction part 1302 determines that the shaft misalignment degree Q is larger than the second threshold Qref2, the control change instruction part 1302 sets, in Step S107, the control form of the motor 20 to the rotational-angle sensorless control, and lights, in Step S108, the indicator 300 provided in the instrument panel in the cabin in red, thereby strongly warning the driver. Note that, an alarm buzzer (not show) may be further sounded in addition to the lighting of the indicator 300.

When the control change instruction part 1302 sets the control form to the rotational-angle sensorless control, the control change instruction part 1302 specifies the rotational-angle sensorless control by means of the instruction signal Ct to the assist torque setting part 1011, specifies the rotational-angle sensorless control by means of the instruction signal Ci to the assist current instruction part 1021, and specifies the rotational-angle sensorless control by means of the instruction signal Ce to the electrical angle estimation part 140 and the electrical angle selection part 150.

When the rotational-angle sensorless control is specified, the assist torque setting part 1011 and the assist current instruction part 1021 carry out the same processing as that for the case where the shaft misalignment correction control is specified. On the other hand, when the rotational-angle sensorless control is specified, the electrical angle estimation part 140 starts the calculation processing for the estimated electrical angle θe2, and outputs the calculated estimated electrical angle θe2 to the electrical angle selection part 150. When the rotational-angle sensorless control is specified, the electrical angle selection part 150 selects the estimated electrical angle θe2 out of the estimated electrical angle θe2 output from the electrical angle estimation part 140 and the sensor electrical angle θe1 output from the rotational-angle detection part 1201, and outputs the estimated electrical angle θe2 as the electrical angle θe.

When the rotational-angle sensorless control is carried out, the motor rotational angle θ detected by the rotational-angle detection part 1201 is not used for the drive control for the motor 20, and hence the calculation processing by the rotational-angle calculation part 121 and the calculation processing by the correction part 124 are stopped in the rotational-angle detection part 1201.

In the rotational-angle sensorless control, the rotational-angle detection device (the rotational-angle sensor 200 and the rotational-angle detection part 1201) is not used. The electrical angle of the motor 20 is estimated based on the induced voltage generated on the motor 20, and the drive of the motor 20 is controlled based on the estimated electrical angle θe2. Thus, even when a large shaft misalignment occurs in the rotational-angle sensor 200, the drive of the motor 20 can be controlled regardless of the shaft misalignment. Therefore, the steering assist continues, which is convenient for the driver. Moreover, the detection accuracy of the electrical angle decreases in the rotational-angle sensorless control compared with the case where the rotational-angle detection device appropriately acts. Therefore, an inappropriate steering assist is prevented from being carried out by reducing the control amounts (the compensation torques Tb1 and Tb2, and the d-axis instruction current Id*) set in relation to the motor rotational angle (corresponding to the electrical angle θe) in this embodiment.

In the electric power-steering device including the rotational-angle detection device according to the third embodiment, the control form of the motor 20 is switched depending on the shaft misalignment degree Q, and hence the appropriate steering assist control can be carried out depending on the shaft misalignment state of the rotational-angle sensor 200. Moreover, together with the switching of the control form of the motor 20, the action form of the indicator 300 is switched, and the necessity of repair is more strongly notified to the driver as the shaft misalignment degree increases.

When the shaft misalignment degree Q is larger than the second threshold Qref2, in Step S107, the steering assist may be stopped. Moreover, the control forms of the motor 20 may be set to two ways including the normal control and the rotational-angle sensorless control, and when the shaft misalignment degree Q is larger than the first threshold Qref1, the rotational-angle sensorless control may be set.

A description has been given of the electric power-steering devices including the rotational-angle detection devices according to the three embodiments, but the present invention is not limited to the embodiments, and can be modified in various ways without departing from the objects of the present invention.

For example, the embodiments include the abnormality detection part 123 for detecting an abnormality of the MR sensors S, but the abnormality detection part 123 does not need to be always provided. Even when the abnormality detection part 123 is not provided, when abnormalities occur to the MR sensors S, the shaft misalignment detection part 122 detects occurrence of a large shaft misalignment. Therefore, the control form of the steering assist can be changed (stopped or changed to the rotational-angle sensorless control), and the abnormalities in the MR sensors S can be addressed.

Moreover, for example, when the occurrence of the shaft misalignment is detected (F=1), the steering assist control is stopped according to the first embodiment, but the steering assist may be continued as in the second embodiment by providing the assist torque setting part 1011, the assist current instruction part 1021, and the control change instruction part 1301, and switching the calculation method for the control amount of the steering assist.

Figure 31:
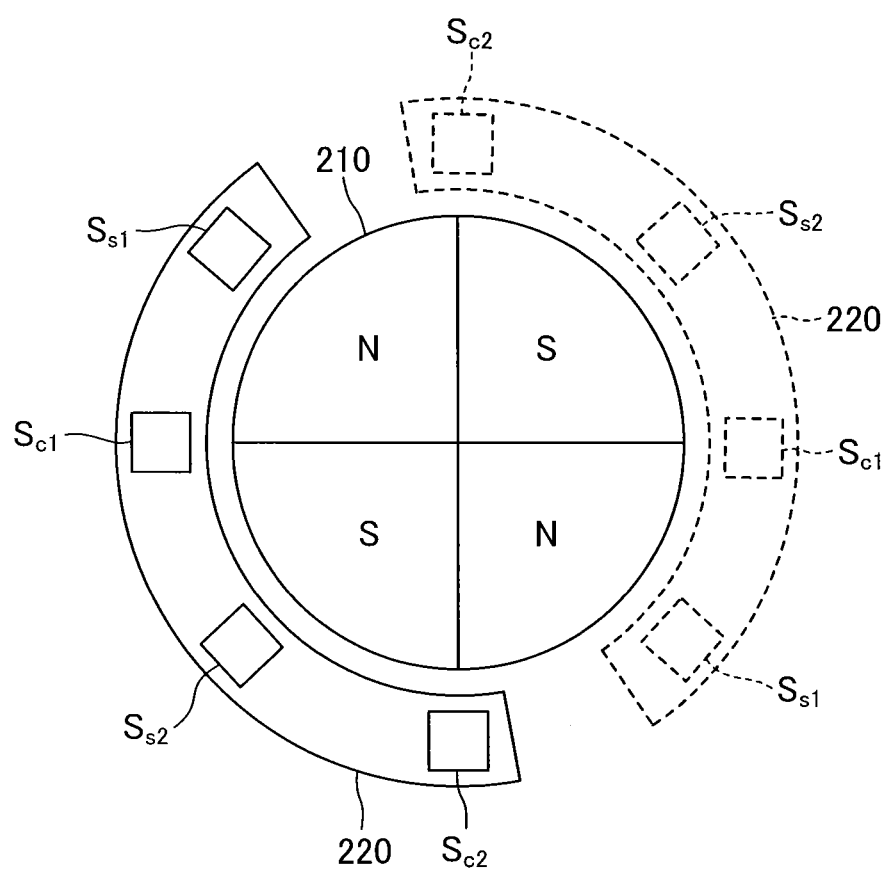
FIG. 31 is an explanatory diagram illustrating a relationship between the sensor part and the magnet part of the rotational-angle sensor as a variation.

Moreover, the rotational-angle sensor 200 according to the embodiments uses the magnet part 210 including the single area 211 magnetized as the N pole and the single area 212 magnetized as the S pole, but, as illustrated in FIG. 31, the magnet part 210 including a plurality of areas magnetized alternatingly as the N pole and the S pole may be used. Moreover, as illustrated in FIG. 31, the sensor part 220 may be configured so that the MR sensors Ss1, Sc1, Ss2, and Sc2 are arranged at predetermined intervals to face an outer peripheral surface of the magnet part 210 along a peripheral direction thereof. Also in this case, the MR sensors Ss1, Sc1, Ss2, and Sc2 may be arranged so as to output the detection signals shifted from each other in the phase by $\pi/2$.

Moreover, the rotational-angle sensor 200 according to the embodiments includes the four MR sensors S, but the number of the MR sensors S is not limited to four. For example, when the rotational-angle sensor 200 includes the magnet part 210 magnetized as illustrated in FIG. 31, a sensor part 220 illustrated by broken lines may be added, and a set of two sensor parts 220 may be arranged at positions shifted from each other by 180° in the peripheral direction. In this case, even when one of the sensor parts 220 fails, the other sensor part 220 may be used.

Moreover, one of the steering torque Tr, the d-axis instruction current Id*, the q-axis instruction current Iq*, the d-axis actual current Id, the q-axis actual current Iq, the steering wheel angular velocity $\omega h$, the induced voltage e, and the motor angular velocity $\omega m$ is used as the subject data for which the amplitude is calculated in the shaft misalignment detection processing 4, but the amplitudes of a plurality of types of them may be calculated, and the shaft misalignment may be determined based on the plurality of types of calculated amplitudes. For example, the shaft misalignment may be determined by using the maximum value, the minimum value, the average, and the like of the plurality of types of amplitudes.

Moreover, in the assist torque setting part 1011 according to the second embodiment, when the occurrence of the shaft misalignment is detected, the damping compensation torque Tb1 and the return compensation torque Tb2 are set to zero, but they do not always need to be set to zero, and may be corrected so as to decrease.

Moreover, in the rotational-angle correction processing 3, the correction amount $\theta$ is calculated so that the amplitude $A\omega$ of the rotational second-order frequency component of the angular velocity $\omega'$ is reduced to be equal to or less than the threshold $A\omega ref2$, other physical amount presenting the oscillation of the rotational second-order frequency component caused by the occurrence of the shaft misalignment may be employed in place of the angular velocity $\omega'$.

Moreover, a description is given of the electric power-steering device in a rack assist type which imparts the torque generated by the motor 20 to the rack bar 14 according to the embodiments, but the electric power-steering device may be a column assist type which imparts the torque generated by the motor to the steering shaft 12.

The invention claimed is:

1. A rotational-angle detection device, comprising:
   a magnet part provided to rotate integrally with a rotary shaft, and magnetized so that a position of an area magnetized as an N pole and a position of an area magnetized as an S pole are alternately switched as the rotary shaft rotates;
   a sensor part comprising a plurality of magnetic sensors arranged so as to oppose the magnet part, each of the plurality of magnetic sensors outputting a periodic signal that periodically changes by a magnetic action of the magnet part as the rotary shaft rotates; and
   circuitry configured to:
      calculate a rotational angle of the rotary shaft based on the periodic signal output by the each of the plurality of magnetic sensors of the sensor part;
      detect an occurrence of a shaft misalignment that is a misalignment in a relative position in a radial direction of the rotary shaft between the magnet part and the sensor part;
      output shaft misalignment information representing the occurrence of the shaft misalignment; and
      calculate, when the occurrence of the shaft misalignment is detected by the circuitry, the rotational angle of the rotary shaft so as to reduce a detection error in the rotational angle caused by the shaft misalignment.

2. A rotational-angle detection device according to claim 1,
   wherein:
   the sensor part comprises four magnetic sensors to output periodic signals that change in a sine waveform as the rotary shaft rotates so that phases of the periodic signals are shifted from one another by $\pi/2$; and
   the circuitry is configured to determine that the shaft misalignment has occurred when a deviation between a first rotational angle calculated based on output signals of two of the four magnetic sensors shifted from each other in the phases by $\pi/2$ and a second rotational angle calculated based on output signals of other two of the four magnetic sensors shifted from each other in the phases by $\pi/2$ is larger than a threshold.

3. A rotational-angle detection device according to claim 1,
wherein:
the sensor part comprises four magnetic sensors to output periodic signals that change in a sine waveform as the rotary shaft rotates so that phases of the periodic signals are shifted from one another by $\pi/2$; and
the circuitry is configured to determine that the shaft misalignment has occurred based on a first sum that is a total of output values of two of the four magnetic sensors shifted from each other in the phases by $\pi$ and a second sum that is a total of output values of other two of the four magnetic sensors shifted from each other in the phases by $\pi$ when at least one of the first sum or the second sum is larger than a threshold.

4. A rotational-angle detection device according to claim 1,
wherein:
the sensor part comprises four magnetic sensors to output periodic signals that change in a sine waveform as the rotary shaft rotates so that phases of the periodic signals are shifted from one another by $\pi/2$; and
the circuitry is configured to calculate a first angle of an inclination direction of magnetism detection positions of two of the four magnetic sensors shifted from each other in the phases by $\pi$ from a rotational center of the magnet part with respect to a direction of a straight line connecting the magnetism detection positions of the two of the four magnetic sensors with each other based on a first sum that is a total of output values of the two of the four magnetic sensors, calculate a second angle of an inclination direction of magnetism detection positions of other two of the four magnetic sensors shifted from each other in the phases by $\pi$ from the rotational center of the magnet part with respect to a direction of a straight line connecting the magnetism detection positions of the other two of the four magnetic sensors with each other based on a second sum that is a total of output values of the other two of the four magnetic sensors, calculate a shaft misalignment amount representing an amount of the shaft misalignment based on the first angle and the second angle, and determine that the shaft misalignment has occurred when the shaft misalignment amount is larger than a threshold.

5. A rotational-angle detection device according to claim 1, wherein:
the sensor part comprises four magnetic sensors to output periodic signals that change in a sine waveform as the rotary shaft rotates so that phases of the periodic signals are shifted from one another by $\pi/2$; and
the circuitry is configured to use output signals of the four magnetic sensors to calculate the rotational angle of the rotary shaft so as to reduce the detection error caused by the shaft misalignment.

6. A rotational-angle detection device according to claim 5, wherein the circuitry is configured to use a plurality of combinations of the output signals of two of the four magnetic sensors shifted from each other in the phases by $\pi/2$ to calculate a plurality of rotational-angle calculation values, and sets an average of the plurality of rotational-angle calculation values as the rotational angle of the rotary shaft.

7. A rotational-angle detection device according to claim 5, wherein the circuitry is configured to select, out of a plurality of rotational-angle calculation values calculated by using a plurality of combinations of the output signals of two of the four magnetic sensors shifted from each other in the phases by $\pi/2$, a rotational-angle calculation value closest to an average of the plurality of rotational-angle calculation values as the rotational angle of the rotary shaft.

8. A rotational-angle detection device according to claim 5, wherein the circuitry is configured to use the output signals of the four magnetic sensors to calculate a correction angle corresponding to the shaft misalignment, and correct the rotational angle calculated by the circuitry by using the correction angle.

9. An electric power-steering device, comprising the rotational-angle detection device according to claim 1 so as to detect a rotational angle of a motor to assist steering by the rotational-angle detection device, and control drive of the motor based on the detected rotational angle, to thereby generate a steering assist torque in accordance with a steering torque, wherein
the circuitry is configured to change, based on the shaft misalignment information output from the circuitry, a control form of the motor.

10. An electric power-steering device according to claim 9, wherein the circuitry is configured to detect a periodic fluctuation in a physical amount caused by the occurrence of the shaft misalignment, and
wherein the circuitry is configured to detect the occurrence of the shaft misalignment based on the periodic fluctuation in the physical amount detected by the circuitry.

11. An electric power-steering device according to claim 10, wherein:
the circuitry is configured to acquire, as the physical amount, at least one of the steering torque, a current flowing through the motor, a control value of the motor, a steering angular velocity, an angular velocity of the motor, or an induced voltage generated on the motor, and calculate an amplitude of a frequency component twice as high as a frequency of the rotational angle calculated by the circuitry in the physical amount; and
the circuitry is configured to detect the occurrence of the shaft misalignment based on the amplitude in the physical amount calculated by the circuitry.

12. An electric power-steering device according to claim 11, wherein the circuitry is configured to correct the rotational angle calculated by the circuitry so as to reduce the amplitude in the physical amount calculated by the circuitry.

13. An electric power-steering device according to claim 12, wherein:
the circuitry is configured to calculate, for each of the steering torque and the angular velocity of the motor, a phase of the frequency component twice as high as the frequency of the rotational angle calculated by the circuitry; and
the circuitry is configured to set a correction direction representing a direction to increase or decrease the rotational angle based on the calculated phase of the steering torque and the calculated phase of the angular velocity of the motor, and corrects the rotational angle calculated by the circuitry in the set correction direction.

14. An electric power-steering device according to claim 11, wherein, when the occurrence of the shaft misalignment is detected, the circuitry is configured to avoid using the rotational angle detected by the rotational-angle detection device, and carry out switching to a control form of controlling the drive of the motor by using an estimated electrical angle estimated based on the induced voltage generated on the motor.

15. An electric power-steering device according to claim 9, wherein the circuitry is configured to carry out, when the occurrence of the shaft misalignment is detected, switching to a control form having a reduced field weakening control amount that is set based on the angular velocity of the motor.

16. An electric power-steering device according to claim 11, wherein the circuitry is configured to carry out, when the occurrence of the shaft misalignment is detected, switching to a control form having a reduced compensation torque that is added to the steering assist torque and set based on the rotational angle or the angular velocity of the motor.

17. An electric power-steering device according to claim 9, wherein the circuitry is configured to stop the steering assist when the occurrence of the shaft misalignment is detected.

18. An electric power-steering device according to claim 9, wherein the circuitry is configured to report, when the occurrence of the shaft misalignment is detected, an abnormality to a driver in a different form corresponding to a degree of the shaft misalignment.

19. An electric power-steering device, comprising the rotational-angle detection device according to claim 1 so as to detect a rotational angle of a motor to assist steering, and controlling drive of the motor based on the detected rotational angle, to thereby generate a steering assist torque in accordance with a steering torque; wherein
the circuitry is configured to acquire at least one physical amount of the steering torque, a current flowing through the motor, a control value of the motor, a steering angular velocity, an angular velocity of the motor, or an induced voltage generated on the motor, and calculating an amplitude of a frequency component twice as high as a frequency of the rotational angle calculated by the circuitry in the at least one physical amount,
wherein the circuitry is configured to detect the occurrence of the shaft misalignment based on the amplitude in the at least one physical amount calculated by the circuitry.

20. An electric power-steering device according to claim 19, wherein the circuitry is configured to correct the rotational angle calculated by the circuitry so as to reduce the amplitude in the at least one physical amount calculated by the circuitry.

21. An electric power-steering device according to claim 20, wherein:
the circuitry is configured to calculate, for each of the steering torque and the angular velocity of the motor, a phase of the frequency component twice as high as the frequency of the rotational angle calculated by the circuitry; and
the circuitry is configured to set a correction direction representing a direction to increase or decrease the rotational angle based on the calculated phase of the steering torque and the calculated phase of the angular velocity of the motor, and correct the rotational angle calculated by the circuitry in the set correction direction.

22. An electric power-steering device, comprising the rotational-angle detection device according to claim 1,
wherein the electric power-steering device uses the rotational-angle detection device to detect a rotational angle of a motor to assist steering, and controls drive of the motor based on the detected rotational angle, to thereby generate a steering assist torque in accordance with a steering torque.

23. A rotational-angle detection device, comprising:
a magnet part provided to rotate integrally with a rotary shaft, and magnetized so that a position of an area magnetized as an N pole and a position of an area magnetized as an S pole are alternately switched as the rotary shaft rotates;
a sensor part comprising a plurality of magnetic sensors arranged so as to oppose the magnet part, each of the plurality of magnetic sensors outputting a periodic signal that periodically changes by a magnetic action of the magnet part as the rotary shaft rotates;
rotational-angle calculation means for calculating a rotational angle of the rotary shaft based on the periodic signal output by the each of the plurality of magnetic sensors of the sensor part;
shaft misalignment detection means for detecting occurrence of a shaft misalignment that is a misalignment in a relative position in a radial direction of the rotary shaft between the magnet part and the sensor part;
shaft misalignment information output means for outputting shaft misalignment information representing the occurrence of the shaft misalignment; and
rotational-angle correction means for calculating, when the occurrence of the shaft misalignment is detected by the shaft misalignment detection means, the rotational angle of the rotary shaft so as to reduce a detection error in the rotational angle caused by the shaft misalignment.

* * * * *